(12) United States Patent
Galves et al.

(10) Patent No.: US 8,364,603 B2
(45) Date of Patent: Jan. 29, 2013

(54) ON-LINE DISPUTE RESOLUTION FOR E-COMMERCE DISPUTES

(76) Inventors: Fred A. Galves, Sacramento, CA (US); David Allen, Sacramento, CA (US)

(*) Notice: Subject to any disclaimer, the term of this patent is extended or adjusted under 35 U.S.C. 154(b) by 2539 days.

(21) Appl. No.: 10/422,612

(22) Filed: Apr. 23, 2003

(65) Prior Publication Data

US 2003/0236679 A1    Dec. 25, 2003

Related U.S. Application Data

(60) Provisional application No. 60/375,085, filed on Apr. 23, 2002.

(51) Int. Cl.
*G06Q 50/00* (2012.01)

(52) U.S. Cl. .................. 705/309; 705/311

(58) Field of Classification Search .......... 705/309, 705/311; 707/608, 705, 790, 791, 793
See application file for complete search history.

(56) References Cited

U.S. PATENT DOCUMENTS

| | | | |
|---|---|---|---|
| 5,495,412 A | 2/1996 | Thiessen | |
| 5,895,450 A | 4/1999 | Sloo | |
| 5,895,480 A | 4/1999 | Yung | 711/5 |
| 5,991,733 A * | 11/1999 | Aleia et al. | 705/7.13 |
| 6,144,726 A | 11/2000 | Cross | |
| 6,330,551 B1 | 12/2001 | Burchetta | 705/80 |
| 6,375,466 B1 | 4/2002 | Juranovic | 434/107 |
| 6,502,081 B1 | 12/2002 | Witshire, Jr. | 706/12 |
| 6,954,741 B1 * | 10/2005 | Burchetta et al. | 705/80 |
| 7,630,903 B1 * | 12/2009 | Vaidyanathan et al. | 705/1.1 |
| 2002/0035480 A1 * | 3/2002 | Gordon et al. | 705/1 |

FOREIGN PATENT DOCUMENTS

WO    WO 0141020 A1 *   6/2001

OTHER PUBLICATIONS

International Search Report of PCT corresponding patent application, No. PCT/US03/12597, dated Feb. 5, 2004, 5 pages.
Internet printout: www.cybersettle.com, printed on Apr. 22, 2003.
Internet printout: www.clicknsettle.com, printed on Apr. 22, 2003.
Internet printout: www.arb-forum.com, printed on Apr. 22, 2003.
Internet printout: www.privatejudge.com, printed on Apr. 22, 2003.
Internet printout: www.resolvemydispute.com, printed on Apr. 22, 2003.
Internet printout: www.icourthouse.com, printed on Apr. 22, 2003.
Internet printout: www.novaforum.com, printed on Apr. 22, 2003.

* cited by examiner

*Primary Examiner* — Mary Cheung
(74) *Attorney, Agent, or Firm* — Edwin Tarver; Lauson & Tarver LLP

(57) ABSTRACT

A system, software and method for electronically adjudicating a dispute includes selecting an electronic dispute adjudication level from multiple levels providing various extents of procedural options involved in the adjudicating of the dispute, and electronically processing the adjudicating of the dispute in accordance with the selected level. The multiple levels preferably include successive levels providing enhanced procedural options to parties involved in the dispute. The successive levels may correspond to increasing amounts in dispute and/or may be selected by one or more parties involved in the dispute.

5 Claims, 10 Drawing Sheets

| LEVEL 1 | LEVEL 2 |
|---|---|
| NO COUNTER CLAIMS | COUNTER CLAIMS ALLOWED |
| ONLY EXTRAORDINARY MOTIONS ALLOWED | ONLY EXTRAORDINARY MOTIONS AND MOTIONS TO COMPEL DISCOVERY ALLOWED |
| NO VOLUNTARY DISCOVERY ALLOWED | VOLUNTARY DISCOVERY ALLOWED |
| NO CASE LAW ALLOWED WITH FINAL SUBMISSION | CASE LAW PERMITTED WITH FINAL SUBMISSION |
| NO OBJECTIONS TO EVIDENCE ALLOWED | OBJECTIONS TO EVIDENCE ALLOWED |
| RECONSIDERATION OF FINAL JUDGMENT MOTION NOT ALLOWED | RECONSIDERATION OF FINAL JUDGMENT MOTION ALLOWED |
| EXTRAORDINARY CIRCUMSTANCES AND GOOD CAUSE REQUIRED FOR EXTENSION OF TIME | ONLY GOOD CAUSE REQUIRED FOR EXTENSION OF TIME |

FIGURE 7

| LEVEL 2 | LEVEL 3 |
|---|---|
| NO PRE-ANSWER MOTIONS ALLOWED | PRE-ANSWER MOTIONS ALLOWED |
| NO CROSS-CLAIMS ALLOWED | CROSS-CLAIMS ALLOWED |
| ONLY EXTRAORDINARY MOTIONS AND MOTIONS TO COMPEL DISCOVERY ALLOWED | MANY MOTIONS ALLOWED |
| NO AMENDMENTS TO PLEADINGS ALLOWED | AMENDMENTS TO PLEADINGS ALLOWED |
| NO-PRE-FINAL SUBMISSION HEARING | PRE-FINAL SUBMISSION HEARING ALLOWED |
| NO SUMMARY JUDGMENT MOTIONS ALLOWED | SUMMARY JUDGMENT MOTIONS ALLOWED |
| NO EXPERT TESTIMONY ALLOWED | EXPERT OPINION TESTIMONY ALLOWED |
| DEFENDANT VENDOR MAY NOT RECOVER FEES | DEFENDANT VENDOR MAY RECOVER FEES |

FIGURE 8

| LEVEL 2 | LEVEL 3 |
|---|---|
| NO DEPOSITIONS ALLOWED | DEPOSITIONS ALLOWED |
| MAXIMUM NUMBER OF INTERROGATORIES INCREASES FROM LEVEL 2 TO LEVEL 3 ||
| MAXIMUM NUMBER OF REQUESTS FOR DOCUMENTS INCREASES FROM LEVEL 2 TO LEVEL 3 ||
| MAXIMUM NUMBER OF REQUESTS FOR TANGIBLE ITEMS INCREASES FROM LEVEL 2 TO LEVEL 3 ||
| MAXIMUM NUMBER OF REQUESTS FOR ADMISSIONS INCREASES FROM LEVEL 2 TO LEVEL 3 ||

FIGURE 9

| LEVEL 1 | LEVEL 2 | LEVEL 3 |
|---|---|---|
| NO SUB-PARAGRAPHS WITH SPECIFIC FACTUAL STATEMENTS ALLOWED IN THE COMPLAINT | SUB-PARAGRAPHS WITH SPECIFIC FACTUAL STATEMENTS ALLOWED IN THE COMPLAINT | |
| NO COUNTER-CLAIMS ALLOWED | MAXIMUM LENGTH OF REPLY TO COUNTER-CLAIMS INCREASES FROM LEVEL 2 TO LEVEL 3 | |
| MAXIMUM LENGTH OF 1 OR MORE ELECTRONIC SUBMISSIONS DEPENDS ON SELECTED LEVEL | | |
| MAXIMUM LENGTH OF COMPLAINT INCREASES FROM LEVEL 1 TO LEVEL 2 TO LEVEL 3 | | |
| MAXIMUM LENGTH OF ANSWER INCREASES FROM LEVEL 1 TO LEVEL 2 TO LEVEL 3 | | |
| MAXIMUM LENGTH OF FINAL SUBMISSION INCREASES FROM LEVEL 1 TO LEVEL 2 TO LEVEL 3 | | |

ON-LINE DISPUTE RESOLUTION FOR E-COMMERCE DISPUTES

PRIORITY

This application claims the benefit of priority to U.S. provisional patent application serial No. 60/375,085, filed Apr. 23, 2002, which is hereby incorporated by reference.

BACKGROUND

1. Field of the Invention

The invention relates to electronic dispute resolution, and particularly to electronic dispute resolution of e-commerce disputes.

2. Description of the Related Art

The Internet offers unparalleled opportunities for communication. It is means by which large amounts of information are moved at the speeds of light and electrons. It is natural that the world of commerce has seized the opportunity to conduct business through the Internet. Today, consumers order billions of dollars of merchandise, manufactures, and parts, orchestrate the transnational assembly of products, and move vast amounts of capital from one financial institution to another using electronic means including the internet.

The Internet transformed the way the industrialized world does business in a fraction of the time it took prehistoric man to determine how to put a handle on a stone hammer. This rapid change, however, took place faster then the development of the law governing Internet transactions. Today there is uncertainty as to which procedural law applies and which substantive law applies. The United States possesses a very sophisticated judicial system. Yet even the courts in the US arrive at differing, and often contradictory, decisions regarding Internet transactions. Some courts find jurisdiction if the file server of an Internet provider is located in the state (see Bochan v. La Fontaine, 68 F. Supp. 2d 692, C.C. No. 98-1749-A (E. D. Va. May 26, 1999); Young v. New Haven Advocate, 184 F. Supp. 2d 498, No. 2:00CV00086 (W.D. Va. Aug. 10, 2001)). Other courts confronting the same question find jurisdiction fails to exist when the file server resides in the state (see Jewish Defense Organization Inv. v. Superior Court of Los Angeles, 72 Cal.App.4th 1045, No. B129319 (Cal. App. 1999); Rambam v. Luhta, Cal.App. 2 Dist., Nov. 30, 2001). Some courts will assert jurisdiction if the site can simply be accessed by any purchaser (Mieczkowski v. Masco Corp., 997 F. Supp. 7821 (E.D. Texas 1998)). Some courts will extend jurisdiction if the website is interactive, others will refuse jurisdiction even if the website is interactive (Rannoch Inc. v. Rannoch Corp., 52 F. Supp. 2d 681, No. Civ. A 99403-A (E.D. Va. 1999); Roche v. Worldwide Media, Inc., 90 F. Supp. 2d 714 (E.D. Va. Mar. 27, 2000) Some courts will adhere to a choice of law provision contained in a website, even though the purchaser contends a lack of knowledge regarding the provision, and even though enforcing it works a real hardship on the purchaser (Decker v. Circus Circus Hotel, 49 F. Supp. 2d 743, No. Civ. 97-1848 (D. N.J. May 12, 1999).

As a result sellers providing merchandise through the Internet are uncertain as to where and when they may be subjected to jurisdiction. Sellers are also uncertain which law may apply when and if they are subject to jurisdiction. Consumers are increasingly being educated to the problems of jurisdiction and choice of law, and a common suggestion being made by consumer advocates is to do business over the Internet only with organizations having a physical location in their state. Businesses doing business to business transactions confront the same problems. The result is uncertainty. Uncertainty breeds apprehension. Apprehension castes a chilling pale over the Internet preventing the opportunities for speed of light, inexpensive commerce from coming fully into existence.

One solution is to conduct business only using a brick and mortar store, or else use the phone, mail, or the internet without the desired certainty as to jurisdiction and choice of law. However, if you have ever been in a lawsuit, as opposed to private dispute resolution, you know that lawsuits often pose great uncertainty. Costly legal battles raise the following types of litigation concerns:

(1) Where Can People Be Sued? When the parties to a transaction reside in different states or countries, may suit be brought in the state or country of the buyer, of the seller, of the file server, of the Internet service provider? "Where" do cyberspace transactions actually take place anyway? Under current law, this is uncertain and large, expensive, time-consuming fights may develop. It is desired to avoid having to deal with these issues by providing dispute resolution without a physical brick and mortar building, i.e., without a physical tribunal to where the parties must travel to fight the lawsuit, eliminating this as a possible point of contention or confusion. In this sense, it is desired to have a system for resolving e-commerce disputes in the same manner as the original transaction was conducted, i.e., on-line using client computers connected together over the Internet.

(2) Which Law Applies? Is it federal or state law? If state law, which of the 50 states? Which country's law applies, if the dispute is international? Under current law, determining which law applies to a controversy is often unclear and frequently culminates in added time and expense. It is desired to have a system for e-commerce dispute resolution wherein the applicable governing law and the applicable rules of procedure have already been established and agreed upon, eliminating this as a possible point of contention or confusion.

(3) How Long Will the Lawsuit Take and How Much Will It Cost? The legal costs and bureaucratic red tape associated with the typical modern commercial lawsuit often make the prospect of a lawsuit just "not worth it." The time, money, hassle, and aggravation of litigating, especially for smaller disputes, regularly prevent people from efficiently obtaining justice. It is desired to have a system for e-commerce dispute resolution having abbreviated rules and procedures and using the efficient exchange of information over the Internet to make the dispute, however small, nonetheless cost-effective. The desired system would provide contracting parties with assurance, which, in turn, will encourage even more frequent e-commerce transactions.

Below, we provide a summary of several services operating which relate to use of the Internet for online dispute resolution. The content published at the URLs for the web sites provided is hereby incorporated by reference.

Cybersettle (www.cybersettle.com) is an example of a company that offers mediation or settlement services based on a settlement algorithm. Cybersettle uses a settlement algorithm which essentially compares two competing offers to settle and if they are within 20% of each other finds the case is settled by requiring one party to increase it offer by 10% and the other to decrease its demand by 10%.

NAM (www.clicknsettle.com) uses a web enabled case management system. It does not use the web for submission of evidence and actual dispute resolution.

National Arbitration Forum (www.arb-forum.com) is essentially a traditional arbitration service. It resolves disputes through traditional face to face hearings.

PrivateJudge (www.privatejudge.com) allows for online submission of documents and online chats. It lacks a comprehensive set of governing procedures and assumes the parties have already resolved all issues of forum and choice of law before bringing the dispute to it. PrivateJudge uses traditional fee for service pricing.

Mar (www.resolvemydispute.com) allows for online submission of documents. It does not appear to allow for online chats. It lacks a comprehensive set of governing procedures and substantive law, such as the Uniform Commercial Code, and the basis of both procedural and substantive decisions are unknown to the parties when they begin the arbitration process.

iCourthouse (www.icourthouse.com) is primarily a site used by lawyers to get feedback on cases heading to trial. It allows volunteer online jurors to make decisions. It lacks a comprehensive set of governing procedures and assumes the parties have already resolved all issues of forum and choice of law before bringing the dispute to it.

Nova Forum (www.novaforum.com) is a service that allows submission of case documents through the internet and provides private dispute resolution rooms. It possesses a set of governing procedures, but allows the parties to alter the procedures as they see fit. This feature presents an obstacle to binding arbitration since the parties may not agree to the rules and thus abandon the process. The service lacks substantive law, such as the Uniform Commercial Code, and by this omission prevents the process from going forward until the parties agree as to what law applies. Essentially the service only is applicable to parties which are predisposed to selecting rules they want to use and the law which will apply.

RECOGNIZED IN THE INVENTION

It is recognized in the present invention that certainty in matters involving transactions is generally advantageous to an internet company achieving its potential. A desired system and method for resolving on-line disputes would allow parties to be assured that if they become involved in a dispute regarding their transaction, that dispute will be resolved in accordance with established and efficient rules of procedure.

It is further recognized herein that the desired dispute resolution system would be independent and authoritative, e.g., created and run by academicians, lawyers, and/or Internet experts to serve parties involved in either an existing dispute arising out of an e-commerce transaction, or who generally engage in transactions over the Internet. The desired system would also provide an inexpensive and convenient on-line forum to resolve disputes in a fair and efficient manner by those independent and authoritative legal experts It is further recognized herein that the desired system would provide resolution of disagreements arising from transacting business over the Internet with the correspondingly similar ease and time-saving convenience as entering into those on-line transactions in the first place. It would be advantageous to get disagreements heard and adjudicated as quickly as possible and from the convenience of the parties' own computers. It is desired that the parties should be able to do so before an independent, impartial tribunal without having to resolve expensive and time-consuming issues of where the dispute should be heard (which state or country?) or which particular law should apply (federal or state, if state, which state, or perhaps even foreign law).

SUMMARY OF THE INVENTION

In view of the above, a system, software and method of electronically adjudicating a dispute are provided, the method including selecting an electronic dispute adjudication level from multiple levels providing various extents of procedural options involved in the adjudicating of the dispute, and electronically processing the adjudicating of the dispute in accordance with the selected level. The electronic processing preferably results in a final resolution that is documented in a judgment award permitting reduction to an enforceable judgment. Alternatively or in addition, an enforceable judgment award may be documented. The electronic processing may form part of an e-commerce transaction, wherein payment involved in the e-commerce transaction includes funding of the adjudicating of the dispute to resolution. It may be agreed upon in advance of finalizing an e-commerce transaction giving rise to a dispute to select the level and electronically process the dispute resolution by electronic agreement. The level selecting step may include a mutual agreement by parties involved in the dispute to a particular level for adjudicating the dispute before or after the transaction is finalized. In disputes involving smaller amounts, a level of reduced procedural options may be used such that the parties involved in the dispute are limited to the vendor and purchaser of one or more products.

A system, software and method of electronically adjudicating a dispute are further provided, the method including selecting an electronic dispute adjudication level from multiple levels providing various extents of procedural options involved in the adjudicating of the dispute, and electronically processing the adjudicating of the dispute in accordance with the selected level including electronic filing of each of a complaint, an answer to the complaint, and final argument submissions by parties involved in the dispute.

The electronic processing may further include an electronic summons being communicated to a defendant. The electronic processing may also include electronic submission of an extension of time. The electronic processing preferably includes generating a dispute resolution web page accessible by parties involved in the dispute and an internet adjudicator. A final judgment rendered by a internet adjudicator may be posted to the dispute resolution web page.

Any of the following may depend on, or vary depending on, the selected level:

a maximum permitted length of one or more of the complaint, the answer to the complaint and the final argument submissions may vary depending on the selected level;

whether sub-paragraphs containing specific factual allegations are permitted in the complaint;

whether defendant is required to pay for follow-up notice when defendant fails to acknowledge receipt of electronic summons in a predetermined time;

whether the answer may include pre-answer motions or other responses than the answer;

whether the answer may include cross-claims against co-parties;

whether the answer may include counterclaims, and when counterclaims are permitted and included in the answer, the maximum permitted length of the reply to the counterclaims in the answer may vary depending on the selected level;

whether any motions other than extraordinary motions are permitted;

whether any motions other than extraordinary motions and motions to compel discovery are permitted;

whether amendments to the pleadings are permitted;

whether an internet adjudicator may direct parties involved in the dispute to partake in one or more pre-final argument submission e-conferences;

whether a motion for summary judgment is permitted;

whether case law submissions are permitted as attachments to the final submission;

whether objections to evidence are permitted;

whether expert opinion evidence is particularly admissible;

whether recovery of fees by defendant vendor is permitted;

whether reconsideration of final judgment permitted;

the criteria for the internet adjudicator to use in determining whether to grant of an extension of time may vary depending on the selected level; and whether extraordinary circumstances are included in criteria for the internet adjudicator to use in determining whether to grant an extension of time.

A system, software and method of electronically adjudicating a dispute are further provided, the method including selecting an electronic dispute adjudication level from multiple levels providing various extents of procedural options involved in the adjudicating of the dispute, and electronically processing the adjudicating of the dispute in accordance with the selected level, including generating a dispute resolution web page accessible by parties involved in the dispute and a internet adjudicator.

The electronic processing may include posting discovery at the dispute resolution web page. The electronic processing may further include electronic negotiation between the parties involved in the dispute at a private chat location of the dispute resolution web page. The electronic processing further including electronic mediation between the parties involved in the dispute and an impartial mediator at a mediation location of the dispute resolution web page.

Whether voluntary discovery is permitted at all may depend on the selected level. When voluntary discovery is permitted at the selected level, whether depositions are permitted voluntary discovery may depend on the selected level. Moreover, when voluntary discovery is permitted at the selected level, a maximum number of permitted written interrogatories, requests for admissions and/or requests for production of documents and/or tangible items may depend on the selected level.

A system, software and method of electronically adjudicating a dispute are further provided, the method including selecting an electronic dispute adjudication level from multiple levels providing various extents of procedural options involved in the adjudicating of the dispute, and electronically processing the adjudicating of the dispute in accordance with the selected level. The electronic processing includes electronically receiving submissions from parties, involved in the dispute, electronically communicating results of the electronic receiving step to an impartial review entity for administering a resolution of the dispute, and electronically reporting the resolution of the dispute. The electronic reporting may include publishing a decision relating to resolution of the dispute.

A system, software and method of electronically adjudicating a dispute are further provided, the method including selecting an electronic dispute adjudication level from multiple levels providing various extents of procedural options involved in the adjudicating of the dispute, and electronically processing the adjudicating of the dispute in accordance with the selected level. The electronic processing includes electronically receiving submissions from parties involved in the dispute, electronically communicating results of the electronic receiving step to a party involved in the dispute for taking further action based on one or more submissions, and electronically reporting a result of action taken by the party based on the one or more submissions.

A system, software and method of electronically adjudicating a dispute are also provided, the method including selecting an electronic dispute adjudication level from multiple levels providing various extents of procedural options involved in the adjudicating of the dispute, and electronically processing the adjudicating of the dispute in accordance with the selected level. The level selecting is based on at least one of an amount in dispute and a decision by one or more parties involved in the dispute to adjudicate at the selected level.

The method may further include determining an amount in dispute. The amount in dispute may be determined based on a purchase price for products sold. The purchase price may or may not include costs of the transaction and/or interest from the time of the transaction. The purchase price may also be defaulted as an amount on an invoice corresponding to the transaction. The determining of the amount in dispute may involve determining a value of an e-commerce transaction giving rise to the dispute, and it may involve determining an amount prayed for in relief with a filing of a complaint. The level may also be selected at the time of an e-commerce transaction.

A software-based system for adjudicating a dispute includes multiple computer processors communicating over a network and running software that provides multiple levels of electronic dispute adjudication providing various extents of procedural options involved in the adjudicating of the dispute and corresponding to at least one of an amount in dispute and a decision by one or more parties involved in the dispute to adjudicate at the selected level. The adjudicating is electronically processed. The multiple levels include a first level corresponding to a first range of amounts in dispute, and a second level corresponding to a second range of amounts in dispute higher than the first range. The second level provides enhanced procedural options to parties involved in the dispute compared with the first level.

The software may also provide instructions to one or more of the processors to select one of the electronic dispute adjudication levels of the multiple levels, and to electronically process the adjudication of the dispute in accordance with the selected level. The level selection may correspond to one or more of an amount in dispute and a decision by one or more parties involved in the dispute to adjudicate at the selected level. The electronic processing may include electronically filing each of a complaint, an answer to the complaint, and final argument submissions by parties involved in the dispute. The electronic processing may include electronically receiving submissions from parties involved in the dispute, electronically communicating results of the electronic receiving step to an impartial review entity for administering a resolution of the dispute, and/or electronically reporting the resolution of the dispute. The electronic processing may also include generating a dispute resolution web page accessible by parties involved in the dispute and a internet adjudicator.

The enhanced procedural options provided at the second level may include any of:

providing counterclaims in an answer to a complaint;

motions to compel discovery other than in a extraordinary motion;

voluntary discovery;

attaching case law to a final argument submission;

raising objections to evidence;

motion for reconsideration of a final judgment; and requesting for extension of time not requiring extraordinary circumstances.

A software-based system for adjudicating a dispute is also provided including multiple computer processors communicating over a network and running software that provides multiple levels of electronic dispute adjudication providing various extents of procedural options involved in the adjudicating of the dispute and corresponding to at least one of an amount in dispute and a decision by one or more parties involved in the dispute to adjudicate at the selected level. The adjudication is electronically processed. The multiple levels include a first level corresponding to a first range of amounts in dispute, a second level corresponding to a second range of amounts in dispute higher than the first range, and a third level corresponding to a third range of amounts in dispute higher than the first and second ranges. The second level provides enhanced procedural options to parties involved in the dispute compared with the first level, while the third level provides enhanced procedural options to parties involved in the dispute compared with the first and second levels.

The multiple levels may further include a fourth level corresponding to a fourth range of amounts in dispute higher than the first, second and third ranges. The fourth level may provide enhanced procedural options to parties involved in the dispute compared with the first, second and third levels. The procedural options provided at the fourth level may correspond substantially to options provided by the federal rules of civil procedure.

The software may also provide instructions to one or more of the processors to select one of the electronic dispute adjudication levels of the multiple levels, and to electronically process the adjudication of the dispute in accordance with the selected level. The level selection may correspond to one or more of an amount in dispute and a decision by one or more parties involved in the dispute to adjudicate at the selected level. The electronic processing may include electronically filing each of a complaint, an answer to the complaint, and final argument submissions by parties involved in the dispute. The electronic processing may include electronically receiving submissions from parties involved in the dispute, electronically communicating results of the electronic receiving step to an impartial review entity for administering a resolution of the dispute, and/or electronically reporting the resolution of the dispute. The electronic processing may also include generating a dispute resolution web page accessible by parties involved in the dispute and a internet adjudicator.

The enhanced procedural options provided at the second level may include any of:
  providing counterclaims in an answer to a complaint;
  motions to compel discovery other than in a extraordinary motion;
  voluntary discovery;
  attaching case law to a final argument submission;
  raising objections to evidence;
  motion for reconsideration of a final judgment; and
  requesting for extension of time not requiring extraordinary circumstances.

The enhanced procedural options provided at the third level may include any of:
  filing pre-answer motions;
  filing cross-claims in an answer to a complaint;
  amending pleadings;
  holding a pre-final argument submission hearing;
  taking depositions;
  making motions for summary judgment;
  providing expert opinion testimony; and
  recovery of fees by defendant vendor.

The enhanced procedural options provided at the second level are preferably also provided at the third level, and these options may be provided at the third level and not the second level. Moreover, the enhanced procedural options provided at the third level may also be provided at the second level. One or more of the enhanced procedural options of the second and third levels may be provided at the first level and/or at a fourth or higher level.

BRIEF DESCRIPTION OF THE DRAWINGS

FIG. 7 illustrates differences in procedural options between levels 1 and 2 according to a preferred embodiment.

FIG. 8 illustrates differences in procedural options between levels 2 and 3 according to a preferred embodiment.

FIG. 9 illustrates differences in voluntary discovery options between levels 2 and 3 according to a preferred embodiment.

FIG. 10 illustrates differences in lengths of documents between levels 1, 2 and 3 according to a preferred embodiment.

INCORPORATION BY REFERENCE

Figure 1:
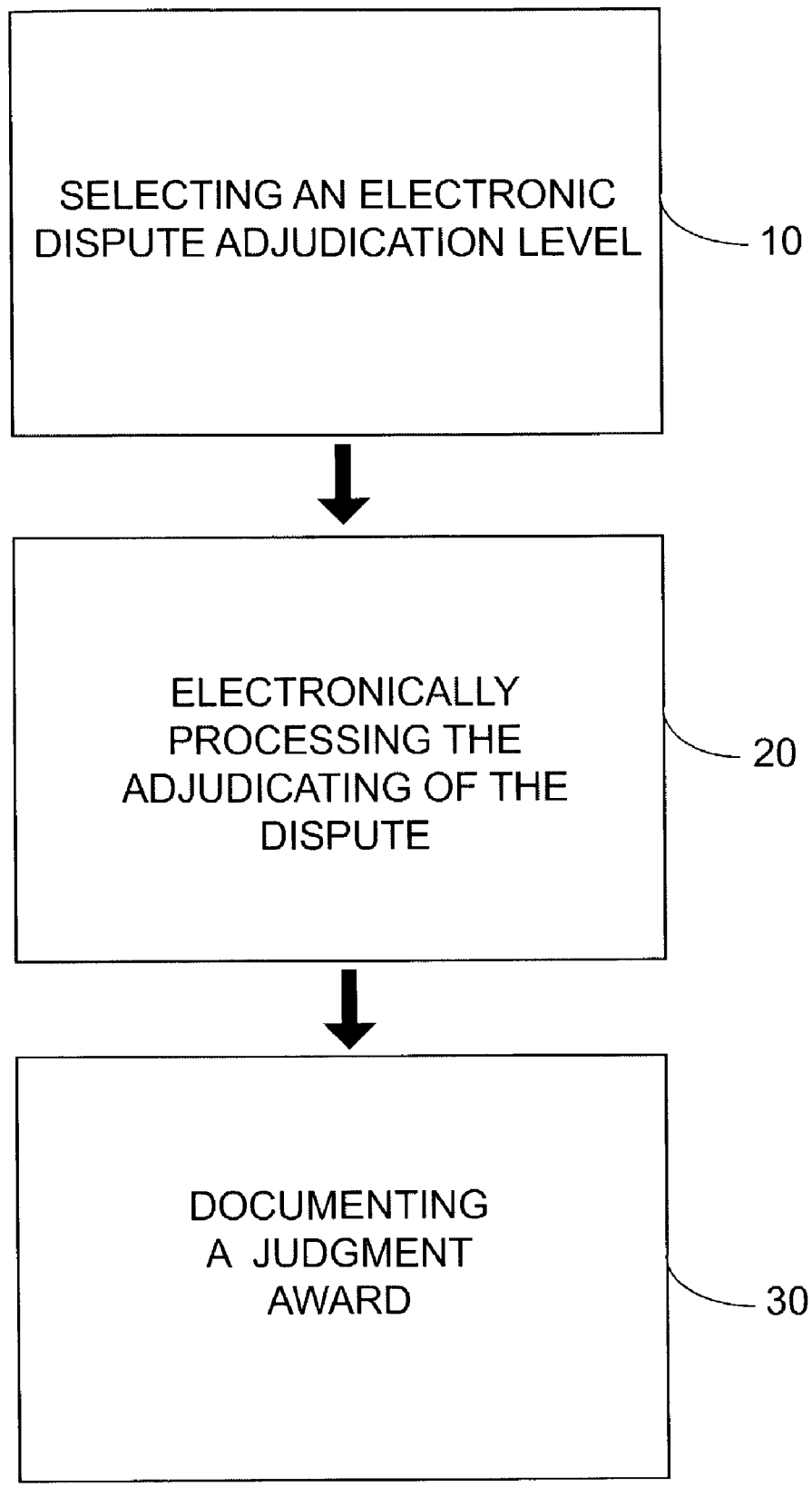
FIG. 1 illustrates steps in adjudicating a dispute according to a first preferred embodiment.

What follows is a cite list of references each of which is, in addition to that which is described as background and the invention summary, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. Nos. 6,375,466, 6,502,081, 6,330,551 and 5,895,480; and

U.S. patent application Ser. No. 60/375,085, by the same Applicants as the present application.

DETAILED DESCRIPTION OF THE PREFERRED EMBODIMENT

What follows is a description of the preferred embodiments beginning with an overview of features. Next, a description of the preferred methods and systems according to the preferred embodiments are described with reference to FIGS. 1-10. Finally, detailed sets of preferred rules for levels 1-3 are provided.

Overview of Features

The preferred embodiments described below provide dispute resolution systems and methods through which parties involved in an e-commerce dispute may arbitrate using specific rules of procedure and specific rules of substantive law. The parties generally will agree in advance of finalizing an e-commerce transaction to use the dispute resolution system and method, as each possesses a motivation at the outset of the transaction to settle any dispute that may arise with a fair, speedy and inexpensive resolution. The parties may otherwise agree after the transaction and before the arbitration.

For example, an advance agreement to arbitrate can be according to a page at the vendor web-site associated with a transaction such as the following:

"SIGNING THE AGREEMENT TO ARBITRATE. Please understand that you are deemed to have "signed" the Agreement to Arbitrate once you click 'I Agree.' when prompted, and as a result you are bound by the Agreement set forth below. This means that you are giving up your right to have this case heard by a competent state or federal court and instead are agreeing to have your dispute resolved in accordance with our rules. Note that both parties must sign the Agreement to arbitrate for it to have effect (a vendor may have already agreed to arbitrate and posted this for purchasers at its site)

The Agreement to Arbitrate

By Clicking "I Agree" When Prompted, the Parties Are Putting Their Official Legal Signatures on the Following Agreement to Arbitrate.

Those "Electronic Signatures" Mean that the Parties Are Legally Bound by This Agreement to Arbitrate and the Applicable Arbitration Provisions and Rules of Adjudicative Procedure.

By Providing Their Signatures, The Parties Certify That They Understand This Agreement, and that They Understand that the Following Definitions and the Rules of Adjudicative Procedure Will Be Applicable to Any Dispute that May Occur Between Them Arising Out of Their Internet Transaction.

Your electronic signature means that you are stating the following to your co-party and to us:

By entering into this Agreement over the Internet, I, as a buyer or seller in an e-commerce transaction, promise and agree that any and all disputes which may arise out of, or as a result of, my e-commerce transaction shall be resolved through the use of the legal rules provided herein as they appear on this website.

A copy of the Definitions and Rules and applicable charges are posted on this website, together with an explanation as to how someone can avoid use of the Arbitration services and applicable provisions and rules, if desired. The Agreement to Arbitrate will appear on the vendor website and can be entered into by the purchaser and vendor from either site."

A dispute resolution system and method according to a preferred embodiment provides specific known and/or acceptable rules of procedure for dispute resolution, specific, known and/or acceptable rules of substantive law to be applied in dispute resolution, and an independent electronic forum through which the resolution of disputes can fairly take place. The rules of procedure are preferably based on the Federal Rules of Civil Procedure. There will be various levels of complexity to the rules depending on the monetary amount in dispute or corresponding to a level selected by one or more parties to the dispute. The substantive rules dealing with the sale of goods and services and transfer of funds will be preferably based on a version of the Uniform Commercial Code. All rules of procedure and substantive rules are preferably posted at a dedicated website.

Levels of Procedural Rules

There are preferably two to four levels of procedural rules, although there may be more, and there may also be only a single streamlined level of rules. In the preferred embodiment, there are three levels having successively reduced procedural options compared with a fourth level corresponding substantially to the federal rules of civil procedure. Some preferred distinctions between the levels are illustrated at FIGS. 7-10 and described below, while the specifically preferred rules that make up these three levels are provided further below herein. The amount in dispute preferably scales with the amount of procedural options available to the parties involved in the dispute and the internet adjudicator. One or more parties may alternatively agree to arbitrate at a different level that has been deemed appropriate to the amount in dispute. For example, the first level may be used for disputes involving up to $5,000 in value. The second level may be used with disputes involving between $5,000 and $25,000. The third level may be used with disputes involving between $25,000 and $75,000. The fourth level may be used for disputes involving over $75,000. These four categories of rules are preferably based on the Federal Rules of Civil Procedure. The first set of rules will be the most streamlined and will resolve the most commonly encountered disputes in consumer transactions. The rules become increasingly complex with each increase in jurisdictional amount. The final set are the most complex and the most like the Federal Rules.

Cost and Submission of Evidence

There are a few alternative ways that costs for resolution of the dispute will be preferably paid. A preferred way is to have the vendor and purchaser agree in advance that a small percentage of the purchase price will be allocated to dispute resolution. The vendor may agree to pay this percentage in advance, allocate some amount of it to the purchase price, and require the purchaser to agree to arbitrate according to the form above, or similar click-through form. In the event that a dispute must later be resolved, then no additional costs or nominal or relatively low costs will be further needed to resolve the dispute. The dispute resolution choice of law and forum, as well as the agreement to pay the small percentage of the purchase price, can all be provided at a vendor site. This small, additional cost will be reflected in the price of the product sold and/or as an expense of the vendor. Alternatively, parties can mutually agree to resolve a dispute using the System, and in this case, costs may be paid equally by all participants. The cost would be based on the amount in dispute. The more in dispute, the more the cost. An effort will be preferably made to accurately determine fixed costs which accurately reflect the true cost of the dispute resolution. Fixed costs, as contrasted to hourly costs, will allow potential advisories to properly determine the cost of dispute resolution and weigh the pragmatics of going forward. Certain forms of dispute resolution will be separately priced, e.g., open-ended mediation, or fourth level dispute resolution involving, e.g., a full, in person evidentiary hearing. At least the majority of the dispute resolution procedure will be conducted on-line with advisories submitting evidence and arguments through the Internet.

There is a cost to one or more parties for using the system and method of the preferred embodiment, just as there is a cost to using most courts in the industrialized world. Before beginning a case, parties should consider whether the amount they will be spending is worth the amount they stood to save or recover in the case. The System will determine the respective rights and obligations of parties, deciding which party, if any, possesses a right to recovery. At the end of the dispute, if a party receives a favorable decision, the party will receive a judgment that can be used to collect any money owed to it by the other party.

A cost-effective and predictable option is for parties to purchase dispute resolution "insurance" for each Internet, e-commerce transaction. For less than 1% per transaction, the parties will be assured that if a dispute arises, the system and method of the preferred embodiment will be available to resolve the dispute at little or no additional cost.

Discovery

Discovery will be limited as it currently is under the Federal Rules. Unlike the Federal Rules the party seeking the specific form of discovery will be responsible for paying the full cost of the discovery, particularly if and when certain forms of voluntary discovery are permitted. As an example, in the event one party chooses to take a deposition, which is permitted at level 3 in the exemplary rules provided below, that party will be responsible for all costs of the deposition, including furnishing the adverse party with a copy of the transcript or video tape. The extent to which certain forms of discovery are permitted and the maximum allowed extent, length or amount of such discovery will generally depend on the level of adjudication.

Mechanism of Dispute Resolution

The vast majority of disputes are finally resolved by one arbitrator in the System and method. The majority of disputes and all conventional disputes will be resolved through submission of documents and statements the parties are required to submit and may wish to submit in cases where such submissions are allowed. There will be specific deadlines for submissions. Many disputes, and all conventional disputes, can be resolved through review of the documents and statements. Human nature is such, however, particularly on the part of someone who takes the position of an aggrieved consumer, it would be therapeutic and in the interest of providing the opportunity for full presentation to allow each party the opportunity for brief oral argument and testimony which can take place in a manner similar to an Internet chat room, or can take place through a telephone conference call. The oral presentations will be subject to time constraints. For disputes resolved under levels one through three of the rules a party can request more then one arbitrator—three, five or seven— with the party requesting the additional arbitrators paying the cost, unless, of course, the parties agree to split the cost.

In general, however, formal submissions such as the complaint, summons, answer, motions, requests, discovery submissions, final argument submissions, etc., will be submitted electronically and stored at a dedicated dispute resolution web site. They will be submitted preferably over the Internet or other network, and all submissions and communications will be preferably in a common language such as English. Cases originating from countries all over the world can be handled by the System. Likewise, submission of all writings, evidence and oral presentations of the parties will be in English or the designated language for that dispute. If a writing was originally created in another language, the party submitting the writing shall provide a proper translation. Translation services may be provided by the System.

Impartial Arbitrator/Internet Adjudicator

The System will be generally run by a private corporate entity. It will structure the procedural and substantive rules and enter into one or more contracts with such entities as the Institute of Administrative Justice at McGeorge School of Law, which will handle the arbitration. The Institute of Administrative Justice or other such entity will be preferably responsible for actually adjudicating the disputes. The software and hardware necessary to the function of the program and its maintenance, hosting, etc., will be handled by the private corporate entity in consultation with the IAJ for consideration of their needs. As an independent body, IAJ will be insulated from the economic pressures and other influence which could adversely affect adjudication. The IAJ will be compensated for providing its services.

The IAJ or other entity will provide Internet adjudicators who will resolve the disputes on-line through the system of the preferred embodiment. The IAJ is preferred to be the entity for providing the internet adjudicators because it has gained national recognition as a leading expert on dispute resolution practices. It provides administrative hearings, training and consultation for among others, the United States Department of Agriculture, Department of Transportation, National Institute of Justice, Social Security Administration, and United States Army. It provides the same work for State of California Department of Education, Department of Food and Agriculture, Department of General Services, Department of Motor Vehicles and numerous other agencies. It also does similar work for the City of New York, Massachusetts Department of Social Services, Washington State Department of Social and Health Services and the New York State Court System. It employs a professional staff of attorneys aided by highly trained support personnel to conduct all aspects of dispute resolution. The Internet adjudicators are not employees of the private corporate entity responsible for the maintenance and hosting of the electronic and software-based system of the preferred embodiment, but are contracted through the IAJ to provide their dispute resolution services to parties wishing to resolve a dispute. This expertise and independence assures all parties involved that their disputes will be handled by experts with many years of successful experience in dispute resolution who are independent and without conflicts of interest.

Appeals

Generally, appeals is permitted under certain appellate rules to a panel of three, with the party seeking the appeal paying the full cost of the appeal. A provision could exist allowing any party dissatisfied with a level three decision the right to apply into a specific U.S. Federal District Court. The court's review, however, will be limited to determining whether the procedures were properly followed, and as such little would be accomplished, except to advise the parties each were heard pursuant to the rules each agreed to.

Advantages

Some advantages of the system of the preferred embodiment include the provision of online mediation and online full resolution arbitration for disputes. Such disputes may be over small or large amounts and may involve any of a wide range of values to parties. Such disputes may arise from sale of goods, or mixed goods and services, such as airline tickets, taking place on the Internet. The system of the preferred embodiment is moreover provided entirely or substantially online.

The system of the preferred embodiment is governed by a distinct, comprehensive set of procedural rules based on the Federal Rules of Civil Procedure which vary in complexity, including multiple sets of rules that are streamlined from the Federal Rules, generally dependent on the value of the transaction at issue. Alternative rules may be dependent on the parties and the nature of the dispute before it. Further alternatives would allow the parties to select the rules to be used, but at the expense of uniformity and predictability of result.

The system of the preferred embodiment includes a codified set of rules of evidence which allow submission of all or substantially all evidence electronically (generally not including tangible evidence). Any alternative system lacking a set of rules governing submission of evidence would also lack predictability of result.

The system of the preferred embodiment segments market elements from the dispute resolution process. The principal marketing, pricing and revenue generation is accomplished through one entity, while actual decisions regarding resolution of disputes are accomplished through an independent entity or Internet Adjudicator, e.g., the Institute for Administrative Justice based on the campus of the University of Pacific's McGeorge School of Law. By being isolated from the marketing of the service and the actual generation of revenue, the Institute for Administrative Justice is shielded from commercial pressures that may otherwise influence its decisions. For example, the dispute resolution entity will be preferably unaware of which of the parties before it in a dispute, if any, may be principally responsible for paying its fees. As such it is a step further from economic pressures exerting influence on its decisions than an alternatively integrated economic-adjudicative entity might be.

The system of the preferred embodiment is preferably funded principally by a small percentage charged for each transaction of a participating vendor and buyer. An alternative would be a fee for service based system. In some respects, it is like an insurance premium charged on each transaction. Since the premium is levied on the transaction it is 'charged' to neither the seller nor buyer, but is simply a cost of the transaction bore by both.

Illustrative System and Methods

FIG. 1 illustrates steps in adjudicating a dispute according to a first preferred embodiment. A first step 10 in resolving a dispute according to the first preferred embodiment is selecting a dispute resolution level from among multiple levels that provide various extents of procedural options. The multiple levels are illustrated at FIGS. 7-10 and corresponding descriptions below, and as gradations 1, 2 and 3 further below. Following the first step 10, the next step 20 is to electronically process the resolution of the dispute according to the selected level. This step 20 preferably involves the filing of electronic formal documents such as the complaint, answer and final submissions, as well as electronic communication of a summons to the defendant. Step 20 may involve the generation of a dedicated dispute resolution web-site where the documents and discovery may be posted, as well as discovery requests and motions, and decisions of the internet adjudicator. Step 20 may include further electronic processing steps described elsewhere herein. Step 30 involves final resolution of the dispute, preferably including documenting a judgment award in accordance with the final resolution permitting reduction to an enforceable judgment, and alternatively documenting an enforceable judgment award in accordance with the final resolution.

Figure 2:
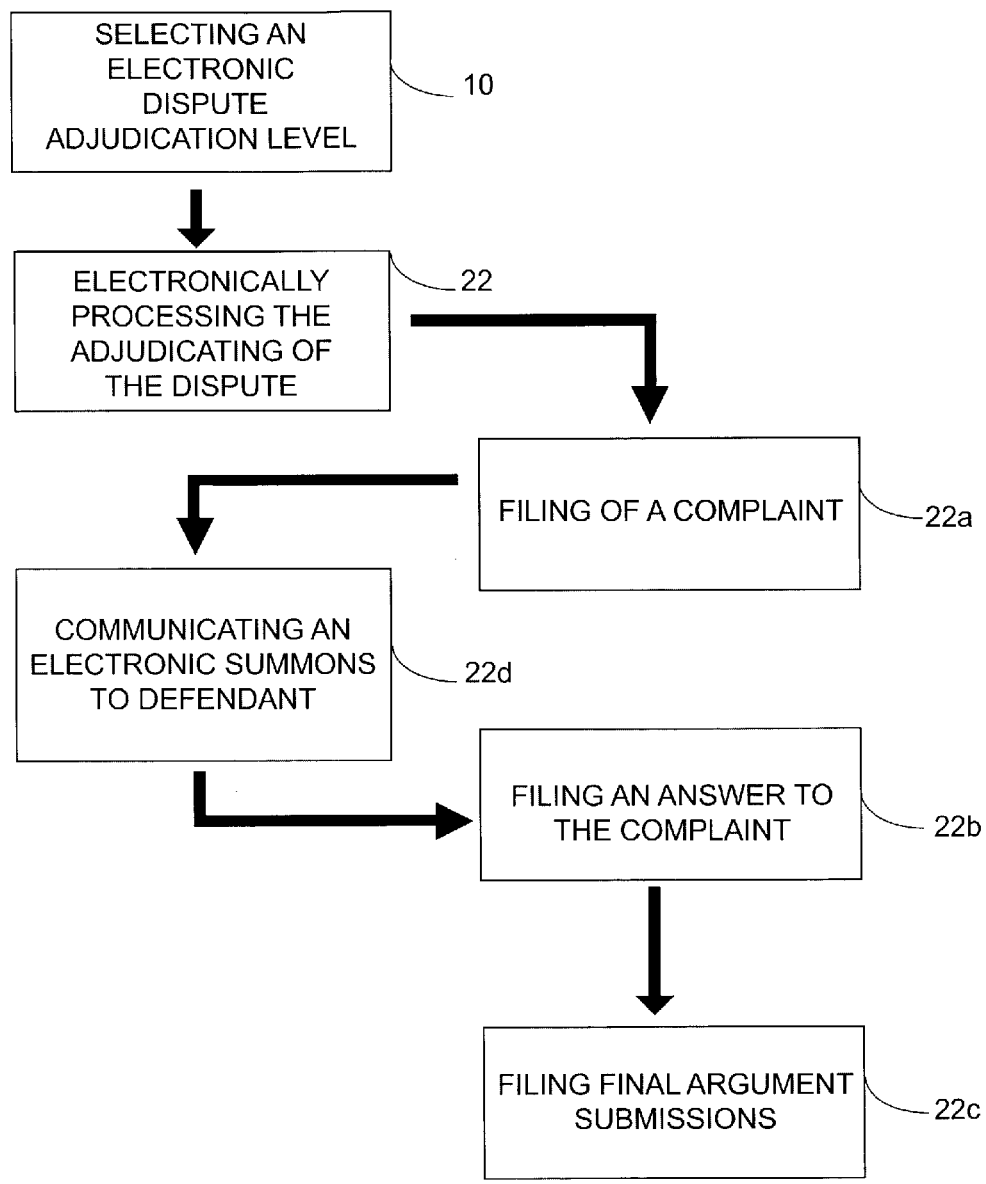
FIG. 2 illustrates steps in adjudicating a dispute according to a second preferred embodiment.

FIG. 2 illustrates steps in adjudicating a dispute according to a second preferred embodiment. This embodiment begins with the step 10 of selecting the dispute adjudication level. A next step 22 involves the electronic processing of the dispute according to the selected level. This step 22 generally includes a step 22a involving the electronic filing and/or receiving of a complaint, a step 22b involving the electronic filing and/or receiving of an answer, and a step 22c involving the electronic communication of final argument submissions by parties involved in the dispute. The electronic processing step 22 preferably further includes a step 22d of electronically communicating a summons to the defendant. Further electronic processing steps described elsewhere herein are also preferably performed.

Figure 3:
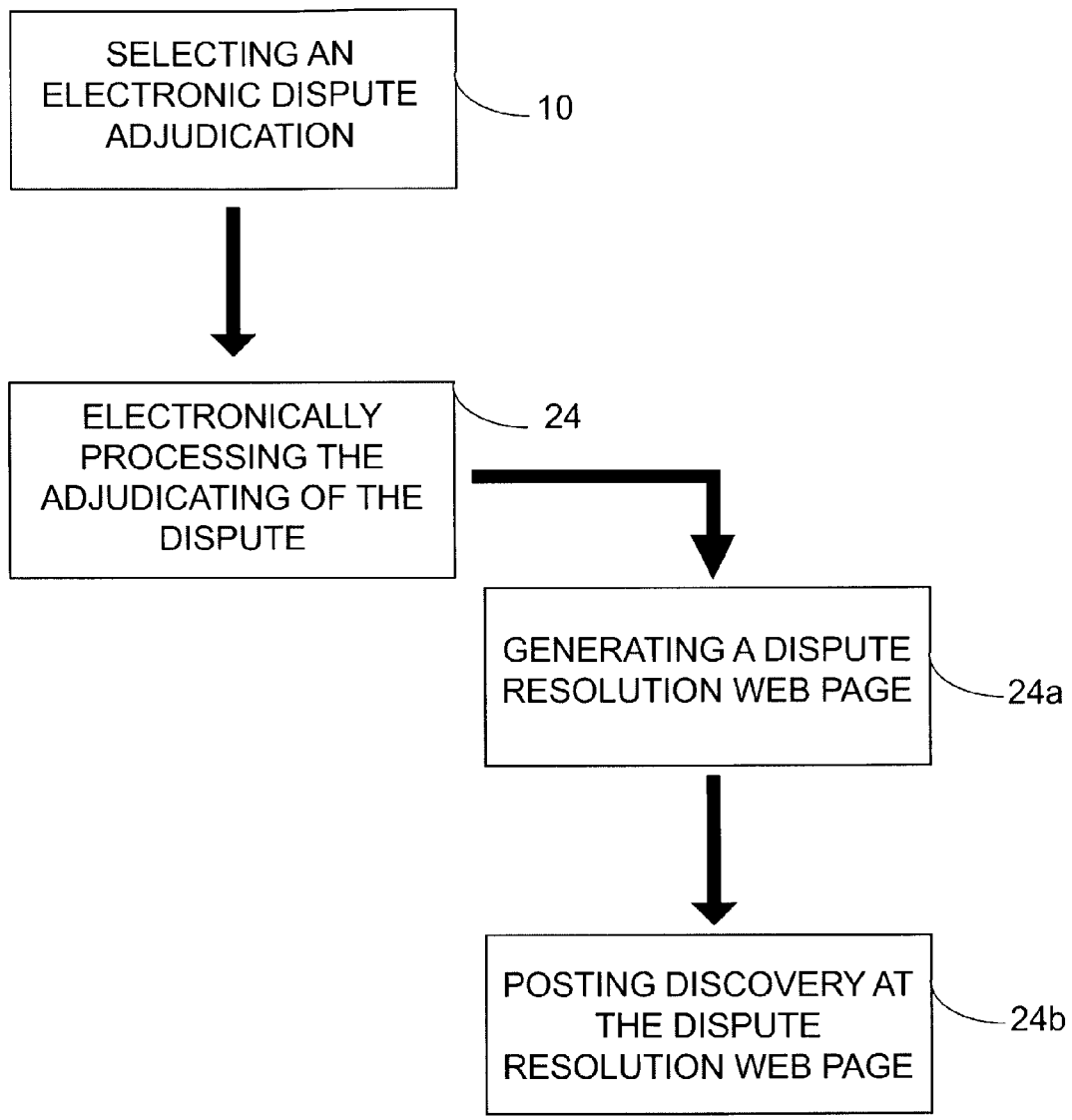
FIG. 3 illustrates steps in adjudicating a dispute according to a third preferred embodiment.

FIG. 3 illustrates steps in adjudicating a dispute according to a third preferred embodiment. This embodiment also begins with the step 10 of selecting the dispute adjudication level. A next step 24 involves the electronic processing of the dispute according to the selected level. This step 24 generally includes a step 24a of generating a dispute resolution web page where formal documents such as the complaint and answer, discovery, final submissions, etc., may be posted, generated and/or communicated, as well as discovery requests and motions, and decisions of the internet adjudicator.

Figure 4:
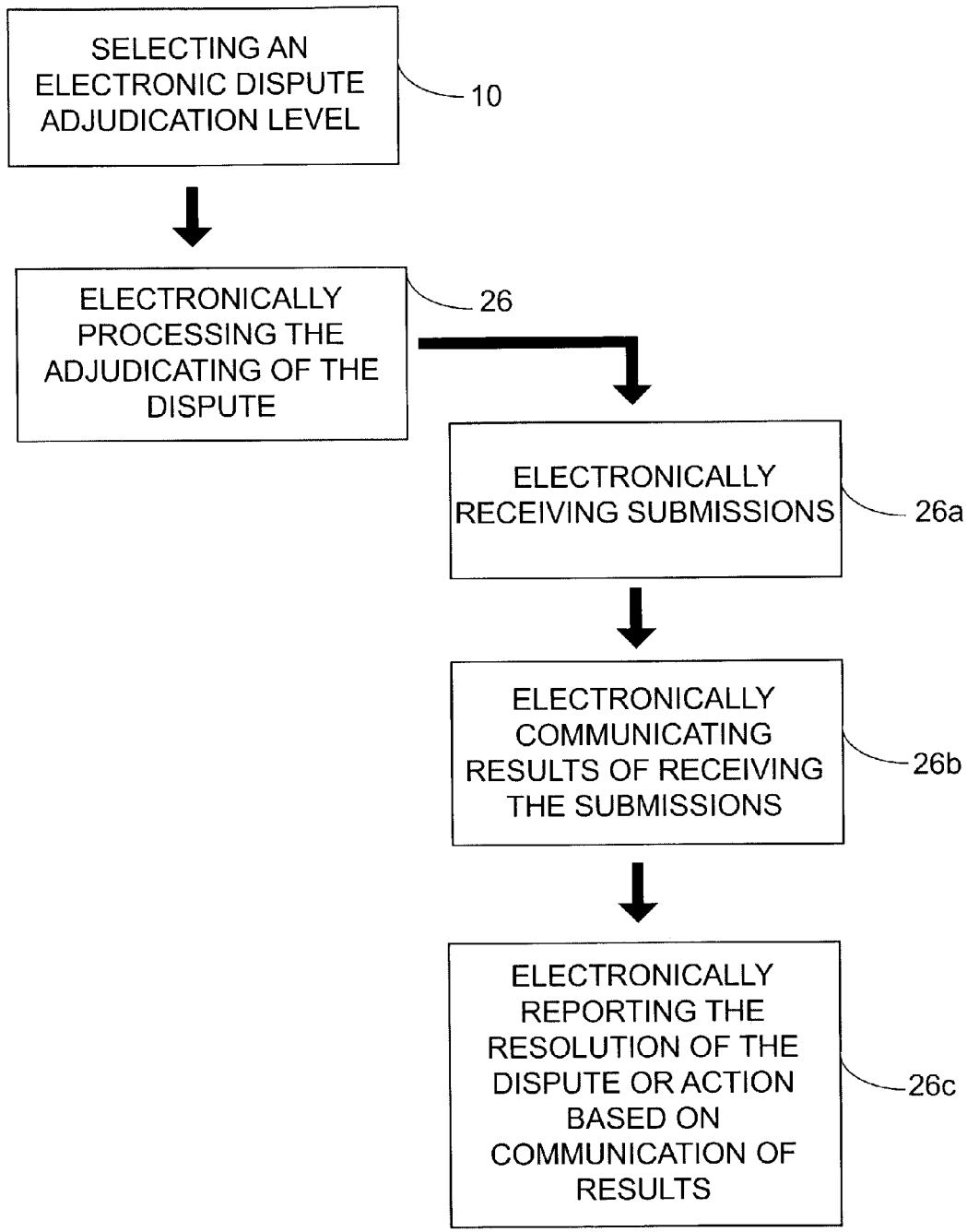
FIG. 4 illustrates steps in adjudicating a dispute according to a fourth preferred embodiment.

FIG. 4 illustrates steps in adjudicating a dispute according to a fourth preferred embodiment. This embodiment also begins with the step 10 of selecting the dispute adjudication level. A next step 26 involves the electronic processing of the dispute according to the selected level. This step 26 generally includes a step 26a of electronically receiving submissions from parties involved n the dispute, a step 26b of electronically communicating the received submissions to an impartial review entity for administering a resolution of the dispute and/or to other parties who must act based on the submission, and a step 26c electronically reporting at least one of the resolution of the dispute and results of actions taken by a party based on the submission.

Figure 5:
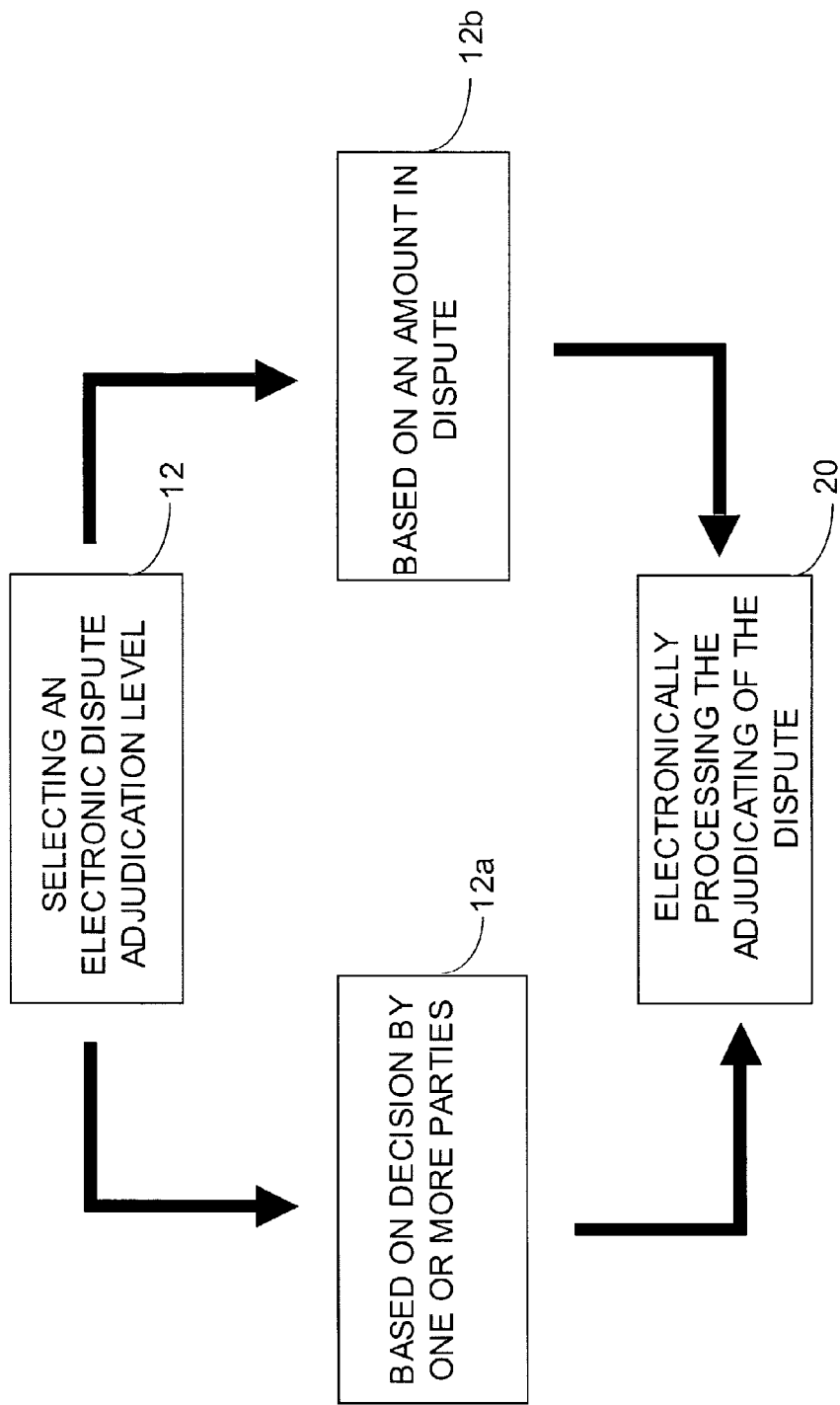
FIG. 5 illustrates steps in adjudicating a dispute according to a fifth preferred embodiment.

FIG. 5 illustrates steps in adjudicating a dispute according to a fifth preferred embodiment. This embodiment begins with the step 12 of selecting the dispute adjudication level. This step 12 generally involves either a step 12a including a decision by one or more parties to resolve the dispute at the selected level, or a step 12b including determining an amount in dispute and selecting the level based on the amount in dispute. Following the first step 12 involving either of steps 12a or 12b, the next step 20 is to electronically process the resolution of the dispute according to the selected level. This step 20 preferably involves the filing of electronic formal documents such as the complaint, answer and final submissions, as well as electronic communication of a summons to the defendant. Step 20 may involve the generation of a dedicated dispute resolution web-site where the documents and discovery may be posted, as well as discovery requests and motions, and decisions of the internet adjudicator. Step 20 may include further electronic processing steps described elsewhere herein. Step 30 involves final resolution of the dispute, preferably including documenting an enforceable judgment award.

Figure 6:
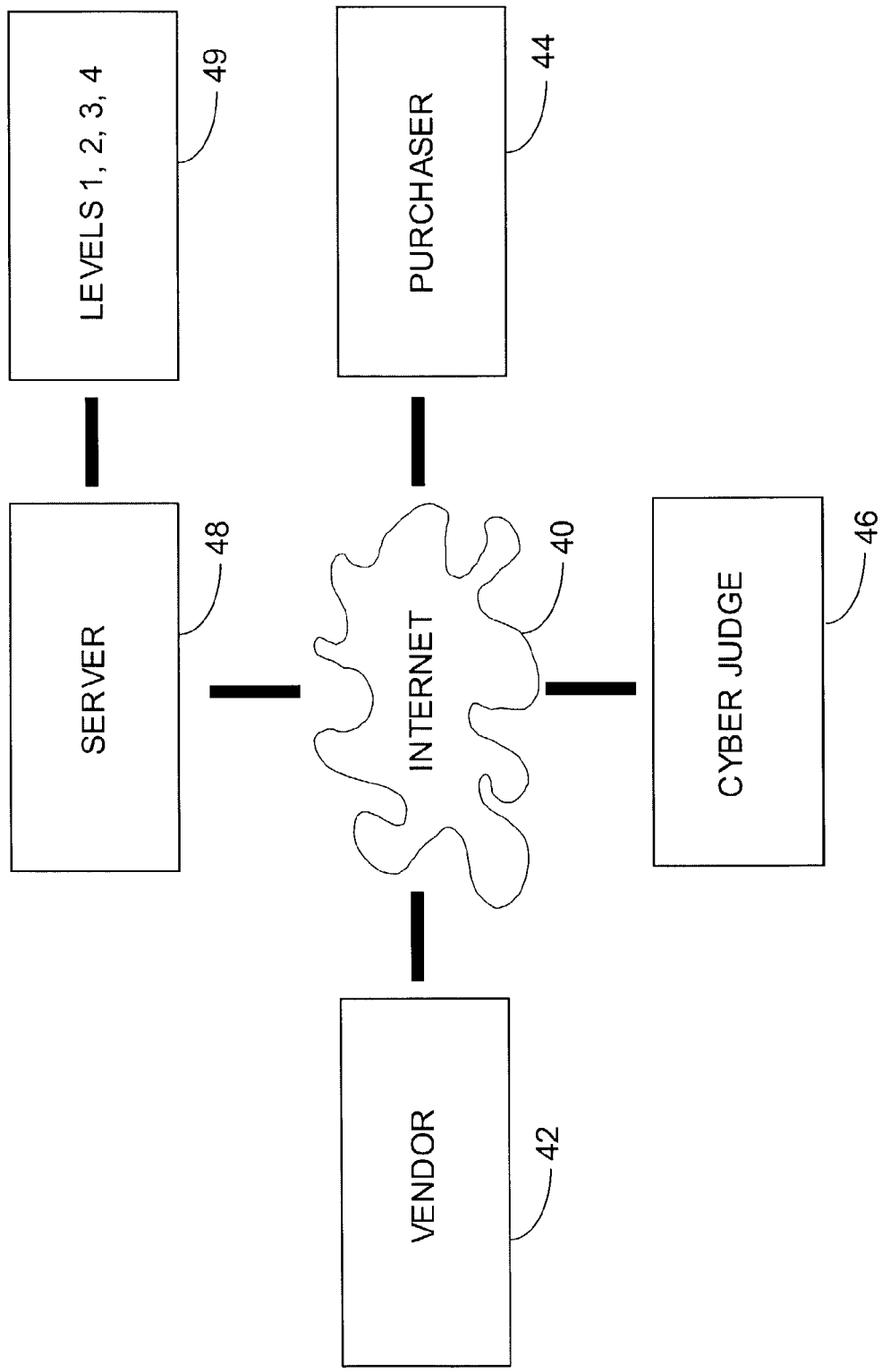
FIG. 6 schematically illustrates a computer network according to a preferred embodiment.

FIG. 6 schematically illustrates a computer network according to a preferred embodiment. The computer network shown preferably involves communication of documents, requests, motions, decisions, discovery, etc., using the internet 40 or other network. A vendor 42 or first party and a purchaser 44 or second party, as well as a internet adjudicator 46, have access to computing devices that in turn can access the internet 40. A server 48 (or other computing device) preferably hosts a web site containing dispute resolution pages and software that either runs on the server 48 or is downloaded from the server 48 to another server, e.g., to become part of vendor sites. The vendor device 42, purchaser device 44 and internet adjudicator device 46 will have browser capabilities for accessing the site. The server 48 or other server or other computing device includes the stored software 49 and electronic storage and communication capacity that provides the dispute resolution backbone such as rules, forms, discovery storage spaces, communication protocols, etc., for each of the dispute resolution levels.

FIG. 7 illustrates differences in procedural options between levels 1 and 2 according to a preferred embodiment. Note that FIG. 7 is illustrative as are corresponding gradations 1 and 2 described further below. The distinctions between levels 1 and 2, as well as between levels 2 and 3, 3 and 4, etc., may be altered and modified from the illustrative examples provided herein either generally, or in some cases, according to customized dispute resolution rules designed for particular vendor sites or even for particular disputes. The selected distinctions are advantageous, however, as streamlining the process where appropriate for simplified adjudication at lower levels, and as providing enhanced procedural options where appropriate to allow, e.g., more in-depth fact-finding and/or greater access to motions, requests, hearings, etc., at higher levels. Note that at least in most cases, where a distinction is drawn between level 1 and level 2, higher levels such as levels 3 and 4 will also include the enhanced procedural options pointed out as being available at level 2 compared with level 1. In some cases, levels 3 and/or 4 will in addition include further procedural options over and above those provided at level 2.

FIG. 7 illustrates that level 1 may be streamlined such to not allow counterclaims to be provided in answering a complaint, while levels 2 and higher do allow counterclaims in the answer. Allowing counterclaims can generally add greater complexity to resolving the dispute if such counterclaims are presented by the defendant. When counterclaims are allowed, e.g., at levels 2 and higher, then defendant must bring them or be stopped from bringing them in a later action, whereas when counterclaims are not allowed, e.g., at level 1, then defendant may bring those counterclaims in its own action at another time if it wishes. Options may be made available to defendants who wish to adjudicate at, e.g., level 2, in order to get counterclaims into the case, in the event that the amount in dispute or previous agreement may provide for adjudication at level 1. For example, defendants may be allowed to pay a certain fee. Plaintiff may want to avoid a later suit based on the counterclaims, or provide a forum for collateral estoppel, and mutually agree with defendant or unilaterally decide to adjudicate at the higher level. In order to avoid this, a vendor may require that level 2 be the lowest level at which disputes arising from sales of vendor's products may be adjudicated, or simply that counterclaims will be allowed at level 1.

FIG. 7 illustrates another streamlining of procedure at level 1 by allowing only extraordinary motions. Extraordinary motions are granted subject to the discretion of the internet adjudicator. In the example illustrated by the table of FIG. 7, level 2 also includes limitations on motions that may be raised. Level 2 permits only extraordinary motions and motions to compel discovery. As can be seen from FIG. 8, level 3 is the first level at which many motions are permitted, such as most of the motions that persons accustomed to using the federal rules of civil procedure may be familiar with having available.

Another procedural limitation for streamlining the process at level 1 is that voluntary discovery is not permitted. Thus, depositions, interrogatories, and requests for documents, tangible items and admissions are not permitted at level 1, absent grant of an extraordinary motion to allow any of them. FIG. 8 also illustrates that level 2 is somewhat limited compared with level 3, most significantly in that taking depositions is not permitted at level 2.

Another difference between level 1 and level 2 procedure that is illustrated at FIG. 7 is that the content of final submissions of the parties varies in at least a couple of ways. First, case law may be attached to final submissions of the parties at level 2, but not at level 1. Attaching case law can complicate the process for the internet adjudicator who wants to be consistent with the prior decisions, unless the internet adjudicator simply disagrees with that prior decision, and must take care to distinguish the present facts if he or she will decide contra a properly decided prior case or case from a higher appellate or otherwise controlling authority. Second, objections to evidence are permitted at level 2, but not at level 1. At level 1, the internet adjudicator may simply look at all of the evidence and issues before him or her and resolve the dispute. At level 2, if evidentiary objections are made, the internet adjudicator must first decide which evidence may be used in making his or her decision, and then render the final judgment, thus turning a one step process into a two step process between level 1 and level 2.

FIG. 7 also illustrates that a motion for reconsideration of final judgment is not allowed at level 1, whereas this motion is allowed at level 2. When such motion for reconsideration of the final judgment is made at level 2, the internet adjudicator must go back through the decision process with careful consideration being given to points raised in the motion. Moreover, at level 1, both extraordinary circumstances and good cause are required for a party to obtain upon request an extension of time for filing any papers, discovery, etc. At level 2, only good cause is required for obtaining an extension of time.

FIG. 8 illustrates differences in procedural options between levels 2 and 3 according to a preferred embodiment. Note that FIG. 8 is illustrative as are corresponding gradations 2 and 3 described further below. Note that at least in most cases, where a distinction is drawn between level 2 and level 3, higher levels such as level 4 will also include the enhanced procedural options pointed out as being available at level 3 compared with level 2. Note further that at least in most cases, where a distinction is drawn between level 2 and level 3, lower levels such as level 1 will also not include the enhanced procedural options pointed out as being available at level 3 compared with level 2. In some cases, level 4 will in addition include further procedural options over and above those provided at level 3, and level 1 may have additional procedural restrictions or reduced options compared with those available at level 2.

FIG. 8 first illustrates that no pre-answer motions, e.g., motions to dismiss such as those available under federal rule 12(b), etc., are allowed at level 2 (or level 1), but such motions are available at level 3. Not all motions available under the federal rules are necessarily available at level 3, but they all may be or a selected group of them (see below description of gradation 3) may be. Many motions are available at level 3 that are not available at level 2 (or level 1) for raising concerns relating to the complaint, and particularly its content, and if one or more of these motions are made and carefully considered, a dispute resolution process at level 3 (or level 4) can be greatly extended and complicated compared with level 2 (or level 1).

The procedural options available at level 3 that are not available at level 2 include the provision of cross-claims at level 3. At level 2, the vendor and purchaser will generally resolve the dispute between them, whereas at level 3, cross-claims can bring in distributors, manufacturers, co-signors, etc., that can complicate the process greatly. However, with generally more being at stake in a dispute being adjudicated at level 3 as opposed to level 2, the addition of greater complexity may provide an improved ability for the internet adjudicator to mete out justice.

At level 3, many motions are allowed throughout the process including and in addition to the pre-answer motions discussed above. Such motions may include JMOV, motions relating to discovery, summary judgment motions, etc. (see below description of gradation 3). The consideration of such motions can add complexity and cost to a dispute resolution process perhaps making sense with what is at stake in a level 3 adjudication and perhaps not making sense with what is at stake in a level 2 proceeding. At level 2, in the example illustrated at FIG. 8, only extraordinary motions (also allowed at level 1) and motions to compel discovery (not allowed at level 1) are permitted.

No amendments to the pleadings are allowed at level 2. In contrast, at level 3, the pleadings may be amended. The allowance of pleadings amendments can extend adjudicative procedures. Improperly drafted pleadings can be amended at level 3, whereas they may lead to a quicker process and even a different result at level 2. Different facts can surface during dispute resolution that can prompt an advantageous pleading amendment at level 3 that can also complicate the procedure compared with the fixed, non-amendable pleadings of a level 2 process.

In a level 3 process, the internet adjudicator can require pre-final submission hearings or conferences. No pre-final submission hearing or conference is available at level 2 (or level 1). The internet adjudicator may feel that the parties have an enhanced ability to reach an understanding as they prepare for and hold a pre-final submission hearing or conference. While this may be true, it also requires a great deal of additional time and effort for the parties and for the internet adjudicator. It is considered in the preferred embodiment that the additional time and effort is worth it with what is typically at stake in a level 3 dispute, and that it is not worth it given what is typically at stake in a level 2 dispute.

In a level 3 process, as illustrated at FIG. 8, summary judgment motions may be made, whereas in contrast, level 2 does not permit summary judgment motions. A ruling on a summary judgment motion can often involve a great deal of time and effort in sorting through the legal issues, where no genuine issue of material fact exists in the dispute. At level 2, the process moves directly from discovery into preparation for final arguments.

At level 2, no opinion testimony is allowed, while at level 3, experts may weigh in and provide their expert opinions on a matter. Such expert testimony can be very important to the finder of fact when complicated science or medicine may be involved. When high stakes are involved, these talented, yet expensive, individuals can serve to greatly educate those involved in the process. From the perspective of a level 2 matter, and particularly considering the reduced amounts that are typically at stake there, the battle of the experts may prove too costly to one of the parties. This can lead to an unfair result.

Finally, at level 3, defendant vendor may move that plaintiff purchaser pay for defendant vendor's fees. At level 2, this is not available to defendant vendor.

FIG. 9 illustrates differences in voluntary discovery options between levels 2 and 3 according to a preferred embodiment. As mentioned above with reference to FIG. 7, voluntary discovery is allowed at levels 2 and 3, although not at level 1. In the preferred embodiment, the extent to which voluntary discovery is permitted is more limited at level 2 than at level 3. Most significantly, depositions may be taken in a level 3 process, but not in a level 2 process. Deposition often involve a great deal of preparation and can be long question and answer processes making them perhaps too burdensome for a level 2 process. Depositions can reveal important factual evidence from individuals having knowledge relating to one or more issues involved in the dispute, and so can be important fact gathering tools in level 3 processes. In addition, at level 2 the maximum numbers of interrogatories, requests for documents, tangible items and admissions are each significantly fewer than are permitted at level 3. These differences in maximum numbers of interrogatories and requests for certain items in voluntary discovery are matters of degree that are carefully scaled with the smaller amounts that are typically at stake in level 2 versus level 3 dispute resolution processes.

FIG. 10 illustrates differences in lengths of documents between levels 1, 2 and 3 according to a preferred embodiment. As with the scaling with dispute resolution level of maximum numbers of permitted interrogatories and requests for certain items in voluntary discovery, FIG. 10 illustrated the scaling of document sizes with dispute resolution level. The particular documents include the pleadings, or complaint, answer, and reply to counterclaims if applicable, as well as the final submissions of the parties. As a first matter, no sub-paragraphs with specific statements of fact are permitted in complaints filed in a level 1 matter. These sub-paragraphs are permitted in the complaint in a level 2 or higher level matter. Moreover, the maximum lengths of the complaint, answer, reply to counter-claims (if applicable) and final submissions are each scaled to the particular level of dispute adjudication. That is, the maximum lengths of each of the complaint, answer, reply to counter-claims and final submissions are lower at level 1 then level 2, but higher at level 3 than level 2. Reduced time and effort in review and reduced electronic storage space are then typically used for lower level adjudications, as makes sense given the reduced amounts that are stake in lower level matters.

What now follows are specific examples of rules for levels 1, 2 and 3 referred to as gradations 1, 2 and 3. You will note that a careful comparison reveals that the general distinctions illustrated at FIGS. 7-10 and described above are generally included in the exemplary rules below.

Definitions for Preferred Rule Sets

The following preferred definitions are generally provided for use in reading the Rules of Procedure below:

1. "Abuse of Discretion" is when a Internet adjudicator uses the discretion given to the Internet adjudicator by the Rules, but makes a decision that is so wrong or so unfair that the decision violates the discretion granted to the Internet adjudicator and therefore is an "abuse" of that discretion.
2. "Adjudicative Procedure" is the procedural law, or the law that governs the specific ways in which the parties are allowed to present their cases on-line to the Internet adjudicator.
3. "Admissions/Denials" are the two ways in which the defendant can respond to the plaintiff's allegations contained in the complaint. The defendant either admits or denies the specific allegations contained in each paragraph of the plaintiff's complaint so that it is clear what the parties may agree on and what exactly they are disputing. Those items admitted to are deemed proven or established, and those things denied are to be resolved by the Internet adjudicator. Admissions can also be requested (at level 2 and above) of one party by another party during discovery as they may relate to certain facts.
4. "Affirmative Defense" is made when the defendant admits to some or all of the plaintiff's allegations contained in the complaint, but argues that there is a legal defense making the defendant not liable. For example, a statute of limitations (a time deadline within which a plaintiff must file a lawsuit or lose the opportunity to do so) argument is an affirmative defense because the defendant is not necessarily denying the allegations in the complaint, but merely saying that legally, the complaint has been filed too late (missed the time deadline), and therefore the defendant is not liable.

5. "Agreement to Arbitrate" is the agreement, or contract, between the parties agreeing not to sue one another in any court if a dispute ever arises between them. Instead, the parties agree to submit their arguments to a Internet adjudicator who will resolve their dispute according to the rules set forth in the Rules.

6. "Amendments" are changes or alterations made to the pleadings ("pleadings" are the documents filed in accordance with the dispute resolution procedures); usually they are not allowed under level 1 and level 2 procedures.

7. "Answer" is the document filed on-line/electronically by the defendant which contains the defendant's responses to the allegations set forth in plaintiff's complaint. The answer contains defendant's response to the allegations and claims for relief made by plaintiff in the complaint. It contains "admissions" and/or "denials" (defined above), and may contain "affirmative defenses"(defined above) and "counterclaims" (defined below) depending on the level of adjudication.

8. "Amount in Controversy" is the amount of money at stake in the dispute. It is typically determined by how much the parties agreed to pay or the invoice price for the goods sold, but may relate to other damages sought or available to a party as a result of facts surrounding a transaction.

9. "Appeal" is where the "losing" party in a dispute resolution can have another Internet adjudicator consider whether the first Internet adjudicator made a legal mistake in rendering the final judgment decision. If so, the second "appellate" Internet adjudicator can "reverse" the decision of the first Internet adjudicator if the first Internet adjudicator made a "clearly erroneous" (defined below) error or "abused his discretion"(defined above).

10. "Appellate Procedure" is the means by which the "losing" party can ask to have another appellate Internet adjudicator consider the case and determine if the first Internet adjudicator made a mistake in arriving at the original final judgment.

11. "Arbitrate" is the manner through which parties who have a dispute decide not to sue each other in any court, but instead agree to hire a neutral outsider to resolve their dispute on-line according to the rules established by the independent arbitrator. The rules used are preferably based on the rules used by United States federal courts, and at levels 1, 2 and 3 herein are streamlined therefrom in accordance with preferred embodiments.

12. "Binding Law" is the law that the Internet adjudicator is required to apply in resolving the dispute.

13. "Choice of Law" is the governing law of any dispute. It is where the parties agree to choose which specific substantive law will apply in their case. As an example, the text of the U.C.C. is the governing law of any dispute between two parties who are using dispute resolution services in accordance with a preferred embodiment.

14. "Clearly Erroneous" is when the Internet adjudicator makes a factual finding and that finding will not be reversed on appeal unless it can be shown to be clearly erroneous, such as a finding based upon a logical impossibility, an obvious clerical error, or an undeniable mistake.

15. "Complaint" is the document containing the plaintiff's factual allegations against the defendant and the legal claims for money damages that are filed on-line by the plaintiff. It marks the beginning of the dispute resolution.

16. "Counterclaim" is a claim for relief brought by the defendant back against the plaintiff. Usually defendants defend by arguing they are not liable to the plaintiff for any wrongdoing. A counterclaim, however, allows a defendant to seek damages against the plaintiff for plaintiff's alleged wrongdoing and liability to the defendant.

17. "Controlling Substantive Law" is the controlling contract law principles which will govern the dispute. For the System, that controlling law is preferably contained in the text of the U.C.C.

18. The "System" or "Preferred System" is the software, hardware and/or other tools permitting parties to resolve disputes according to the distinct levels or gradations set forth in accordance with preferred and alternative embodiments and/or these rules, particularly any dispute arising out of a transaction made on the Internet between buyers and sellers of goods or any other party having a dispute resolved in accord with a preferred embodiment herein.

19. "The System Final Decision Directory" is a separate page on the System website containing many of the written final decisions of Internet adjudicators. Parties may access this page to see how other cases have been decided. A party may want their Internet adjudicator to consider a former decision in another similar case when making the final decision in the party's case.

20. "Conclusions of Law" are what the Internet adjudicator concludes with respect to legal disputes and conflicting interpretations of applicable substantive law after applying the necessary legal principles to the findings of fact.

21. "Cyberforum" is the on-line forum offered over the Internet by the System.

22. "Internet adjudicator" is the person who actually resolves the dispute between the parties using the Rules of Procedure in accordance with the System.

23. "Default" is the failure of the defendant to defend against the complaint. It is a loss of the case by the defendant because the defendant forfeits, or fails-to show up and defend.

24. "Discovery" is the formal factual investigation of the case where the parties are allowed to ask questions and make investigatory requests of one another. The idea is to have an open process where information is shared in a cooperative manner. This enables the Internet adjudicator to make a decision about the merits of the dispute based on full and fair access to important information in the parties' possession which may help the parties present their cases to the Internet adjudicator.

25. "Dismissed (with Prejudice/without Prejudice)" is when the Internet adjudicator end the case in favor of the defendant and against the plaintiff due to some legal or technical defect in the plaintiff's complaint or general case. Dismissing "with prejudice" means that the plaintiff cannot re-file the case as the deficiency cannot be fixed. Dismissing without prejudice" means that the plaintiff may re-file the case once the deficiency is fixed.

26. "E-Commerce" is any transaction made between parties over the Internet to buy or sell any good(s).

27. "E-Summons" is the document issued by the System to the defendant instructing defendant to read and review the e-summons and the attached copy of the plaintiff's complaint and then respond to it on-line within 20 days.

28. "Factual Record" is made up of the pleadings, all correspondence between the parties, all discovery items produced, and all documents and exhibits the parties intend to submit to the Internet adjudicator.

29. "Federal Rules of Civil Procedure" are the procedural rules which govern how parties present their cases in a United States federal court. Although those particular federal rules do not apply in System disputes, they serve as the basis for the Rules used in the System which allow for the resolution of disputes on-line without requiring the physical presence of the parties in any courtroom.

30. "Final Appellate Decision" is where the second Internet adjudicator determines to uphold or affirm the first Internet adjudicator's decision or to reverse that judgment if some serious mistakes were made.

31. "Final Submission/On-Line Trial Argument" is the equivalent of a trial in a regular court, except the parties and the Internet adjudicator do not physically meet in a certain locality to have a trial. Instead, the parties file their final submissions on-line in accordance with the System, and the Internet adjudicator considers the submissions, considers the arguments, consults the applicable law, and then makes a final judgment.

32. "Findings of Fact" are what the Internet adjudicator decides with respect to factual disputes and conflicting testimony; it is what the Internet adjudicator has determined actually happened according to the factual evidence presented and often must decide between conflicting evidence and testimony.

33. "Forum" is the particular court or court system that hears and decides the dispute.

34. "Forum Selection" is the manner by which the parties mutually agree that a court system or tribunal, such as the System running on a dedicated server or vendor server, will be the place in which their dispute will be resolved.

35. "Frivolous Appeal" is an appeal that has no merit and is made for an improper purpose, such as simply to delay payment of damages.

36. "Good Cause" is a showing that a requested or taken action is or was justified by a specific and compelling reason to take the action.

37. "Implied Warranty of Merchantability" is a legal principle which provides that whether or not there is a written provision in any sales of good contract, there is nevertheless an implicit legal provision read into every contract/invoice which holds that the good sold must be of a high enough quality to be sold in public on the open market.

38. "Interrogatory" is a formal written question and is part of the "discovery" process (the factual investigation of the case). One party is entitled to ask the question in writing and the other party must answer that question in writing.

39. "Judgment" is the final decision made by the Internet adjudicator deciding which party "wins" or "loses" the dispute, and by how much as sometimes this is a matter of degree. It either gives a first party the legal right to pursue collection from a second party to the dispute, and how much, or it declares that the second party is not liable to the first party.

40. "Mediation" is where the parties engage in "negotiation," (defined below), but have the assistance of a neutral third-party, a "mediator," which can be provided through the IAJ, to attempt to facilitate the negotiation. The mediator has no power to make a final judgment. The parties still ultimately decide if they will settle their dispute or continue seeking resolution through the final step of having a Internet adjudicator arbitrate the dispute for a final binding decision.

41. "Motion" is a request, preferably electronic, by one of the parties asking the Internet adjudicator for certain actions or rulings. In an effort to provide for expedient resolution of disputes, they are generally not allowed at lower levels by the Rules because they can take up too much time, effort, cost, etc., to decide.

42. "Negotiation" is the attempt by the parties themselves to resolve the dispute on their own through communication and agreement with one another (or "settlement") without the assistance of a neutral third-party, a court system or a tribunal.

43. "Party" is an individual or entity initially involved in a transaction giving rise now to a dispute that is to be resolved in accordance with the System.

44. "Personal Jurisdiction" is the power, or "jurisdiction," of a court system or tribunal over the parties involved in the dispute to decide the merits of controversy and issue a final judgment by which the parties are legally bound.

45. "Persuasive Law" is the law derived from case opinions written by judges in a state or federal court, as well as state and federal statutes or articles written in legal journals. The Internet adjudicator is allowed to consider these legal cases and materials but they are not required to consider them. This persuasive law is NOT "binding" so the Internet adjudicator may simply consider persuasive law in his or her discretion, but is free to accept or reject it.

46. "Plain Meaning" is the manner in which the language contained on this website and in the Rules should be interpreted: according to the definitions of the words used without reference to anything else.

47. "Plaintiff" and "Defendant" are two parties involved in the dispute, and the only parties for level 1 and 2 disputes. The plaintiff is the party who complains that the defendant has wronged them by some violation of some legal duty the defendant owed to the plaintiff. The defendant is the party being accused by the plaintiff.

48. "Pleadings" are the documents filed by the parties on-line in accordance with the System. These are the plaintiff's complaint, the defendant's answer, and, if necessary due to defendant's counterclaims, the plaintiff's reply.

49. "Reconsideration" is where a party can request that the Internet adjudicator reconsider the final judgment decision in light of special facts or law the Internet adjudicator may have overlooked and not taken into account. It is in the Internet adjudicator's discretion to reconsider their final decision in light of the circumstances.

50. "Reply" is the document filed by the plaintiff in response to defendant's answer, but only if defendant's answer contains counterclaims against the plaintiff. If defendant's answer contains no counterclaims, then a reply by the plaintiff is not necessary because there are no allegations of wrongdoing entitling the defendant to relief for the plaintiff to address.

51. "Request for Production of Documents" is a formal written request for a certain document and is part of the discovery process. One party is entitled to ask the other party to produce certain relevant documents and the other party must do so barring a privilege or some other legal exception.

52. "Rules of Procedure" are the procedural rules governing how the parties present their case on-line to the Internet adjudicator. There are four sets of Rules in the System, but only one set will apply to particular parties' disputes. Which set will apply is determined by how much money is at stake in the dispute, or how much the requested relief is valued at in monetary terms, or in accordance with a decision made by one or more parties to the dispute to adjudicate at the selected level. American law contains many provisions which matured over hundreds of years of use. Many of these basic provisions, or doctrines, originated in England and were used by the first English speaking residents in North America. These doctrines, or basic provisions, are the result of decisions in thousands of cases over hundreds of years. These basic concepts are well known to people who are schooled in the law, but vary in their operation from one State in the United States to another. The Rules are based upon the same Rules of Procedure that are used by federal courts in the U.S. The Rules used, and the manner in which they function, are set forth at a dedicated or vendor website.

53. "Sanction" is punishment for engaging in behavior which is disruptive to the dispute resolution process, such as violating any of the Rules.
54. "Service" is the act of e-mailing the summons and copy of the plaintiff's complaint to the defendant and obtaining the defendant's acknowledgment of receipt of the summons and complaint. This service ensures that defendants receive fair notice that they are being sued and fair notice of all the allegations and claims for relief made in the plaintiff's complaint so that defendants may formulate a response/defense.
55. "Statute of Limitations" is the name of the time deadline within which a party must file a lawsuit or lose the ability to sue because the party's lawsuit is brought "too late" or not within the time deadline.
56. "Stay of Judgment" is where a final judgment decision is not enforceable during the appellate procedure. Specifically, enforcement of the first Internet adjudicator's final judgment decision is postponed until the final appellate decision is made.
57. "Stipulate" is where the parties agree on a specific legal or factual issue in order to save time by not having to argue or prove that issue in front of the Internet adjudicator.
58. "Subject-Matter Jurisdiction" is the power of a court system or tribunal to hear a particular dispute involving certain "subject-matter," such as e-commerce or contractual disputes. When the subject-matter of a court is defined, the court can only hear cases involving those subjects. For example, a court limited to dealing with disputes over the sale of goods can decide a case involving the sale of a car, but cannot hear a dispute over a property line between the same parties because that dispute would be over real property, or "real estate," and would not be the proper "subject-matter" for the court as the court would not have the power to hear that type of real estate dispute.
59. "The U.C.C." is the Uniform Commercial Code. The U.C.C. is a model legal code created by the American Law Institute to govern contractual disputes for any goods sold. Many state legislatures have looked to the U.C.C. for guidance in formulating their own state law. Although every state in the United States adopted the U.C.C., specific provisions vary from state to state. The text of the model U.C.C. will govern ecommerce disputes between the parties to be resolved. The U.C.C. will be the sole source of contract law which governs disputes involving the sale of goods.
60. "Transaction or Occurrence" is the action or actions giving rise to a particular lawsuit.
61. "Venue" is the specific locality in which a dispute is to be resolved.
62. "Waiver" is an act by which a party voluntarily gives up a known right, such as the legal right to sue in a court in exchange for the ability to have the dispute resolved quickly and fairly through the use of the System.
63. "Warranty Disclaimer" is the language used to make sure parties understand that they have given up their legal rights to sue the vendor and/or a host of the System for any reason.

Preferred Rules of Adjudicative Procedure

Gradation #1—

For Disputes with $1-$5,000 in Controversy

1. Rule 1: Scope of this First Set of Rules of Adjudicative Procedure.
   (A) Agreement to Arbitrate and Be Bound by These Rules of Adjudicative Procedure. By clicking "I Agree" when prompted on this website, thereby legally entering into the Agreement to Arbitrate, the buyer and seller to the e-commerce transaction ("the parties") agree to be bound by and subject to all of the applicable Rules of Adjudicative Procedure ("Rules") on this website. Those Rules explain the procedural rights and duties of the parties in resolving any dispute arising or existing between them. The Agreement to Arbitrate will appear on the vendor website.
   (B) Scope of this First Set of Rules. This first set of Rules will be the governing procedural law for all System disputes where the amount in controversy is at least $1, but does not exceed $5,000, or where the parties have agreed that their dispute be settled using this first set of Rules and have paid the corresponding filing fee.
1.Rule 2: Personal Jurisdiction: Waiver of Right to Sue in Another Forum.
   (A) Exclusive Personal Jurisdiction of the System. The parties agree to submit only and exclusively to the personal jurisdiction and venue of the "Cyberforum" offered by the System. They agree that only the System has the power over them to resolve the dispute arising from their e-commerce transaction. As a result, the parties waive any and all of their legal rights to attack the personal jurisdictional authority of the System over any e-commerce dispute arising or resulting between them.
   (B) Waiver of Jurisdiction and the Right to Appeal in any other Forum. The parties waive their rights to file lawsuits against one another in any other forum outside of the System, and they waive all rights to appeal any arbitration decision in any forum outside of the System's appellate procedure. The only right to appeal to a trial court outside of the System is if the Internet adjudicator violates the Agreement to Arbitrate.
1.Rule 3: Personal Jurisdiction: Forum Selection Provision.
   (A) Contractual Duty not to Sue in any other Forum.
      (1) Other Lawsuits Prohibited. The parties agree not to sue each other in any other court, forum, or tribunal, other than that offered by the System, in order to resolve any dispute between them arising out of or as a result of their on-line transaction.
      (2) Other Lawsuits Have No Effect. The parties agree that any unauthorized lawsuit outside of the System will have no effect in light of their Agreement to Arbitrate. The System forum selected by the parties will be the only valid forum to hear and decide the dispute between them.
   (B) Agreed Sanctions for Violation of this Provision.
      (1) Motions. In the event that either party files a lawsuit in any court, forum or tribunal outside of the System, the other party may make a motion to dismiss that action and cite this provision requiring them to resolve their dispute only by using the System. That party may also elect to make a motion in that court requesting a "stay," or postponement, of that action pending the resolution of the dispute by the System.

(2) Fees and Costs. The party filing the unauthorized lawsuit outside of the System agrees to and will pay any and all reasonable attorneys' fees and costs associated with the other party's attempts to enforce this provision.

1.Rule 4: Subject-Matter Jurisdiction: Type of Case.

(A) E-Commerce Contracts. The type of disputes to be resolved by the System are sales of goods transactions, or sales of mixed goods and commonly available fungible services, such as the sales of travel services (air flights, rail, cruise lines, rental cars, hotel rooms) and any credit card or financial transaction disputes that are made over the Internet ("E-Commerce"). This means that the subject-matter jurisdiction of the System involves only claims for breach of contract (non-delivery/non-conforming goods or services), breach of warranty and merchantability, and collection or non-payment.

(B) Negotiation/Mediation for other Types of Lawsuits. For all other types of noncontract law disputes, the parties may request and pay for the negotiation and/or mediation services of the System pursuant to 1.Rule 20.

1.Rule 5: Subject-Matter Jurisdiction: Amount in Controversy.

(A) Amount in Controversy. The Gradation of Rules that apply for disputes with between $1 and $5,000 in controversy will be Gradation #1. These Rules are contained in 1.Rule 1-1.Rule 32.

(B) Option to Stipulate to Another Gradation. If the parties in one gradation are willing to stipulate or agree to the procedural options in a higher or lower gradation, and are willing to pay the higher or lower filing fee for that gradation, then the parties will be allowed to do so in the discretion of the Internet adjudicator.

(C) Determination of Amount in Controversy.

(1) Based on Purchase Price in Contract. The amount in controversy for each transaction shall be determined solely by the price of the goods/services sold, exclusive of costs and interest. The sales price of the goods/service sold, the subject of the lawsuit, shall determine the amount in controversy which, in turn, shall determine which particular gradation of the Rules (Gradation #1-#4)_will govern the resolution of that dispute.

(2) Determination by Internet adjudicator. Since the disputes to be resolved by the System are contract actions, the price of the good(s)/service(s) in question on the invoice is controlling in determining the amount in controversy. The Internet adjudicator will make that determination. If more than one good or service is sold, then the amount in controversy will be the total price of those goods/services as determined by the Internet adjudicator. No other factor will be considered in determining the amount in controversy.

(D) Hearing to Determine Amount in Controversy in Dispute. In the event it is not clear from the sales contract or invoice what amount is exactly in controversy, a Internet adjudicator will be assigned by the System, through the IAJ, to conduct a preliminary on-line hearing with the parties in order to determine the amount in controversy and therefore which gradation of Rules will apply. The Internet adjudicator has-the discretion to order costs to be paid by the party raising the issue if it is determined the amount in controversy was clear.

1.Rule 6: Applicable Substantive Law: Text of Article 2 of the U.C.C.

(A) Applicable Substantive Controlling Contract Law. The dispute will be resolved by looking to the legal principles contained in the written text of Article 2 of the U.C.C. written by the American Law Institute. The U.C.C. serves as the sole applicable substantive law, and the Internet adjudicator is required to and will apply only U.C.C. substantive law in resolving the dispute.

(B) Application of the Text of the U.C.C. Only. The parties will argue their respective positions pursuant only to the "plain meaning" interpretation of the explicit text of Article 2 of the U.C.C. as it appears on this website. The text of Article 2 of the U.C.C. will be the exclusive binding law governing the resolution of the dispute. The text will also apply to the sales of goods and services such as those enumerated in 1.Rule 4.

1.Rule 7: Applicable Language and Valuations: English and U.S. Dollars.

(A) English Requirement. Although the System can hear disputes arising anywhere in the world and the preferred System can be modified for use in various languages, the language in which the dispute will be according to the preferred embodiment is English particularly in the United States. It follows that in the preferred embodiment the Internet adjudicator's decision and all correspondence will be in English. Submissions of all writings, evidence, and oral presentations are preferably also be in English.

(B) Translations Allowed. Any party submitting any item created in another language will be required submit an English translation. If the opposing party disagrees with the translation, both parties shall obtain a third person who shall provide a translation which shall be submitted as the accepted translation. The System may provide translation services for a fee. (See below exemplary "Costs & Fees").

(C) Cost. The cost of the translation will be paid by the party submitting the item that needs to be translated.

(D) Money Valuations. All the System Provisions and Rules that make reference to costs or money amounts set forth in a pricing or rate sheet will be denominated and valued in United States dollars. All payments will be made in United States dollars.

1.Rule 8: Communication Facilitation.

(A) Duty to Submit Identifying Information. The parties will submit on-line to the System their current e-mail addresses, home and business telephone numbers, and home and business street addresses upon registration with the System.

(B) Continuing Duty to Report in the Event of Litigation. The parties' duty to report this information is a continuing duty, and the parties are required to update that information within 10 days of any change to it during any litigation.

1.Rule 9: Waiver of All Claims (A) Waiver. The parties waive or give up any and all claims against the host of the System based on:

(1) any actions of any negotiation facilitator (mediator), (2) the substantive legal rulings, factual findings or any actions of any Internet adjudicator, (3) the System's hosting of a separate web page regarding the timeliness of payments of any past judgments;

(4) the inability of a party to enforce a System award against another party; and/or (5) any other reason.

(B) Warranty Disclaimer.

(1) No Warranties or Representations. This provision acts as a "WARRANTY DISCLAIMER" which means that the System and this website, including any content or information contained within it, is provided "as is" and "as available" with no representations or warranties of any kind, either expressed or implied, including, but not limited to, the implied warranty of merchantability, fitness for a particular purpose and non-infringement.

(2) Assumption of Risk. Any user or party assumes total responsibility and risk for use of this the System website and holds the System harmless from any liability.

(3) Sole Remedy. The sole remedy for dissatisfaction with the System and/or this site is to terminate use of the site and the System's service.

(4) Application to All System Related Entities. the System, its employees, agents, affiliates, and sponsors, including the IAJ and all Internet adjudicators, are neither responsible for nor liable for any direct, indirect, incidental, consequential, special, exemplary, punitive or other damages arising out of or in any way relating to this site, content or information contained within this website, to the extent allowable by law.

(C) Choice of Law and Venue Regarding the Use of the System.

(1) California Law Will Control Any Dispute Between hosts of the System and Any User or Party. The Agreement to Arbitrate and the relationships between the System, all browsers of this website, and all parties to the Agreement to Arbitrate, shall be interpreted and governed by the laws of the State of California without regard to the conflicts of law provisions of that state.

(2) Exclusive Venue in Sacramento, Calif. Any action or proceeding to interpret or enforce this agreement between the System, all browsers of this website, and all parties, shall be brought before a state or federal court in Sacramento, Calif. Each browser and party consents to the exclusive jurisdiction and venue before such Sacramento, Calif. courts.

(D) Entire Agreement. These Arbitration Provisions contained in the Rules constitute the entire agreement between the parties, browsers and the System with respect to the System website. If any part of this agreement is found invalid or unenforceable by a court of competent jurisdiction, the remainder of this agreement shall be given reasonable effect.

1.Rule 10: Two-Year Statute of Limitations.

(A) Two-Year Period. There is a two-year statute of limitations period (time deadline) within which to file any and all claims or counterclaims brought pursuant to any on-line, e-commerce transaction where the amount in controversy is between $1 and $5,000.

(B) The Start Date. The statute of limitations period will begin running—which will be considered the "start date" of the time deadline—one month after the purchaser has paid the vendor for the goods. Parties are deemed to have filed properly within the two-year limitations period if they electronically file their complaint with the System within two calendar years of the "start date."

1.Rule 11: Filing a Complaint by the Plaintiff.

(A) Page Limit. A complaining plaintiff may electronically file a complaint with the System not to exceed two, single-spaced, 8 and ½"×11"[21.59×27.94 centimeters] screens of 12-point written text with standard 1" [2.54 centimeters] margins).

(B) Contents of Complaint. The complaint will state, in separate numbered paragraphs as set forth below, the following:

(1) the goods purchased;
(2) the total sales or invoice price;
(3) the pertinent written terms of the contract allegedly breached by defendant; and, (4) the factual basis for the defendant's alleged breach of that contract.

(5) A list of the legal claim(s) for relief and the corresponding provisions of Article 2 of the U.C.C. entitling plaintiff to legal recovery from the defendant.

(C) Filing Fee. The cost of filing the complaint will be paid by the plaintiff. (See below exemplary. "Costs and Fees"). Otherwise, the costs may have been paid at the time of the transaction (see above). For example, a small percentage, e.g., 0.1% or 0.05%, of every transaction occurring at the vendor site may go toward dispute resolution, and in return, the dispute resolution is available without additional fee to parties wishing to use it. In short, if the vendor is a participant in the preferred dispute resolution "insurance" program, then the fee for filing the complaint may have already been paid as part of that fee which is collected for all transactions occurring at the vendor site. Alternatively, perhaps only the vendor is the purchaser of the dispute resolution insurance, and the purchaser of the vendor's goods must still pay any required fees and costs involved in resolving the dispute, or vice-versa.

1.Rule 12: Establishment of the Parties' Special Dispute Resolution Page.

(A) Parties' Separate Dispute Resolution Page. When plaintiffs submit their complaint on-line to the System on this website, the System will create a special Dispute Resolution Page for only the two parties and the Internet adjudicator, through which the parties can conduct all of the dispute resolution communications and filings with each other and the Internet adjudicator.

(B) Password Access. the System will provide a password given only to the parties involved in the dispute and the Internet adjudicator to access and submit all documents and filings. It is the responsibility of the parties to keep the password confidential to preserve their privacy.

(C) Privacy Not Guaranteed. Although the Dispute Resolution Page of the parties can be accessed by use of a password given only to the parties, the System cannot assure complete privacy. The parties should therefore consider their filings and submissions to be public documents, just as all filings and documents are considered public documents in most federal and state courts in the United States and other courts of competent jurisdiction.

(D) All Pleadings and Submitted Documents to Be Posted on the Parties' Dispute Resolution Page; Notification.

(1) Posting on the Parties' Dispute Resolution Page. Each party must post all submitted documents and pleadings on the parties' Dispute Resolution Page.

(2) System Dispute Resolution Page to Provide Notification. When posting a document or pleading on the parties' Dispute Resolution Page, the System website will automatically notify the opposing party through e-mail that a pleading or filing has been posted on the page and the opposing party should access the page to view the posting.

1.Rule 13: Time.

(A) Computation. In computing any period of time prescribed or allowed by these rules, the day of the act, event, or default from which the designated period of time begins to run shall not be included. All weekends and holidays shall be included in the time computations. If the last day for a time period ends on a weekend or holiday the due date shall be extended to the next business day. (B) Enlargement. The parties may not request an extension of time for any time deadline except in extraordinary circumstances filed at least five days before the time deadline. The Internet adjudicator, in his discretion, may grant the extension of time if the extension is warranted by good cause, extraordinary circumstances and there would be no unfair prejudice against the non-requesting party.

1.Rule 14: Issuance of an E-Summons by the System and Service of the Complaint.

(A) Service to Defendant. In addition to the System website automatically sending an e-mail posting notification to the defendant, within 5 days of the plaintiff filing the complaint, the System will send to the defendant at defendant's registered e-mail address, an additional copy of a System e-summons, containing an attached copy of the plaintiff's complaint. The summons shall direct the defendant to immediately confirm receipt of the e-summons and complaint and to answer the complaint within 20 days of defendant's acknowledgment of receipt of the summons and complaint. The plaintiff shall also notify the defendant and send an e-mail copy of the summons and complaint to the defendant.

(B) E-Mail Tracking. The e-summons will contain an automatic on-line acknowledgment of receipt of the summons sent back to the System electronically proving receipt when the defendant opens the e-mail.

(C) Acknowledgment of Receipt of Service. In addition, there will be a request from the plaintiff for the defendant to acknowledge by e-mail immediately and voluntarily a confirmation of receipt of the e-summons. This voluntary acknowledgment will constitute completed service of the complaint to notify the defendant of the lawsuit.

(D) Failure to Acknowledge Receipt of Service. If defendant fails to acknowledge the receipt of the System's e-summons and copy of the plaintiff's complaint within ten days, the plaintiff will call the defendant by telephone to confirm receipt and send a hard copy via U.S. mail and may charge the costs of the long-distance call, the postage, and the administrative time to the defendant, unless defendant can demonstrate good cause as to why defendant did not immediately acknowledge receipt of service. The System will assess those costs when requested by plaintiff and will order payment by defendant to plaintiff if there was no just cause.

(E) Timing. The date of service will be the date on which the defendant acknowledges receipt of the e-summons and plaintiff's complaint, or, if there is no such acknowledgment within ten days, then it will be the date the phone call is placed from plaintiff to the defendant.

1.Rule 15: Default.

(A) Entry of Default. If the defendant does not respond to the service and to plaintiff's telephone call within 20 days of the date of the call, the defendant will be deemed to be in default. At that point, the plaintiff may request an Entry of Default. The Internet adjudicator will enter default against the defendant if there has been no response from defendant.

(B) Default Hearing for Plaintiff to Prove Damages. Within 30 days of the Entry of Default, the Internet adjudicator will schedule a default hearing so that the plaintiff will have the opportunity to prove the damages alleged against the defendant. The hearing will be made either by written argument made to the Internet adjudicator on the parties special Dispute Resolution Page, or by live telephone conference scheduled by the Internet adjudicator.

(C) Default Judgment. At the hearing to prove damages, the Internet adjudicator will hear plaintiff's arguments and determine the damages the plaintiff has suffered, if any. At the end of the hearing, the Internet adjudicator will immediately issue a decision against defendant if plaintiff has proved the damages alleged and that such damages are still owing. If the Internet adjudicator finds damages suffered by plaintiff, then at the end of the default hearing, the Internet adjudicator will issue a default judgment against the defendant. At that point, the plaintiff can pursue enforcement of payment for a default judgment in accordance with 1.Rule 31.

(D) Set Aside of the Entry of Default or the Default Judgment. At any time before the Entry of Default has been made or within 90 days after a Default Judgment has been issued, the defendant may make a motion to set aside the Entry of Default or the Default Judgment. The Internet adjudicator will set aside the Entry of Default or the Default Judgment and allow the defendant to respond to the complaint provided the defendant can demonstrate good cause as to why there was a failure to respond timely to the plaintiff's complaint.

(E) Default After a Response. In the event that the defendant initially responds to the complaint and defends the case, but then at any later time fails to continue defending the case, the plaintiff may move for an Entry of Default and a Default Judgment in accordance with this rule.

1.Rule 16: Defendant's Answer to Complaint.

(A) Requirement to Answer Plaintiff's Complaint. Defendant must file an answer to the plaintiff's complaint with the System within 20 days of the date of service. No pre-answer motions or responses other than an answer are allowed.

(B) Contents of Answer.
  (1) Admissions/Denials. The answer must contain in separate numbered paragraphs the defendant's specific admissions or denials corresponding exactly to each numbered paragraph of the allegations contained in the plaintiff's complaint.
  (2) Affirmative Defenses. The answer will also set forth under a separate heading a list of any legal or factual affirmative defenses, if any, and the defendant's version of events in separate numbered subparagraphs.

(D) Page Limit. The answer is not to exceed a total of three, single-spaced, 8 and ½"×11" [21.59×27.94 centimeters] screens of 12-point written text, with standard 1" [2.54 centimeters] margins.

1.Rule 17: The Pleadings Record.

(A) Limitations of Pleadings. The Complaint and Answer, along with the parties° Final Submissions (see 1.Rule 25) will constitute the entire pleadings record of the case.

(B) No Motions Allowed. No additional motions/filings will be allowed. However, additional "extraordinary motions" may be allowed, in the discretion of the Internet adjudicator, so that a party may seek relief for an abuse or serious misconduct by the other party. The Internet adjudicator, in the officer's discretion, may sanction the offending party or sanction a party for filing a frivolous extraordinary motion.

(C) No Amendments to the Pleadings Allowed. There will be no amendments to the pleadings unless good cause is shown and the Internet adjudicator allows it.

1.Rule 18: Parties Limited to E-Commerce Purchaser and Vendor Only.

(A) Actions Limited to One Plaintiff and One Defendant. The dispute to be resolved is limited only to the purchaser and to the vendor, the only two parties to the System Agreement to Arbitrate, which controls any dispute arising out of or as a result of their specific on-line transaction.

(B) No Additional Parties. No additional parties can be added to the dispute. Any additional parties must file their own separate System dispute resolution actions.

1.Rule 19: Consolidation of Case. In the event that many purchasers or vendors have the same or similar complaint against the same vendor or purchaser, and it would be efficient to consolidate those separate lawsuits into one larger action, the Internet adjudicator, in the officer's discretion, may do so. The Internet adjudicator will make any necessary or reasonable adjustments in terms of filing deadlines and requirements, in the officer's discretion, due to there being additional parties. The Internet adjudicator will inform the parties of all adjusted time deadlines and requirements.

1.Rule 20: Private Negotiation and Mediation Options.

(A) Negotiation & Mediation Options Available. The parties may elect by mutual agreement to participate in either the negotiation option or mediation option offered by the System as set forth below:

(1) Negotiation Option. At any point after a dispute arises, the parties may elect to engage in party-to-party direct negotiation sessions over the Internet on their own special Dispute Resolution Page provided by the System.

(a) Privacy. Once the private Dispute Resolution page is created, the parties can contact one another directly and attempt to settle the dispute on their own. The parties can elect to make their special negotiation page private so the Internet adjudicator does not have access to their negotiation sessions.

(b) Cost. There is no cost to use the private negotiation service.

(c) Settlement and Voluntary Dismissal. If the parties settle, it is their responsibility to create their own settlement agreement, jointly dismiss the case, and inform the System that their dispute is resolved.

(2) Mediation Option. At any point after a dispute arises, the parties may elect to engage in three-way (party-to-party, with a System mediator) mediation sessions over the Internet, with the mediator facilitating on their Dispute Resolution Page. The mediator, with the parties' voluntary participation, will attempt to facilitate a negotiated settlement between the parties. Both parties must request the mediation sessions. As with any mediation, the parties are free to reject the suggestions of the mediator at any time.

(a) Cost. The costs of using the mediation service will be shared equally by the parties (See below exemplary "Costs & Fees"). Costs of mediation may be alternatively included in a transaction fee for dispute resolution services which is paid as a small percentage of all transactions occurring at the vendor site.

(b) Privacy and Confidentiality. If the parties used the negotiation option but were unsuccessful, the parties may elect to reveal the substance of their settlement negotiations to the mediator; however, the mediator will assess the time to read the submissions as part of the mediation hourly charges. If either party elects not to submit the on-line settlement negotiations, the mediator will not be allowed to consider those private confidential settlement negotiation communications. The mediator will keep all communications private and confidential. The mediator will be selected by the IAJ. Mediators may be IAJ Internet adjudicators or, in the discretion of the IAJ, non-lawyer experts in the field that is the subject of the dispute.

(c) Settlement and Voluntary Dismissal. If the parties settle with the assistance of the mediator, it is their responsibility to create their own settlement agreement and jointly dismiss the case. They must inform the System that their dispute has been resolved.

(B) Timing. If the parties mutually elect to engage in either negotiation or mediation options, all applicable filing time deadlines will remain in force unless the parties mutually agree to postpone the deadlines and the Internet adjudicator allows such postponement. All postponements shall be at the discretion of the Internet adjudicator only.

(C) Right to Refuse to Mediate or Arbitrate. Any dispute submitted for resolution to the System may be rejected by the System if it is determined not to be a proper case for dispute resolution. The parties have no legal right to demand that the System hear their dispute. If the System rejects a particular dispute for resolution, neither party will be assessed any fees or charges associated with their case.

1.Rule 21: Submission of the Dispute to Arbitration.

(A) Submission Immediately or after the Negotiation or Mediation Options. If settlement negotiations and mediation sessions are unsuccessful under 1.Rule 20, or if the parties have not elected to exercise those options and wish to proceed directly with formal arbitration after their pleadings have been submitted, the parties are entitled to submit the dispute to a Internet adjudicator.

(B) Selection of Internet adjudicator to Arbitrate the Dispute. The Internet adjudicator will be assigned to the case by the IAJ.

1.Rule 22: Credentials, Training, Objectivity of the Internet adjudicator/Arbitrators.

(A) Institute for Administrative Justice ("IAJ")—McGeorge School of Law. All legal services of the System provided to the parties to an e-commerce transaction who sign Agreements to Arbitrate any disputes that have or might arise between them will be provided, under contract, by the Institute for Administrative Justice ("IAJ"), at the University of the Pacific, McGeorge School of Law, located in Sacramento, Calif. This is a preferred, exemplary school from which the internet adjudicators will preside. These legal services provided by the IAJ under contract to the System consist primarily of on-line dispute resolution services conducted by remote IAJ Internet adjudicators. Established in 1972, the IAJ has over 25 expert Internet adjudicators currently employed to resolve disputes in a traditional manner as well as on-line to the disputants. Over the past two decades, the IAJ has expanded its service components to administrative agencies, and has successfully provided dispute resolution services as well as training and consultation in dispute resolution. The Internet adjudicator will keep all matters private and confidential.

(B) Contract between the System and the IAJ. As an independent body, the IAJ and its Internet adjudicators are insulated from any economic pressure from either on-line vendors or purchasers who might end up as party disputants, because the IAJ operates under the auspices of McGeorge School of Law and is paid by the System under contract to provide these services, not by the vendors or purchasers. Further, the IAJ Internet adjudicators who will provide these on-line legal services to disputants on behalf of the System receive their pay, regardless of outcome of disputes, by the IAJ, who is in turn paid by the System.

(C) Full Financial Disclosure of the System and the IAJ. An explanation of the System owners and affiliates and their respective financial interests may be available at the vendor site or at the dedicated dispute resolution host site.

1.Rule 23: Discovery—Factual Investigation and Disclosure.

(A) The Official Factual Record.

(1) Pleadings and All Previous Correspondence. The pleadings and all previous Internet correspondence between the parties up until the complaint is filed, automatically become the official legal and factual record of the case.

(2) Additional Information, "Discovery"—Pre-Trial Disclosure of Any Relevant Documents and Tangible Evidence that Each Party Plans to Submit to the Internet adjudicator for Final Decision. The parties are required to make mandatory disclosures of all the exhibits they intend to use in their final submissions to the Internet adjudicator.

(a) Setting a Final Argument Submission Date. The Internet adjudicator will set a final argument submission date thirty days after the matter is submitted to arbitration.

(b) Exhibits/Documents Due Fifteen Days before Final Argument Submission Date. Fifteen days before the final submission date, the parties will submit to the Internet adjudicator any and all documents (including photographs, affidavits of other individuals, charts, records) that they plan to submit for the Internet adjudicator's consideration as a part of their final argument. They will e-mail their exhibits to the parties' Dispute Resolution Page in accordance with 1.Rule 12.

(3) Failure to Submit Exhibits/Documents Fifteen Days before Final Argument Submission Date. If an exhibit or document that a party plans to use for the final submission to the Internet adjudicator is not produced at least fifteen days before the final submission date, it will not be considered by the Internet adjudicator as part of the final submission.

1.Rule 24: Dismissals before the Final Argument Submissions.

(A) Defendant Confesses Judgment. At any point during the proceedings, a defendant may elect to confess liability and judgment simply pay the requested damages, if so, the case will be deemed resolved pursuant to this rule.

(B) Plaintiff Drops the Action. At any point during the proceedings, a plaintiff may elect simply to discontinue the action against the defendant, and the action will be deemed resolved pursuant to this rule. However, if the defendant has set forth any counterclaims, those claims will not be dropped, and the action will continue with respect to those counterclaims.

(C) Defendant Dismisses Plaintiff's Case for Failure to Go Forward. At any point during the proceedings, if the plaintiff is not responding and is not going forward with the action, the defendant may ask the Internet adjudicator to dismiss the plaintiff's inactive action.

(D) The Parties' Stipulated Dismissal. At any point during the proceedings, if the plaintiff and the defendant settle the action pursuant to negotiation or mediation, the parties should submit a motion to voluntarily dismiss the action pursuant to this rule.

1.Rule 25: Final Argument Submissions.

(A) Final Argument Submissions to the Internet adjudicator. On the final argument submission date, each party may submit up to three, single-spaced, 8 and ½"×11" [21.59× 27.94 centimeters] screens of 12-point written text (with standard 1" [2.54 centimeters] margins) which will constitute their final argument submission explaining their legal and factual position in the dispute to the Internet adjudicator. The parties will post their final submission on the parties' Dispute Resolution Page in accordance with 1.Rule 12 so that each party can review it.

(B) Consideration of all Submissions in Rendering a Final Decision Resolving the Dispute. The Internet adjudicator will review and consider all of the following in rendering a final decision:

(1) the pleadings;

(2) all correspondence between the parties;

(3) the documents and exhibits produced fifteen days before the final argument submission date;

(4) the negotiation or mediation correspondence, if used and if both parties agree to submit it to the Internet adjudicator;

(5) the final argument submissions by the parties, including attachments; and (6) the text of Article 2 of the U.C.C.

1.Rule 26: Rules Pertaining to Evidence and Exhibits Used in the Final Submission.

(A) Evidence May Be Offered by Parties Attached to Final Argument Submission. The parties may offer evidence relevant to their dispute attached to their final argument submissions filed with the Internet adjudicator. These documents and exhibits must have been produced and submitted to the parties' Dispute Resolution Page fifteen days before the Final Submission date. Each attached item of evidence, such as a document, witness statement or photograph, will be numbered so the Internet adjudicator and the parties can easily identify the item of evidence submitted.

(B) Internet adjudicator's Consideration of Attached Evidence. All evidence submitted will be considered by the Internet adjudicator unless the Internet adjudicator, in the officer's discretion, determines that the offered evidence should be excluded.

(C) Types of Evidence. The following types or forms of evidence will be allowed as admissible submissions:

(1) Testimonial Evidence; Witness Statements and Affidavits. The parties may submit sworn "affidavits," which are written sworn statements of witnesses or of the parties themselves signed and given under the pains and penalties of perjury. The Internet adjudicator will consider the information contained in those written witness statements or affidavits regarding the dispute.

(2) Demonstrative Evidence. The parties may submit charts, diagrams, lists, maps, and other documentary evidence, etc., which help to explain or clarify a witness's written statement or affidavit and a party's legal position specially prepared for the Internet adjudicator's consideration.

(3) Real Evidence. The parties may submit tangible or written evidence.

(a) Documentary Evidence. All documents, such as letters, correspondence, contracts, invoices, and photographs, between the parties that are part of the dispute or demonstrate something that happened in the dispute may be attached as a submission. All documents or images must be "digitized" so they can be sent over the Internet.

(b) Tangible Evidence. All non-documentary evidence that is physical in nature, such as an actual good purchased or damaged, a piece of hardware, or a physical item of any kind, may be sent to the Internet adjudicator through the mails or other delivery service as a submission. The Internet adjudicator has the option of accepting a digitized photograph of the physical item, the tangible evidence, in lieu of a party sending the tangible item through the mails or other delivery service.

(D) Witnesses; Witness Statements. The following provisions apply to witness statement or affidavit submissions.

(1) Oath Required. The parties may submit sworn statements of witnesses that have relevant personal knowledge to the case. Parties may be a witness in their own behalf and submit their own sworn witness statement. Witnesses must sign their statements and swear to or affirm their truth under the pains and penalties of perjury.

(2) Competency; Personal Knowledge. Witnesses must have personal knowledge of something relevant to the case, have some recollection of the relevant matter and the ability to communicate their testimony in a written statement.

(3) Internet adjudicator, Mediators, Attorneys, Legal Representatives. The Internet adjudicator and the mediator, if a mediator was used, may not submit witness statements. However, in the Internet adjudicator's discretion, attorneys or other legal representatives of the parties may submit witness statements.

(4) Number of Witness Statements; Length. The Internet adjudicator has the discretion to set reasonable limits on the number of witness statements that will be allowed to be submitted, and page lengths of those statements based on the circumstances of the case.

(E) Authentication of Evidence. Each evidentiary submission, including every witness statement and all exhibits, must contain some basis to demonstrate that the evidentiary item submitted is what it purports to be.

(1) Witness Statements. Witness statements must contain the witness' identifying information so that the Internet adjudicator or the opposing party can confirm that the submitted statement is truly the witnesses' statement.

(2) Documents. All documents must contain identifying information so that the Internet adjudicator or the opposing party can verify its source. (See Appendix #3 as a way to authenticate all correspondence between the parties).

(3) Tangible Items. All tangible items must contain a written summary identifying the item and relaying its source or origination.

(F) Cross-Examination of Witnesses; Live Telephone or Live Video-Conferencing. Either party may elect to cross-examine any witness who has submitted a sworn witness statement.

(1) Notification. Within five days after the final submissions have been made, a party may elect to set-up a cross-examination of any witness. It will be in the discretion of the Internet adjudicator when to schedule the cross-examination of witnesses and notify the parties to produce the witness for cross-examination.

(2) Method. The party electing to cross-examine a witness may conduct the cross-examination by telephone conference set up by the Internet adjudicator or by video-conferencing, assuming the parties and witness have that capability.

(3) Costs. The party who elects to cross-examine a witness must pay for the costs of the live telephone conference call or the video conference call.

(4) Direct Examination. If a party representing the witness wishes to do a direct examination of the witness before they are cross-examined, they may do so, in the discretion of the Internet adjudicator, but the party conducting the direct examination must pay for the costs of the telephone or video conference call associated with their direct examination. The Internet adjudicator will determine the split in costs as it relates to the actual time taken by each party. The Internet adjudicator may conduct the direct and cross-examinations at the same time or at separate times in the officer's discretion.

(5) Internet adjudicator's Questions. At any point during the direct or cross-examinations, the Internet adjudicator may pose the officer's own questions to the witness. The cost for this time will be borne by the party who happens to be examining the witness (direct or cross) at that particular time. The Internet adjudicator will make this determination in the officer's discretion. (G) Closing Arguments. Each party shall also have fifteen minutes, in a live telephone or video conference or a live on-line transmission on the parties' Dispute Resolution Page, with the Internet adjudicator and opposing party, to make a closing argument to the Internet adjudicator as to why the party should prevail in the action. The Internet adjudicator shall determine in his discretion when the closing argument will take place and what method of communication will be used.

(H) Timing. The final closing argument and the opportunity to cross-examine witnesses to be conducted on-line or by telephone or video conference will be scheduled by the Internet adjudicator no later than 45 days after the final argument submission replies are due. The final closing argument may be at the same time or at separate time from the direct and cross-examinations in the Internet adjudicator's discretion.

1.Rule 27: Judgment.

(A) Final Written Decisions by Internet adjudicator Resolving The Dispute. As disputes are resolved by the final decision of the Internet adjudicator, the Internet adjudicator will provide a written final decision explaining the resolution of the dispute. The final decision will contain the following three items:

(1) Findings of Fact—which will include analysis of the factual record and resolution of all pertinent factual disputes between the parties;

(2) Conclusions of Law—which will include an analysis of the parties' pleadings, all submissions and all applicable law, and the legal reasons for the decision and how the text of Article 2 of the U.C.C. was applied;

(3) Final Resolution of the Dispute and Arbitration Award, if any—which will set forth the Internet adjudicator's clear, final directive to the parties as to how exactly the dispute is resolved. The judgment will include the award and state the specific amount of damages, if any, to be paid to the prevailing party.

(B) Timing. The Internet adjudicator will render a final written decision judgment within 30 days of the final argument and opportunity to cross-examine witness, or within ten days of service should the defendant have defaulted.

(C) Posting. The Internet adjudicator will e-mail the final decision to the parties and post them on the parties' Dispute Resolution Page in accordance with 1.Rule 12.

1.Rule 28: Publication of the System's Final Written Decisions/Arbitration Awards of Internet adjudicators.

(A) Publication. The written final decisions of all the Internet adjudicators will be published in the "System Final Decision Directory," located on-line on the System's website and fully accessible by all party litigants. The IAJ will decide which decisions shall be published.

(B) Decisions Considered Persuasive Case Law. Those final Internet adjudicator published decisions will be considered persuasive case law interpretations of the text of the U.C.C., just as all courts of competent jurisdiction interpreting the text of the U.C.C. are considered "persuasive" authority.

1.Rule 29: Recovery of Filing Fee if Plaintiff Purchaser is the Prevailing Party.

(A) Available Only to a Plaintiff who is a Purchaser. If the plaintiff purchaser is the prevailing party, then as a part of the judgment in favor of the plaintiff purchaser, the Internet adjudicator will award the cost of the plaintiff's filing fee as part of the damage award against the defendant vendor to put the plaintiff in the position they would have been in were it not for the wrong of the defendant.

(B) Not Available to a Plaintiff or Defendant Vendor or Defendant Purchaser. If the defendant or plaintiff vendor is the prevailing party, the amount of the filing fee will not be recovered.

(C) Rule Inapplicable in Negotiation or Mediation. If the parties mutually elect either the private negotiation option or the mediation option, and resolve their dispute pursuant to either of those methods, this rule awarding the filing fee does not apply.

1. Rule 30: Reconsideration and Appeal of Final Judgment.
   (A) Appeal.
   (1) Timing. Within ten days of the final judgment, a party may file a notice of appeal of the final judgment. The party who initiated the appeal is the "appellant" and the responding party is the "appellee."
   (2) Cross-Appeal Allowed. The other responding party may also appeal any adverse aspect of the decision and in that case will be called the "cross-appellant." The appeal and the cross-appeal must be responded to by each respective party.
   (3) Assignment of an Appellate Internet adjudicator. The System will appoint an appellate Internet adjudicator to consider the appeal.
   (4) Standards of Review. Only appeals based on clear, obvious legal or factual mistakes of the original Internet adjudicator will be considered. Unless the original Internet adjudicator abused the officer's discretion in making factual findings or the officer's legal rulings were clearly erroneous, that original Internet adjudicator's decision will be upheld.
   (C) Appellate Procedure.
   (1) The Appeal Filing. The appellant must timely file, along with the notice of appeal, an explanation of the basis for appeal which may not exceed one single-spaced, 8 and ½"×11" [21.59×27.94 centimeters] screen of 12-point written text (with standard 1" margins) [2.54 centimeters]. The filing should explain the factual and legal basis for the appeal and why the original Internet adjudicator's decision should be reversed. No attachments will be allowed although appellant may refer to documents submitted in the original record.
   (2) Cost. The filing fee of $150 to appeal will be paid by the appellant. The appellant shall also file an appeal bond in an amount to be determined by the appellate officer.
   (3) Appellee's Response. The appellee will have ten days within which to file a response which shall be limited to one single-spaced, 8 and½"×11" screens of 12-point written text (with standard 1" margins) [21.59×27.94 centimeters]. The response filing should explain the factual and legal basis why the original Internet adjudicator's decision should be upheld. No attachments will be allowed although appellee may refer to documents submitted in the original record.
   (4) Final Appellate Decision. Within thirty days of the appellee's response filing, the appellate Internet adjudicator will render a final appellate decision which will be final and unappealable by the parties. The appellate decision will set forth the reasons for upholding, modifying or reversing the original decision and will contain findings as to whether the original Internet adjudicator either abused his discretion in finding erroneous facts or was clearly erroneous in applying the text of Article 2 of the U.C.C.
   (D) Stay of Judgment During Appeal. The final decision of the original Internet adjudicator that is being appealed cannot be enforced during the pendency of the appeal. Only after the appeal is resolved and a final appellate decision is rendered can the original final decision be enforced.
   (E) Frivolous Appeals and Payment of Interest.
   (1) Frivolous Appeals. If the appellate Internet adjudicator determines in the officer's discretion that the appeal is wholly without merit or was made for an improper purpose, such as to harass or improperly delay, the appellate Internet adjudicator may award the cost of the appellate filing fee and up to ten percent of the arbitration award, in addition to the upheld award itself, as a sanction against the appellant for filing the frivolous appeal.
   (2) Payment of Interest on Original Arbitration Awards Against Appellants. If an appellant loses an appeal, that appellant will pay interest at the prevailing rate on the original damages against it calculated from the date the original Internet adjudicator rendered a final decision until the date the appellate Internet adjudicator upheld the original decision. However, if the appellate Internet adjudicator modifies or reverses the original Internet adjudicator's decision, no interest will be awarded.

1. Rule 31: Enforcement of Judgments.
   (A) Directive to Pay. Any party ordered to pay an award is a "judgment-debtor." A judgment-debtor will be directed to pay the damage award set forth in the final judgment to the other party, the "judgment-creditor," within ten days of the judgment, or, if it was appealed, within ten days of the original decision being upheld or modified. Payment will be made through the System's pay service. If payment is not satisfied within ten days, the judgment-creditor may seek to enforce the judgment as set forth below by reporting the judgment-debtor's delinquent payment to the System. The judgment-creditor may also begin a collection action in a court of competent jurisdiction.
   (B) Judgment-Debtor Payment Histories.
   (1) Allowance by Parties to Report Payment History Should They Become a Future Judgment-Debtor. The parties will allow the System to report the timeliness of payments of all judgment-debtors, and such payment histories will be posted at the System's general website so potential purchasers and vendors can check the timeliness of payment of any judgments. The System will calculate the percentage and overall number of times a judgment-debtor was late in satisfying any judgments against it. No other information or comment will be provided other than the number and percentage of times, if any, that a particular party has been late. The intent of this provision is to provide a strong incentive for parties to pay any outstanding System judgments.
   (C) Enforcement Procedures: Costs and Fees in Enforcing any System Judgment in an Outside Court of Competent Jurisdiction.
   (1) Enforcement in a Court of Competent Jurisdiction; Sanctions. In the event a judgment-debtor does not fully honor a System judgment against it, and the disincentive of having the System report this non-payment on its website is not effective in coaxing the judgment-debtor to pay, the parties agree that the System judgment can be enforced in a court of competent jurisdiction, and the judgment-debtor agrees to pay all costs and reasonable attorneys' fees associated with enforcing the System judgment.
   (2) Duty of the Judgment-Creditor. It will be the sole responsibility of the judgment-creditor to enforce any System judgment in any court of competent jurisdiction and not the responsibility of the System.
   (D) No Liability of the System. The parties will hold the System harmless for any System judgment that cannot be enforced by the judgment-creditor, including but not limited to situations where the judgment-debtor has declared bankruptcy or otherwise has become judgment proof.

1. Rule 32: Application of the Results of Former Disputes to the Current Dispute.
   (A) Former Disputes between the Parties Cannot Be the Subject of the Current Dispute: "Claim Preclusion." In the event that the two current parties had a former dispute between them that was resolved by either a Internet adjudicator or by another court of competent jurisdiction, that former dispute cannot be the subject of the current lawsuit. Parties cannot use the System to have a second chance to resolve a dispute in the event that they are not satisfied with the way the first lawsuit was resolved. The prohibition on such claims that are being re-filed in an attempt to re-adjudicate them will be called claim Preclusion.
  (1) Precluding the Same Claim. A current dispute or a claim therein will be precluded under this rule if it is the same dispute or a claim therein as in the former dispute. If the current dispute or a claim therein is a different dispute or a claim therein, then this rule is inapplicable.
  (2) Between the Same Parties. A current dispute or a claim in that dispute will be precluded under this rule only if the previous dispute or a claim in that dispute that was resolved is between the same parties and the current lawsuit. If the plaintiff or defendant is a different party then this rule is inapplicable.
  (3) After a Final Judgment on the Merits. A current dispute or a claim in that dispute will be precluded under this rule only if the previous dispute or a claim in that dispute between the same parties was resolved by a final judgment on the merits. Final judgments on the merits are to be appealed, not simply re-filed with the System. If any former dispute or a claim in that dispute was not a final judgment or was dismissed for procedural reasons that did actually address the substance or merits of the dispute, then this rule is inapplicable.

(B) Former Issues Resolved in Prior Disputes Involving Either of the Parties Cannot Be Resolved in the Current Dispute: "Issue Preclusion." In the event that either of the two current parties had a former dispute where a legal or factual issue was resolved by either a Internet adjudicator or by another court of competent jurisdiction, that former resolved issue cannot be resolved again in the current lawsuit. Parties cannot use the System to have a second chance to resolve an issue that they already had a full and fair opportunity to litigate in a previous dispute. The prohibition on such issues that have already been determined in an attempt to re-adjudicate them will be called Issue Preclusion.
  (1) Precluding the Same Issue. A current issue will be precluded under this rule only if it is the same exact issue contained in a former lawsuit. If the issue in the current lawsuit is a different issue than what was previously determined in a former lawsuit, then this rule is inapplicable.
  (2) The Same Issue Must Have Been Actually Litigated and Determined in the Previous Dispute. A current issue will be precluded under this rule only if it was actually addressed in the former dispute and was a part of the final judgment in the former dispute. If the issue in the current lawsuit was not actually litigated and determined in the former dispute, then this rule is inapplicable.
  (3) The Same Issue Must have Been Essential to the Judgment in the Previous Dispute. A current issue will be precluded under this rule only if it was determined as an essential part of the previous dispute and was not merely a collateral or side issue not essential to the judgment in the former suit. If the issue in the current lawsuit was not essential to the judgment in the former dispute, then this rule is inapplicable.
  (4) The Party Against Whom Issue Preclusion Is Being Used Must Have Been a Party in the Previous Dispute Who Had a Full and Fair Opportunity to Litigate That Issue. A current issue will be precluded under this rule only if in the previous dispute the party against whom the rule is being used was a party in the previous dispute and had a full and fair opportunity to litigate the issue. If the party against whom the rule is being used was not a party in the previous dispute or did not have a full and fair opportunity to litigate that issue in the previous dispute, then this rule is inapplicable.

Gradation #2—

For Disputes with $5,001-$25,000 in Controversy

2.Rule 1: Scope of Provisions and Rules of Adjudicative Procedure.
  (A) Agreement to Arbitrate and Be Bound by These Rules of Adjudicative Procedure. By clicking "I Agree." when prompted on this website, thereby legally entering into the Agreement to Arbitrate, the buyer and seller to the e-commerce transaction ("the parties") agree to be bound by and subject to all of the applicable Rules of Adjudicative Procedure ("Rules") on this website. Those Rules explain the procedural rights and duties of the parties in resolving any dispute arising or existing between them. The Agreement to Arbitrate will appear on the vendor website.
  (B) Scope of this Set of Rules. This set of Rules will be the governing procedural law for all System disputes where the amount in controversy is at least $5,001, but does not exceed $25,000, or where the parties have agreed that their dispute be settled using this first set of Rules and have paid the corresponding filing fee.

2.Rule 2: Personal Jurisdiction: Waiver of Right to Sue in Another Forum.
  (A) Exclusive Personal Jurisdiction of the System. The parties agree to submit only and exclusively to the personal jurisdiction and venue of the "Cyberforum" offered by the System. They agree that only the System has the power over them to resolve their dispute arising from their e-commerce transaction. As a result, the parties waive any and all of their legal rights to attack the personal jurisdictional authority of the System over any e-commerce dispute arising or resulting between them.
  (B) Waiver of Jurisdiction and the Right to Appeal in any other Forum. The parties waive their rights to file lawsuits against one another in any other forum outside of the System, and they waive all rights to appeal any arbitration decision in any forum outside of the System's appellate procedure. The only right to appeal to a trial court outside of the System is if the System Internet adjudicator violates the Agreement to Arbitrate.

2.Rule 3: Personal Jurisdiction: Forum Selection Provision.
  (A) Contractual Duty Not to Sue in any other Forum.
    (1) Other Lawsuits Prohibited. The parties agree not to sue each other in any other court, forum, or tribunal, other than that offered by the System, in order to resolve any dispute between them arising out of or as a result of their on-line transaction.
    (2) Other Lawsuits Have No Effect. The parties agree that any unauthorized lawsuit outside of the System will have no effect in light of their Agreement to Arbitrate. The System forum selected by the parties will be the only valid forum to hear and decide the dispute between them.
  (B) Agreed Sanctions for Violation of this Provision.
    (1) Motions. In the event that either party files a lawsuit in any court, forum or tribunal outside of the System, the other party may make a motion to dismiss that action and cite this provision requiring them to resolve their dispute only by using the System. That party may also elect to make a motion in that court requesting a "stay," or postponement, of that action pending the resolution of the dispute by the System.

(2) Fees and Costs. The party filing the unauthorized lawsuit outside of the System agrees to and will pay any and all reasonable attorneys' fees and costs associated with the other party's attempts to enforce this provision.

2.Rule 4: Subject-Matter Jurisdiction: Type of Case.

(A) E-Commerce Contracts. The types of disputes to be resolved by the System are sales of goods transactions, or sales of mixed goods and commonly available fungible services, such as the sales of travel services (air flights, rail, cruise lines, rental cars, hotel rooms) and any credit card or financial transaction disputes that are made over the Internet ("E-Commerce"). This means that the subject-matter jurisdiction of the System involves only claims for breach of contract (non-delivery/non-conforming goods or services), breach of warranty and merchantability, and collection or non-payment.

(B) Negotiation/Mediation for other Types of Lawsuits. For all other types of non-contract law disputes, the parties may request and pay for the negotiation and/or mediation services of the System pursuant to 2.Rule 21.

2.Rule 5: Subject-Matter Jurisdiction: Amount in Controversy.

(A) Amount in Controversy. The Gradation of Rules that apply for disputes with between $5,001 and $25,000 in controversy will be preferably Gradation #2. Alternatively, the parties may mutually agree otherwise and/or one of the parties may pay a fee for using a different gradation and/or a rule of using a vendor site and/or rule previously or contemporaneously agreed to by vendor, purchaser, or both specifically sets forth different amounts or other criteria for using particular gradations. The same applies for other gradations. These Rules are contained in 2.Rule 1-2.E. Rule 34.

(B) Option to Stipulate to Another Gradation. If the parties in one gradation are willing to stipulate or agree to the procedural options in a higher or lower gradation, and are willing to pay the higher or lower filing fee for that gradation, then the parties will be allowed to do so in the discretion of the Internet adjudicator.

(C) Determination of Amount in Controversy.

(1) Based on Purchase Price in Contract. The amount in controversy for each transaction shall be determined solely by the price of the goods/services sold, exclusive of costs and interest. The sales price of the goods/services sold, the subject of the lawsuit, shall determine the amount in controversy which, in turn, shall determine which particular gradation of the Rules (Gradation #1-#4) will govern the resolution of that dispute (note that preferred rules for gradation #1-#3 are provided herein, and that preferred rules for gradation #4 are the federal rules of civil procedure or similar).

(2) Counterclaims. A defendant's counterclaims will ordinarily not be added to the plaintiff's claims to determine the amount in controversy so as to allow a defendant to move the dispute to a higher gradation by merely alleging a counterclaim. However, the counterclaim will be added to the plaintiff's claims in determining the amount in controversy if such counterclaim arises directly out of the same transaction or occurrence as, and is clearly intertwined with, the plaintiff's claims.

(3) Determination by Internet adjudicator. Since the disputes to be resolved by the System are contract actions, the price of the good(s)/service(s) in question on the invoice is controlling in determining the amount in controversy. The Internet adjudicator will make that determination. If more than one good or service is sold, then the amount in controversy will be the total price of those goods/services as determined by the Internet adjudicator. No other factor will be considered in determining the amount in controversy.

(D) Hearing to Determine Amount in Controversy in Dispute. In the event it is not clear from the sales contract or invoice what amount is exactly in controversy, a Internet adjudicator will be assigned by the System to conduct a preliminary on-line hearing with the parties in order to determine the amount in controversy and therefore which gradation of Rules will apply. The Internet adjudicator has the discretion to order costs to be paid by the party raising the issue if it is determined the amount in controversy was clear.

2.Rule 6: Applicable Substantive Law: Text of Article 2 of the U.C.C.

(A) Applicable Substantive Controlling Contract Law. The dispute will be resolved by looking to the legal principles contained in the written text of Article 2 of the U.C.C. written by the American Law Institute. The U.C.C. serves as the sole applicable substantive law, and the the System Internet adjudicator is required to and will apply only U.C.C. substantive law in resolving the dispute.

(B) Application of the Text of the U.C.C. Only. The parties will argue their respective positions pursuant only to the "plain meaning" interpretation of the explicit text of Article 2 of the U.C.C. as it appears on this website. The text of Article 2 of the U.C.C. will be the exclusive binding law governing the resolution of the dispute. The text will also apply to the sales of goods and services such as those enumerated in 2.Rule 4.

2.Rule 7: Applicable Language and Valuations: English and U.S. Dollars.

(A) English Requirement. Although the System can hear disputes arising anywhere in the world, the language in which the dispute will be resolved is English. The Internet adjudicator's decision and all correspondence will be in English. Submissions of all writings, evidence, and oral presentations must also be in English.

(B) Translations Allowed. Any party submitting any item created in another language must submit an English translation. If the opposing party disagrees with the translation, both parties shall obtain a third person who shall provide a translation which shall be submitted as the accepted translation. the System will provide translation services for a fee. (See below exemplary "Costs & Fees", or this cost may be included in a per transaction fee for transactions occurring at the vendor site).

(C) Cost. The cost of the translation must be paid by the party submitting the item that needs to be translated if it is not included in the per transaction fee at this vendor's site.

(D) Money Valuations. All the System Provisions and Rules that make reference to costs or money amounts set forth in a pricing or rate sheet will be denominated and valued in a common currency such as United States dollars. All payments to the System are required in this common currency.

2.Rule 8: Communication Facilitation.

(A) Duty to Submit Identifying Information. The parties will submit on-line to the System their current e-mail addresses, home and business telephone numbers, and home and business street addresses upon registration with the System.

(B) Continuing Duty to Report in the Event of Litigation. The parties' duty to report this information is a continuing duty, and the parties are required to update that information within 10 days of any change to it during litigation.

2.Rule 9: Waiver of All Claims Against the System.
  (A) Waiver. The parties waive or give up any and all claims against the System based on:
    (1) any actions of any negotiation facilitator (mediator),
    (2) the substantive legal rulings, factual findings or any actions of any Internet adjudicator,
    (3) the System's hosting of a separate web page regarding the timeliness of payments of any past judgments;
    (4) the inability of a party to enforce a the System award against another party; and/or
    (5) any other reason.
  (B) Warranty Disclaimer.
    (1) No Warranties or Representations. This provision acts as a "WARRANTY DISCLAIMER" which means that the System and this website, including any content or information contained within it, is provided "as is" and "as available" with no representations or warranties of any kind, either expressed or implied, including, but not limited to, the implied warranty of merchantability, fitness for a particular purpose and non-infringement.
    (2) Assumption of Risk. Any user or party assumes total responsibility and risk for use of this the System website and holds the System harmless from any liability.
    (3) Sole Remedy. The sole remedy for dissatisfaction with the System and/or this site is to terminate use of the site and the System's service.
    (4) Application to All the System Related Entities. the System, its employees, agents, affiliates, and sponsors, including the IAJ and all Internet adjudicators, are neither responsible for nor liable for any direct, indirect, incidental, consequential, special, exemplary, punitive or other damages arising out of or in any way relating to this site, content or information contained within this website, to the extent allowable by law.
  (C) Choice of Law and Venue Regarding the Use of the System.
    (1) California Law Will Control Any Dispute Between the System and Any User or Party. The Agreement to Arbitrate and the relationships between the System, all browsers of this website, and all parties to the Agreement to Arbitrate, shall be interpreted and governed by the laws of the State of California without regard to the conflicts of law provisions of that state.
    (2) Exclusive Venue in Sacramento, Calif. Any action or proceeding to interpret or enforce this agreement between the System, all browsers of this website, and all parties, shall be brought before a state or federal court in Sacramento, Calif. Each browser and party consents to the exclusive jurisdiction and venue before such Sacramento, California courts.
  (D) Entire Agreement. These Arbitration Provisions contained in the Rules constitute the entire agreement between the parties, browsers and the System with respect to the the System website. If any part of this agreement is found invalid or unenforceable by a court of competent jurisdiction, the remainder of this agreement shall be given reasonable effect.
2.Rule 10: Two-Year Statute of Limitations.
  (A) Two-Year Period. There is a two-year statute of limitations period (time deadline) within which to file any and all claims or counterclaims brought pursuant to any on-line, e-commerce transaction where the amount in controversy is between $5,001 and $25,000.
  (B) The Start Date. The statute of limitations period will begin running—which will be considered the "start date" of the time deadline—on either the date when the goods in question are delivered to the purchaser, or one month after the purchaser has paid the vendor for the goods, whichever is determined to be the earlier date. Parties are deemed to have filed properly within the two-year limitations period if they electronically file their complaint with the System within two calendar years of the "start date."
2.Rule 11: Filing a Complaint by the Plaintiff.
  (A) Page Limit. A complaining plaintiff may electronically file a complaint with the System not to exceed three, single-spaced, 8 and ½"×11" [21.59×27.94 centimeters] screens of 12-point written text with standard 1" [2.54 centimeters] margins.
  (B) Contents of Complaint. The complaint will state, in separate numbered paragraphs as set forth below, the following:
    (1) the goods purchased;
    (2) the total sales or invoice price;
    (3) the pertinent written terms of the contract allegedly breached by defendant; and,
    (4) the factual basis for the defendant's alleged breach of that contract.
    The complaint will contain, if necessary, additional lettered subparagraphs under heading #4, with each subparagraph ((4)(a), (4)(b), (4)(c), etc.) containing the specific factual allegations which constitute the plaintiff's claim or claims for relief.
    (5) A list of the legal claim(s) for relief and the corresponding provisions of Article 2 of the U.C.C. entitling plaintiff to legal recovery from the defendant ((5)(a), (5)(b), (5)(c), etc.).
  (C) Filing Fee. The cost of filing the complaint will be paid by the plaintiff (see exemplary "Costs & Fees" below). The fees may be paid otherwise as described above at gradation #1, such as being included in a per transaction fee at a vendor site or other dispute resolution insurance program participated in by the vendor and/or purchaser.
2.Rule 12: Establishment of the Parties' Special Dispute Resolution Page.
  (A) Parties' Separate Dispute Resolution Page. When plaintiffs submit their complaint on-line to the System on this website, the System will create a special Dispute Resolution Page for only the two parties and the Internet adjudicator, through which the parties can conduct all of the dispute resolution communications and filings with each other and the Internet adjudicator.
  (B) Password Access. the System will provide a password given only to the parties involved in the dispute and the Internet adjudicator to access and submit all documents and filings. It is the responsibility of the parties to keep the password confidential to preserve their privacy.
  (C) Privacy Not Guaranteed. Although the Dispute Resolution Page of the parties can be accessed by use of a password given only to the parties, the System cannot assure complete privacy. The parties should therefore consider their filings and submissions to be public documents, just as all filings and documents are considered public documents in most federal and state courts in the United States and other courts of competent jurisdiction.
  (D) All Pleadings and Submitted Documents to Be Posted on the Parties' Dispute Resolution Page; Notification.
    (1) Posting on the Parties' Dispute Resolution Page. Each party must post all submitted documents and pleadings on the parties' Dispute Resolution Page.
    (2) the System Dispute Resolution Page to Provide Notification. When posting a document or pleading on the parties' Dispute Resolution Page, the System website will automatically notify the opposing party through e-mail that a pleading or filing has been posted on the page and the opposing party should access the page to view the posting.

2.Rule 13: Time.

(A) Computation. In computing any period of time prescribed or allowed by these rules, the day of the act, event, or default from which the designated period of time begins to run shall not be included. All weekends and holidays shall be included in the time computations. If the last day for a time period ends on a weekend or holiday the due date shall be extended to the next business day.

(B) Enlargement. The parties may request an extension of time for any time deadline by filing a motion requesting the extension at least five days before the time deadline. The Internet adjudicator, in his discretion, may grant the extension of time if the extension is warranted by good cause and there would be no unfair prejudice against the non-requesting party.

2.Rule 14: Issuance of an E-Summons by the System and Service of the Complaint.

(A) Service to Defendant. In addition to the the System website automatically sending an e-mail posting notification to the defendant, within 5 days of the plaintiff filing the complaint, the System will send to the defendant at defendant's registered e-mail address, an additional copy of a the System e-summons, containing an attached copy of the plaintiff's complaint. The summons shall direct the defendant to immediately confirm receipt of the c-summons and complaint and to answer the complaint within 20 days of defendant's acknowledgment of receipt of the summons and complaint. The plaintiff shall also notify the defendant and send an e-mail copy of the summons and complaint to the defendant.

(B) E-Mail Tracking. The e-summons will contain an automatic on-line acknowledgment of receipt of the summons sent back to the System electronically proving receipt when the defendant opens the e-mail.

(C) Acknowledgment of Receipt of Service. In addition, there will be a request from the plaintiff for the defendant to acknowledge by e-mail immediately and voluntarily a confirmation of receipt of the e-summons. This voluntary acknowledgment will constitute completed service of the complaint to notify the defendant of the lawsuit.

(D) Failure to Acknowledge Receipt of Service. If defendant fails to acknowledge the receipt of the System's e-summons and copy of the plaintiff's complaint within ten days, the plaintiff will call the defendant by telephone to confirm receipt and send a hard copy via U.S. mail and may charge the costs of the long-distance call, the postage, and the administrative time to the defendant, unless defendant can demonstrate good cause as to why defendant did not immediately acknowledge receipt of service. the System will assess those costs when requested by plaintiff and will order payment by defendant to plaintiff if there was no just cause.

(E) Timing. The date of service will be the date on which the defendant acknowledges receipt of the e-summons and plaintiff's complaint, or, if there is no such acknowledgment within ten days, then it will be the date the phone call is placed from plaintiff to the defendant.

2.Rule 15: Default.

(A) Entry of Default. If the defendant does not respond to the service and to plaintiff's telephone call within 20 days of the date of the call, defendant will be deemed to be in default. At that point, the plaintiff may request an Entry of Default. The Internet adjudicator will enter default against the defendant if there has been no response from defendant.

(B) Default Hearing for Plaintiff to Prove Damages. Within 30 days of the Entry of Default, the Internet adjudicator will schedule a default hearing so that the plaintiff will have the opportunity to prove the damages alleged against the defendant. The hearing will be made either by written argument made to the Internet adjudicator on the parties special Dispute Resolution Page, or by live telephone conference scheduled by the Internet adjudicator.

(C) Default Judgment. At the hearing to prove damages, the Internet adjudicator will hear plaintiff's arguments and determine the damages the plaintiff has suffered, if any. At the end of the hearing, the Internet adjudicator will immediately issue a decision against defendant if plaintiff has proved the damages alleged and that such damages are still owing. If the Internet adjudicator finds damages suffered by plaintiff, then at the end of the default hearing, the Internet adjudicator will issue a default judgment against the defendant. At that point, the plaintiff can pursue enforcement of payment for a default judgment in accordance with 2.Rule 33.

(D) Set Aside of the Entry of Default or the Default Judgment. At any time before the Entry of Default has been made or within 90 days after a Default Judgment has been issued, the defendant may make a motion to set aside the Entry of Default or the Default Judgment. The Internet adjudicator will set aside the Entry of Default or the Default Judgment and allow the defendant to respond to the complaint provided the defendant can demonstrate good cause as to why there was a failure to respond timely to the plaintiff's complaint.

(E) Default After a Response. In the event that the defendant initially responds to the complaint and defends the case, but then at any later time fails to continue defending the case, the plaintiff may move for an Entry of Default and a Default Judgment in accordance with this rule.

2.Rule 16: Defendant's Answer to Complaint.

(A) Requirement to Answer Plaintiff's Complaint. Defendant must file an answer to the plaintiff's complaint with the System within 20 days of the date of service. No pre-answer motions or responses other than an answer are allowed.

(B) Contents of Answer.
(1) Admissions/Denials. The answer must contain in separate numbered paragraphs the defendant's specific admissions or denials corresponding exactly to each numbered paragraph of the allegations contained in the plaintiff's complaint.
(2) Affirmative Defenses. The answer will also set forth under a separate heading a list of any legal or factual affirmative defenses, if any, and the defendant's version of events in separate numbered subparagraphs.
(3) Counterclaims by the Defendant against the Plaintiff May Be Included. The answer may contain under a separate heading a list of any counterclaims that the defendant may have against the plaintiff arising out of the same transaction or occurrence on which plaintiff is suing.

(C) Page Limit. The answer is not to exceed a total of five, single-spaced, 8 and ½"×11"[21.59×27.94 centimeters] screens of 12-point written text, with standard 1" [2.54 centimeters] margins. Note that forms are preferably made available at the System and/or vendor site for each of the complaint, answer, reply to counterclaims, final submissions, motions, requests for discovery, etc. Use of the forms may be associated with a fee or may be included in per transaction or insurance fees already paid by vendor and/or purchaser.

2.Rule 17: Plaintiff's Reply to the Defendant's Answer.

(A) Reply to a Counterclaim. If the defendant has filed any counterclaim, the plaintiff may file a Reply not to exceed one single-spaced, 8 and ½"×11" [21.59×27.94 centimeters] screen of 12-point written text, with standard 1" [2.54 centimeters] margins. In the Reply, the plaintiff will admit or deny the allegations constituting the counterclaim. The Reply will contain the same information as the answer (admissions, denials, and affirmative defenses), but counterclaims to a counterclaim are not allowed.

(B) Timing. If a Reply is warranted, plaintiff must file it with the System within 10 days of receiving the answer.

2.Rule 18: The Pleadings Record.

(A) Limitations of Pleadings. The Complaint, Answer and Reply, if a Reply is warranted, along with the parties° Final Argument Submissions (see 2.Rule 27) will constitute the entire pleadings record of the case.

(B) No Motions Allowed. No additional motions/filings will be allowed except motions to compel discovery production after a party fails to do so. However, additional "extraordinary motions" may be allowed, in the discretion of the Internet adjudicator, so that a party may seek relief for an abuse or serious misconduct by the other party. The Internet adjudicator, in the officer's discretion, may sanction the offending party or sanction a party for filing a frivolous extraordinary motion.

(C) No Amendments to the Pleadings Allowed. There will be no amendments to the pleadings unless good cause is shown and the Internet adjudicator allows it.

2.Rule 19: Parties Limited to E-Commerce Purchaser and Vendor Only.

(A) Actions Limited to One Plaintiff and One Defendant. The dispute to be resolved is limited only to the purchaser and to the vendor, the only two parties to the the System Agreement to Arbitrate which controls any dispute arising out of or as a result of their specific on-line transaction.

(B) No Additional Parties. No additional parties can be added to the dispute. Any additional parties must file their own separate the System dispute resolution actions.

2.Rule 20: Consolidation of Case. In the event that many purchasers or vendors have the same or similar complaint against the same vendor or purchaser, and it would be efficient to consolidate those separate lawsuits into one larger action, the Internet adjudicator, in the officer's discretion, may do so. The Internet adjudicator will make any necessary or reasonable adjustments in terms of filing deadlines and requirements, in the officer's discretion, due to there being additional parties. The Internet adjudicator will inform the parties of all adjusted time deadlines and requirements.

2.Rule 21: Private Negotiation and Mediation Options.

(A) Negotiation & Mediation Options Available. The parties may elect by mutual agreement to participate in either the negotiation option or mediation option offered by the System as set forth below:

(1) Negotiation Option. At any point after a dispute arises, the parties may elect to engage in party-to-party direct negotiation sessions over the Internet on their own special Dispute Resolution Page provided by the System.

(a) Privacy. Once the private Dispute Resolution page is created, the parties can contact one another directly and attempt to settle the dispute on their own. The parties can elect to make their special negotiation page private so the Internet adjudicator does not have access to their negotiation sessions.

(b) Cost. There is preferably no cost for using the negotiation service.

(c) Settlement and Voluntary Dismissal. If the parties settle, it is their responsibility to create their own settlement agreement, jointly dismiss the case, and inform the System that their dispute is resolved.

(2) Mediation Option. At any point after a dispute arises, the parties may elect to engage in three-way (party-to-party, with a the System mediator) mediation sessions over the Internet, with the mediator facilitating on their Dispute Resolution Page. The mediator, with the parties' voluntary participation, will attempt to facilitate a negotiated settlement between the parties. Both parties must request the mediation sessions. As with any mediation, the parties are free to reject the suggestions of the mediator at any time.

(a) Cost. The costs of using the mediation service will be shared equally by the parties (See exemplary "Costs & Fees" below, or as above the cost may be paid in advance in per transaction fee payments or otherwise).

(b) Privacy and Confidentiality. If the parties used the negotiation option but were unsuccessful, the parties may elect to reveal the substance of their settlement negotiations to the mediator; however, the mediator will assess the time to read the submissions as part of the mediation hourly charges. If either party elects not to submit the on-line settlement negotiations, the mediator will not be allowed to consider those private confidential settlement negotiation communications. The mediator will keep all communications private and confidential. The mediator will be selected by the IAJ. Mediators may be IAJ Internet adjudicators or, in the discretion of the IAJ, non-lawyer experts in the field that is the subject of the dispute.

(c) Settlement and Voluntary Dismissal. If the parties settle with the assistance of the mediator, it is their responsibility to create their own settlement agreement and jointly dismiss the case. They must inform the System that their dispute has been resolved.

(B) Timing. If the parties mutually elect to engage in either negotiation or mediation options, all applicable filing time deadlines will remain in force unless the parties mutually agree to postpone the deadlines and the Internet adjudicator allows such postponement. All postponements shall be at the discretion of the Internet adjudicator only.

(C) Right to Refuse to Mediate or Arbitrate. Any dispute submitted for resolution to the System may be rejected by the System if it is determined not to be a proper case for dispute resolution. The parties have no legal right to demand that the System hear their dispute. If the System rejects a particular dispute for resolution, neither party will be assessed any fees or charges associated with their case.

2.Rule 22 Submission of the Dispute to Arbitration.

(A) Submission Immediately or after the Negotiation or Mediation Options. If settlement negotiations and mediation sessions are unsuccessful under 2.Rule 21 or if the parties have not elected to exercise those options and wish to proceed directly with formal arbitration after their pleadings have been submitted, the parties are entitled to submit the dispute to a the System Internet adjudicator.

(B) Selection of Internet adjudicator to Arbitrate the Dispute. The Internet adjudicator will be assigned to the case by the IAJ. . .

2.Rule 23: Credentials, Training, Objectivity of the the System Internet adjudicator/Arbitrators.

(A) Institute for Administrative Justice ("IAJ")—McGeorge School of Law. All legal services of the System provided to the parties to an e-commerce transaction who sign Agreements to Arbitrate any disputes that have or might arise between them will be provided, under contract, by the Institute for Administrative Justice ("IAJ"), at the University of the Pacific, McGeorge School of Law, located in Sacramento, Calif. These legal services provided by the IAJ under contract to the System consist primarily of on-line dispute resolution services conducted by remote IAJ Internet adjudicators.

Established in 1972, the IAJ has over 25 expert Internet adjudicators currently employed to resolve disputes in a traditional manner as well as on-line to the System disputants. Over the past two decades, the IAJ has expanded its service components to administrative agencies, and has successfully provided dispute resolution services as well as training and consultation in dispute resolution. The Internet adjudicator will keep all matters private and confidential.

(B) Contract between the System and the IAJ. As an independent body, the IAJ and its Internet adjudicators are insulated from any economic pressure from either on-line vendors or purchasers who might end up as party disputants because the IAJ operates under the auspices of McGeorge School of Law and is paid by the System under contract to provide these services, not by the vendors or purchasers. Further, the IAJ Internet adjudicators who will provide these online legal services to disputants on behalf of the System receive their pay, regardless of outcome of disputes, by the IAJ, who is in turn paid by the System.

(C) Full Financial Disclosure of the System and the IAJ. An explanation of the System owners and affiliates and their respective financial interests may be provided at the vendor site and/or the System site.

2.Rule 24 Discovery—Factual Investigation.
- (A) The Official Factual Record.
  - (1) Pleadings and All Previous Correspondence. The pleadings and all previous Internet correspondence between the parties up until the complaint is filed, automatically become the official legal and factual record of the case.
  - (2) Additional Requested Information—"Discovery." The parties may request information from one another and this requested, discovered information also becomes part of the official factual record of the case.
- (B) Discovery Start Date; Discovery Period; and Discovery Cut-Off Date.
  - (1) Discovery Start Date. Ten days after the last pleading is filed—which will be known as the "discovery start date"—the parties are entitled to begin requesting additional factual information from one another. No discovery may be requested before the discovery start date.
  - (2) Discovery Period. The time period between the discovery start date and the discovery cut off date will be known as the discovery period. During the discovery period, the parties are entitled to certain exchanges of information and may make certain requests for specific information in accordance with the provisions contained in these discovery rules.
  - (3) Discovery Cut-Off Date. All discovery requests must be submitted by the requesting party and completed by the responding party before the "discovery cut-off date." The discovery cut-off date is 15 days before the "Final Submission Date." The Final Submission Date is to be set by the Internet adjudicator.
- (C) Initial Disclosures: List Of Potential Witnesses and List of Potential Exhibits/Documents.
  - (1) Timing. At the beginning of the discovery period, the parties will submit their initial disclosures to one another. The parties may update the disclosures during the discovery period if witnesses or documents are discovered that were not available at the beginning of the discovery period. There is a continuing duty through the discovery period to update the initial disclosures.
  - (2) List of Potential Witnesses. Each party will provide to the other, through the parties' Dispute Resolution Page, a list of the potential witness they believe have knowledge or information relevant to the dispute. They will also designate whether they are intending to call such persons as actual witnesses in the dispute.
  - (3) List of Potential Exhibits/Documents. Each party will provide to the other, through the parties' Dispute Resolution Page, a list of potential exhibits/documents they believe contain information relevant to the dispute. They will also designate whether they are intending to submit such exhibits/documents as evidence in the case in their Final Submissions. No witness statement or testimony or document/exhibit will be considered as evidence by the Internet adjudicator in rendering a decision in the dispute if such witness or document was not listed on the final list of witnesses or list of exhibits for that party.
- (D) Twenty-Five Written Interrogatories.
  - (1) Twenty-Five Questions Relevant to the Dispute. During the discovery period, each party will be allowed to ask the other party a maximum of twenty-five written questions relevant to their dispute. The interrogatories may be asked in different sets during the discovery period, but a total of only twenty-five will be allowed during that period. The questions shall be direct. If the questions have subparts, then each subpart will be counted as a separate interrogatory.
  - (2) How Submitted; Posting. The requesting party will submit the interrogatories by e-mailing their questions to the parties' Dispute Resolution Page in accordance with 2.Rule 12.
  - (3) Parties Must Respond; Timing. The responding party has a duty to answer the interrogatories fully, timely, and in good faith. The responding party must answer the interrogatories within 20 days of receiving them and then e-mail their answers to the parties' Dispute Resolution Page in accordance with 2.Rule 12.
- (E) Ten Requests for Production of Documents (or Inspection of Tangible Items).
  - (1) Ten Requests for Production of Documents Relevant to the Dispute. During the discovery period, each party will be allowed to ask their opponent a maximum of ten requests for production of documents relevant to their dispute. One request may encompass multiple documents which satisfy the request. The requests for production may be asked in different sets at different times throughout the discovery period, but a total of only ten requests will be allowed during that period. The requests for production shall be direct, and if the requests have subparts, then each subpart will be counted as a separate request for production. "Documents" include any handwritten or type-written forms, electronically stored material, photos, drawings, videotape, film, x-rays, including anything capable of being put in a recordable form of any kind.
  - (2) Five Requests for Production of Tangible Items for Inspection. During the discovery period, the parties will be allowed to ask their opponent for a maximum of five written requests for production of tangible items relevant to their dispute in order to inspect them. The requests for production may be asked in different sets throughout the discovery period, but a total of only five will be allowed during that period. The requests for production shall be direct, and if the requests have subparts, then each subpart will be counted as a separate request for production. "Tangible" item is any physical three-dimensional item that cannot be stored and transmitted for inspection over the Internet and instead must be sent via a private courier or postal service.

(3) How Submitted; Posting; How to Respond.
  (a) Documents. Responding parties will submit their responses to the requests for production of documents by e-mailing their responses to the parties' Dispute Resolution Page in accordance with 2.Rule 12. This may require responding parties to "scan" and digitize hard-copy documents only if they do not exist in transmittable form over the Internet.
  (b) Tangible Items. Responding parties will submit their responses to the requests for production of tangible items by sending via courier or postal delivery service the requested tangible items directly to the the System Internet adjudicator for preliminary inspection. The Internet adjudicator will note receipt of the item, inspect the item, and then send it via courier or postal delivery service to the requesting party for inspection. The inspecting party will note receipt of the item, inspect it, and then return it via courier or postal delivery service to the Internet adjudicator and may note for the Internet adjudicator any preliminary concerns or objections to the item. The Internet adjudicator will inspect the item again and compare it to its original preliminary inspection to make sure the item has not been altered or tampered with while it was being inspected by the requesting party.
(4) Parties Must Respond; Timing.
  (a) Documents. The responding party has a duty to answer the requests for production fully, timely, and in good faith. The responding party must provide the documents within 20 days of receiving the requests and post them to the parties' Dispute Resolution Page in accordance with 2.Rule 12.
  (b) Tangible Items. The responding party will send via courier or postal delivery service the requested tangible items directly to the the System Internet adjudicator for preliminary inspection within 20 days of receiving the requests and post a digitized photograph of the item on the parties' Dispute Resolution Page in accordance with 2.Rule 12. The Internet adjudicator will inspect the item, and then send it via courier or postal delivery service to the requesting party for inspection within 10 days of receiving the item. The inspecting party will inspect the item, and then return it via courier or postal delivery service to the Internet adjudicator within 10 days of receiving the item and may note for the Internet adjudicator any preliminary concerns or objections to the item.
(F) Ten Requests for Admissions.
(1) Ten Requests for Admissions Relevant to the Dispute. During the discovery period, each party will be allowed to ask the other party a maximum of ten written requests for admissions relevant to the dispute. The requests for Admissions may be made in different sets during the discovery period, but a total of only ten will be allowed during that period. The requests for admissions shall be direct. If the requests have subparts, then each subpart will be counted as a separate request. The parties have a duty to answer, "admit," or deny," to each request for admission and do so on time, and in good faith.
(2) How Submitted; Posting. The requesting party will submit the requests for admission by e-mailing their requests to the parties' Dispute Resolution Page in accordance with 2.Rule 12.
(3) Parties Must Respond; Timing. The responding party has a duty to answer the requests for admission fully, timely, and in good faith. The responding party must answer the requests for admissions within 20 days of receiving them and then e-mail their responses to the parties' Dispute Resolution Page in accordance with 2.Rule 12. Any request for admission not answered within 20 days of receipt will be deemed admitted in favor of the requesting party.
(G) Pre-Trial Disclosure of Any Relevant Documents and Tangible Evidence that Each Party Plans to Submit to the Internet adjudicator for Final Decision. Regardless of any discovery requests made in the case, the parties are required to make mandatory pre-trial disclosures of all the exhibits they intend to use in their final submissions to the Internet adjudicator.
  (1) Setting a Final Argument Submission Date. the System will set a final argument submission date which will be determined as follows:
  (A) On the same day the parties must produce requested documents, or
  (B) Within 10 days after they must answer interrogatories if no requests for production are submitted, or
  (C) Ten days after the last pleading is filed if no interrogatories or requests are submitted.
  (2) Exhibits/Documents Due Thirty Days before Final Argument Submission Date. Thirty days before the final submission date, the parties will submit to the Internet adjudicator any and all documents (including photographs, affidavits of other individuals, charts, records) that they plan to submit for the Internet adjudicator's consideration as a part of their final argument that is not already a part of the existing record. They will e-mail their exhibits to the parties' Dispute Resolution Page in accordance with 2.Rule 12.
  (3) Failure to Submit Exhibits/Documents Thirty Days before Final Argument Submission Date. If an exhibit or document that a party plans to use for the final submission to the Internet adjudicator is not produced at least thirty days before the final submission date, it will not be considered by the Internet adjudicator as part of the final submission.
2.Rule 25: Failure to Produce Discovery Requests.
  (A) Requirement to Produce Discovery Requests. There is a duty and requirement for the parties to produce the discovery requests within the time limits. Any party failing to produce and discovery within the time limits will be assumed to be in violation of this rule.
  (B) Failure to Produce; Motion to Compel; Response.
  (1) Fifteen Days to File Motion to Compel. If a party fails to produce any discovery request within the time limit, the requesting party has 15 days within which to file a motion to compel the production of the requested discovery. That motion to compel will be filed on-line with both the Internet adjudicator and the party that has failed to produce. The motion will state the discovery requests, when they were sent, and must show that the other party has failed to respond within the applicable time limit.
  (2) Failure to File a Motion to Compel. Any failure by the original requesting party to make a motion to compel within the 15 days after the requested discovery was due will mean that the discovery requests are no longer in effect, and the party failing to produce will not be required to produce that requested discovery at any time in the future.
  (3) Response to Motion to Compel. If the motion to compel is filed timely, the party who has failed to produce the requested discovery has 5 days to respond to the motion to compel and must explain: (1) why they have failed to produce the requested discovery, and (2) why the Internet adjudicator should not impose any sanctions. That response will be filed on-line with both the Internet adjudicator and the requesting party.

(4) Discretion of the Internet adjudicator. If a disobedient party fails to produce requested discovery information but has "good cause" as to that failure, such as a request for trade secrets, the Internet adjudicator may in his discretion, determine the discovery requests are not allowed.

(C) Order to Produce the Requested Discovery; Sanctions. If the Internet adjudicator is not satisfied with the reasons for the failure to produce the requested discovery, the Internet adjudicator will order the party to produce the requested discovery immediately and, in the Internet adjudicator's discretion, may also order any, or all, of the following sanctions:

(1) Costs to Prepare Motion to Compel. The Internet adjudicator may order the party to pay for the requesting party's costs and reasonable attorney's fees associated with having to file the motion to compel.

(2) Punitive Costs. The Internet adjudicator may order the party to pay up to 10% of the amount in controversy as a sanction for not complying with this rule.

(3) Matters Deemed Admitted. The Internet adjudicator may order that certain matters related to the discovery requests are admitted in favor of the requesting party and against the party who failed to produce.

(4) Dismissal. If the requested discovery is never produced despite an order compelling the production of the requested discovery, the Internet adjudicator may order that the entire lawsuit be dismissed with prejudice against the party who fails to produce and may order judgment in favor of the requesting party.

2.Rule 26: Dismissals before the Final Argument Submissions.

(A) Defendant Confesses Judgment. At any point during the proceedings, a defendant may elect simply to pay the requested damages, and the case will be deemed resolved pursuant to this rule.

(B) Plaintiff Drops the Action. At any point during the proceedings, a plaintiff may elect simply to discontinue the action against the defendant, and the action will be deemed resolved pursuant to this rule. However, if the defendant has set forth any counterclaims, those claims will not be dropped, and the action will continue with respect to those counterclaims.

(C) Defendant Dismisses Plaintiff's Case for Failure to Go Forward. At any point during the proceedings, if the plaintiff is not responding and is not going forward with the action, the defendant may ask the Internet adjudicator to dismiss the plaintiff's inactive action.

(D) The Parties' Stipulated Dismissal. At any point during the proceedings, if the plaintiff and the defendant settle the action pursuant to negotiation or mediation, the parties should submit a motion to voluntarily dismiss the action pursuant to this rule.

2.Rule 27: Final Argument Submissions.

(A) Final Argument Submissions to the Internet adjudicator. On the final argument submission date, each party may submit up to five, single-spaced, 8 and ½"×11" [21.59×27.94 centimeters] screens of 12-point written text (with standard 1" [2.54 centimeters] margins) which will constitute their final argument submission explaining their legal and factual position in the dispute to the the System Internet adjudicator. The parties will post their final submission on the parties' Dispute Resolution Page in accordance with 2.Rule 12 so that each party can review it.

(B) Attachments to the Final Argument Submissions.

(1) Case Law Interpretations. In addition to written argument, the parties may attach any case law opinion from a competent court interpreting the governing U.C.C. provisions in a way that is helpful to the submitting party's argument. Although there is no binding case law, the Internet adjudicator may consider such attached legal opinions in his discretion as persuasive authority.

(a) All Case Law is Persuasive, Not Binding Law. No binding case law interpretations or legal opinions will be recognized by the Internet adjudicator. Therefore all case law will be considered persuasive law only, not binding.

(b) Case Law May be Submitted as Persuasive Law Only. The parties may submit any cases that interpret the text of Article 2 of the U.C.C., similar provisions, or any case from a competent court or tribunal, or previous the System Internet adjudicator decisions, but the Internet adjudicator in the current case will consider such decisions to be persuasive case law interpretations only and therefore will not be bound by, or be required to apply, the reasoning contained in those written opinions.

(2) Case Law Page Limit. Although there is no limit as to the number of such persuasive case law opinions that the parties may submit, each party is limited to a total of 100 published pages of persuasive case law which can be attached to their final submissions to the Internet adjudicator.

(3) Duty of Submitting Party. Every cited case law decision must be submitted not only to the Internet adjudicator, but also to the opposing party. The cost and responsibility of reproducing those cases for the Internet adjudicator and the opposing party will be borne by the party submitting them.

(C) Replies. Within ten days after the final argument submission date, each party is entitled to file a one-page reply to the opposing party's final argument submission. Any case law submitted as attachments cannot exceed, together with any case law already submitted in the final submission, the overall limit of 100 pages.

(D) Consideration of all Submissions in Rendering a Final Decision Resolving the Dispute. The Internet adjudicator will review and consider all of the following in rendering a final decision:

(1) the pleadings;

(2) all correspondence between the parties;

(3) the answers to any interrogatories;

(4) the documents and exhibits produced thirty days before the final argument submission date;

(5) the negotiation or mediation correspondence, if used and if both parties agree to submit it to the Internet adjudicator;

(6) the final argument submissions by the parties, including any attachments;

(7) the Parties' Replies, if any;

(8) the text of Article 2 of the U.C.C.;

(9) the parties' and any witness' direct or cross-examinations; and,

(10) in the Internet adjudicator's discretion, any case law submitted with the final submissions and replies.

2.Rule 28: Rules Pertaining to Evidence and Exhibits Used in the Final Submission.

(A) Evidence May Be Offered by Parties Attached to Final Argument Submission. The parties may offer evidence relevant to their dispute attached to their final argument submissions filed with the Internet adjudicator. These documents and exhibits must have been produced and submitted to the parties' Dispute Resolution page 30 days before the Final Submission date. Each attached item of evidence, such as a document and photographs, will be numbered so the Internet adjudicator and the parties can easily identify the item of evidence submitted. The Internet adjudicator will consider all submitted evidence which complies with all of the provisions contained in this rule.

(B) Objections: How Made. After five days of the final submissions, with attached evidence, the parties may file with the Internet adjudicator any objections they may have, listing numerically any item of evidence they believe is not in compliance with any of the provisions contained in this rule. The objecting party is to list the numbered item of evidence, the rule provision it allegedly violates, and a short statement as to why it allegedly violates the provision.

(C) Ruling on Objections. The Internet adjudicator will not make formal rulings on the objections but will simply take them into account when deciding the merits of the case. The Internet adjudicator, in the Internet adjudicator's discretion, may state why an item of evidence was either included over an objection, or excluded pursuant to an objection, in the final written decision.

(D) Specific Evidentiary Provisions. All evidence submitted will be considered by the Internet adjudicator unless the Internet adjudicator, in his discretion, determines that the offered evidence violates one of the following provisions, and excludes it.
  (1) Relevancy Requirement. All submissions must be relevant and material to the subject matter of the dispute. To be relevant and material, the submission must be logically related to the case and have an effect on something that matters in the case. If it is irrelevant or cumulative, then the Internet adjudicator will ignore it and may look less favorably on the case of the party who submitted it.
  (2) Settlement Negotiations and Mediation Sessions Are Inadmissible. All statements made in private settlement negotiations or in mediation sessions are deemed confidential and are therefore inadmissible and will not be considered by the Internet adjudicator, unless the parties mutually agree to make all or some statements and conduct in settlement negotiations and mediation sessions admissible. The parties may elect to have their mediator Internet adjudicator also be their Internet adjudicator for the Final Submissions, in which case this provision would be inapplicable.
  (3) Privileged Communications Inadmissible. All statements made in private communications between the parties and their attorneys or other legal representatives, and between parties and their spouses, and the work-product of the parties' attorneys or legal representatives, are deemed confidential and therefore inadmissible. Such information will not be considered by the Internet adjudicator unless a party chooses to reveal the communication or work-product in which case this provision is waived.
  (4) Character Evidence Inadmissible. All statements made concerning the reputation of an individual in order to demonstrate that person's propensity or predisposition to engage in, or not to engage in, a particular act, is inadmissible.
  (5) All Other Information Admissible in the Discretion of the Internet adjudicator. All other submissions by the parties are admissible, if relevant, in the discretion of the Internet adjudicator, included but not limited to: hearsay testimony, lay and expert opinion testimony, and insurance evidence.

(E) Types of Evidence. The following types or forms of evidence will be allowed as admissible submissions:
  (1) Testimonial Evidence; Witness Statements and Affidavits. The parties may submit sworn "affidavits," which are written sworn statements of witnesses or the parties themselves signed and given under the pains and penalties of perjury. The Internet adjudicator will consider the information contained in those written witness statements or affidavits regarding the dispute.
  (2) Demonstrative Evidence. The parties may submit charts, diagrams, lists, maps, and other documentary evidence, etc., which help to explain or clarify a witness's written statement or affidavit and a party's legal position specially prepared for the Internet adjudicator's consideration.
  (3) Real Evidence. The parties may submit tangible or written evidence.
    (a) Documentary Evidence. All documents, such as letters, correspondence, contracts, invoices, and photographs, between the parties that are part of the dispute or demonstrate something that happened in the dispute may be attached as a submission. All documents or images must be "digitized" so they can be sent over the Internet.
    (b) Tangible Evidence. All non-documentary evidence that is physical in nature, such as an actual good purchased or damaged, a piece of hardware, or a physical item of any kind, may be sent to the Internet adjudicator through the mails or other delivery service as a submission. (See 2.Rule 24(E) (2), (E)(3)(b), and (E)(4)(b)) The Internet adjudicator has the option of accepting a digitized photograph of the physical item, the tangible evidence, in lieu of a party sending the tangible item through the mails or other delivery service set forth in 2.Rule 24(E)(2), (E)(3)(b), and (E)(4)(b).

(F) Witnesses; Witness Statements. The following provisions apply to witness statement or affidavit submissions.
  (1) Oath Required. The parties may submit sworn statements of witnesses that have relevant personal knowledge to the case. Parties may be a witness in his own behalf and submit their own sworn witness statement. Witnesses must sign the statement and swear to or affirm its truth under the pains and penalties of perjury.
  (2) Competency; Personal Knowledge. Witnesses must have personal knowledge of something relevant to the case, have some recollection of the relevant matter and the ability to communicate their testimony in a written statement.
  (3) Internet adjudicator, Mediators, Attorneys, Legal Representatives. The Internet adjudicator and the mediator, if a mediator was used, may not submit witness statements. However, in the Internet adjudicator's discretion, attorneys or other legal representatives of the parties may submit witness statements.
  (4) Number of Witness Statements; Length. The Internet adjudicator has the discretion to set reasonable limits on the number of witness statements that will be allowed to be submitted, and page lengths of those statements based on the circumstances of the case.

(G) Authentication of Evidence. Each evidentiary submission, including every witness statement and all exhibits, must contain some basis to demonstrate that the evidentiary item submitted is what it purports to be.
  (1) Witness Statements. Witness statements must contain the witness' identifying information so that the Internet adjudicator or the opposing party can confirm that the statement is truly their statement.
- (2) Documents. All documents must contain identifying information so that the Internet adjudicator or the opposing party can verify its source. (See Appendix #3 as a way to authenticate all correspondence between the parties).
- (3) Tangible Items. All tangible items must contain a written summary identifying the item and relaying its source or origination.

(H) Cross-Examination of Witnesses; Live Telephone or Live Video-Conferencing. Either party may elect to cross-examine any witness who has submitted a sworn witness statement.
- (1) Notification. Within five days after the final submissions have been made, a party may elect to set-up a cross-examination of any witness. It will be in the discretion of the Internet adjudicator when to schedule the cross-examination of witnesses and notify the parties to produce the witness for cross-examination.
- (2) Method. The party electing to cross-examine a witness may conduct the cross-examination by telephone conference set up by the Internet adjudicator or by video-conferencing, assuming the parties and witness have that capability.
- (3) Costs. The party who elects to cross-examine a witness must pay for the costs of the live telephone conference call or the video conference call, unless this cost is included in a per transaction fee payment system or as otherwise agreed upon by the parties.
- (4) Direct Examination. If a party representing the witness wishes to do a direct examination of the witness before they are cross-examined, they may do so, in the discretion of the Internet adjudicator, but the party conducting the direct examination must pay for the costs of the telephone or video conference call associated with their direct examination. The Internet adjudicator will determine the split in costs as it relates to the actual time taken by each party. The Internet adjudicator may conduct the direct and cross-examinations at the same time or at separate times in the officer's discretion.
- (5) Internet adjudicator's Questions. At any point during the direct or cross-examinations, the Internet adjudicator may pose his own questions to the witness. The cost for this time will be borne by the party who happens to be examining the witness (direct or cross) at that particular time. The Internet adjudicator will make this determination in the officer's discretion. (I) Closing Arguments. Each party shall have fifteen minutes, in a live telephone or video conference or a live on-line transmission on the parties' Dispute Resolution Page, with the Internet adjudicator and opposing party, to make a closing argument to the Internet adjudicator as to why the party should prevail in the action. The Internet adjudicator shall determine in his discretion when the closing argument will take place and what method of communication will be used.
- (J) Timing. The final closing argument and the opportunity to cross-examine witnesses to be conducted on-line or by telephone or video conference will be scheduled by the Internet adjudicator no later than 45 days after the final argument submission replies are due. The final closing argument may be at the same time or at separate time from the direct and cross-examinations in the Internet adjudicator's discretion.

2.Rule 29: Judgment.
- (A) Final Written Decisions by Internet adjudicator Resolving The Dispute. As disputes are resolved by the final decision of the Internet adjudicator, the Internet adjudicator will provide a written final decision explaining the resolution of the dispute. The final decision will contain the following three items:
  - (1) Findings of Fact—which will include an analysis of the factual record and resolution of all pertinent factual disputes between the parties;
  - (2) Conclusions of Law—which will include an analysis of the parties pleadings and all submissions and all applicable law, and the legal reasons for the decision and how the text of Article 2 of the U.C.C. was applied; and,
  - (3) Final Resolution of the Dispute and Arbitration Award, if any—which will set forth the Internet adjudicator's clear, final directive to the parties as to how exactly the dispute is resolved. The judgment will include the award and state the specific amount of damages, if any, to be paid to the prevailing party.
- (B) Timing. The Internet adjudicator will render a final written decision judgment within 30 days of the final argument and opportunity to cross examine witness, or within ten days of service should the defendant have defaulted.
- (C) Posting. The Internet adjudicator will e-mail the final decision to the parties and post them on the parties' Dispute Resolution Page in accordance with 2.Rule 12.

2.Rule 30: Publication of the System's Final Written Decisions/Arbitration Awards of Internet adjudicators.
- (A) Publication. The written final decisions of all the System Internet adjudicators will be published in the "the System Final Decision Directory," located on-line on the System's website and fully accessible by all party litigants. The IAJ will decide which decisions shall be published.
- (B) Decisions Considered Persuasive Case Law. Those final Internet adjudicator published decisions will be considered persuasive case law interpretations of the text of the U.C.C., just as all courts of competent jurisdiction interpreting the text of the U.C.C. are considered "persuasive" authority.

2.Rule 31: Recovery of Filing Fee if Plaintiff Purchaser is the Prevailing Party.
- (A) Available Only to a Plaintiff who is a Purchaser. If the plaintiff purchaser is the prevailing party, then as a part of the judgment in favor of the plaintiff purchaser, the Internet adjudicator will award the cost of the plaintiff's filing fee as part of the damage award against the defendant vendor to put the plaintiff in the position they would have been in were it not for the wrong of defendant.
- (B) Not Available to a Plaintiff or Defendant Vendor or Defendant Purchaser. If the defendant or plaintiff vendor is the prevailing party, the amount of the filing fee will not be recovered.
- (C) Rule Inapplicable in Negotiation or Mediation. If the parties mutually elect either the private negotiation option or the mediation option, and resolve their dispute pursuant to either of those methods, this rule awarding the filing fee does not apply.

2.Rule 32: Reconsideration and Appeal of Final Judgment.
- (A) Reconsideration. Within five days of the final decision of the Internet adjudicator, the losing party may request that the Internet adjudicator reconsider the final decision based on any clerical error, mistake, inadvertence, or if the Internet adjudicator failed to consider or overlooked a piece of evidence or key argument that otherwise should have been considered. The Internet adjudicator will not change the final decision unless there is a clear legal or factual error or oversight that would have changed the result of the case.

(B) Appeal.
(1) Timing. Within ten days of the final judgment, or if a reconsideration was requested, within ten days of the denial of the reconsideration, a party may file a notice of appeal of the final judgment. The party who initiated the appeal is the "appellant" and the responding party is the "appellee."
(2) Cross-Appeal Allowed. The other responding party may also appeal any adverse aspect of the decision and in that case will be called the "cross-appellant." The appeal and the cross-appeal must be responded to by each respective party.
(3) Assignment of an Appellate Internet adjudicator. the System will appoint an appellate Internet adjudicator to consider the appeal.
(4) Standards of Review. Only appeals based on clear, obvious legal or factual mistakes of the original Internet adjudicator will be considered. Unless the original Internet adjudicator abused the officer's discretion in making factual findings or the officer's legal rulings were clearly erroneous, that original Internet adjudicator's decision will be upheld.
(C) Appellate Procedure.
(1) The Appeal Filing. The appellant must timely file, along with the notice of appeal, an explanation of the basis for appeal which may not exceed three single-spaced, 8 and ½"×11"[21.59×27.94 centimeters] screens of 12-point written text (with standard 1" margins) [2.54 centimeters]. The filing should explain the factual and legal basis for the appeal and why the original Internet adjudicator's decision should be reversed. No attachments will be allowed although appellant may refer to documents submitted in the original record.
(2) Cost. The filing fee of $250 to appeal will be paid by the appellant, unless included in a per transaction payment program or as otherwise agreed upon by one or more of the parties. The appellant shall also file an appeal bond in an amount to be determined by the appellate officer.
(3) Appellee's Response. The appellee will have ten days within which to file a response which shall be limited to three single-spaced, 8 and ½"×11" [21.59×27.94 centimeters] screens of 12-point written text (with standard 1" margins) [2.54 centimeters]. Their response filing should explain the factual and legal basis why the original Internet adjudicator's decision should be upheld. No attachment will be allowed although appellee may refer to documents submitted in the original record.
(4) Cross-Appellee's Response. If a cross-appeal is filed, the cross-appellee will be allowed to file a response. The cross-appellee will have ten days within which to file their response which shall be limited to three single-spaced, 8 and ½Δ×11" [21.59×27.94 centimeters] screens of 12-point written text (with standard 1" margins) [2.54 centimeters] response. Their response filing should explain the factual and legal basis why the original Internet adjudicator's decision should be upheld. No attachment will be allowed although appellee may refer to documents submitted in the original record.
(5) Final Appellate Decision. Within thirty days of the appellee's response filing, the appellate Internet adjudicator will render a final appellate decision which will be final and unappealable by the parties. The appellate decision will set forth the reasons for upholding, modifying or reversing the original decision and will contain findings as to whether the original Internet adjudicator either abused his discretion in finding erroneous facts or was clearly erroneous in applying the text of Article 2 of the U.C.C.
(D) Stay of Judgment During Appeal. The final decision of the original Internet adjudicator that is being appealed cannot be enforced during the pendency of the appeal. Only after the appeal is resolved and a final appellate decision is rendered can the original final decision be enforced.
(E) Frivolous Appeals and Payment of Interest.
(1) Frivolous Appeals. If the appellate Internet adjudicator determines in the officer's discretion that the appeal is wholly without merit or was made for an improper purpose, such as to harass or improperly delay, the appellate Internet adjudicator may award the cost of the appellate filing fee and up to ten percent of the arbitration award, in addition to the upheld award itself, as a sanction against the appellant for filing the frivolous appeal.
(2) Payment of Interest on Original Arbitration Awards Against Appellants. If an appellant loses an appeal, that appellant will pay at the prevailing rate interest on the original damages against it calculated from the date the original Internet adjudicator rendered a final decision until the date the appellate Internet adjudicator upheld the original decision. However, if the appellate Internet adjudicator modifies or reverses the original Internet adjudicator's decision, no interest will be awarded.
2. Rule 33: Enforcement of Judgments.
(A) Directive to Pay. Any party ordered to pay an award is a "judgment-debtor." A judgment-debtor will be directed to pay the damage award set forth in the final judgment to the other party, the "judgment-creditor," within ten days of the judgment, or, if it was appealed, within ten days of the original decision being upheld or modified. Payment will be made through the System's pay service. If payment is not satisfied within ten days, the judgment-creditor may seek to enforce the judgment as set forth below by reporting the judgment-debtor's delinquent payment to the System. The judgment-creditor may also begin a collection action in a court of competent jurisdiction.
(B) Judgment-Debtor Payment Histories.
(1) Allowance by Parties to Report Payment History Should They Become a Future Judgment-Debtor. The parties will allow the System to report the timeliness of payments of all judgment-debtors, and such payment histories will be posted at the System's general website so potential purchasers and vendors can check the timeliness of payment of any judgments. the System will calculate the percentage and overall number of times a judgment-debtor was late in satisfying anyjudgments against it. No other information or comment will be provided other than the number and percentage of times, if any, that a particular party has been late. The intent of this provision is to provide a strong incentive for parties to pay any outstanding the System judgments.
(C) Enforcement Procedures: Costs And Fees in Enforcing any the System Judgment in an Outside Court of Competent Jurisdiction.
(1) Enforcement in a Court of Competent Jurisdiction; Sanctions. In the event a judgment-debtor does not fully honor a the System judgment against it, and the disincentive of having the System report this non-payment on its website is not effective in coaxing the judgment-debtor to pay, the parties agree that the the System judgment can be enforced in a court of competent jurisdiction, and the judgment-debtor agrees to pay all costs and reasonable attorneys' fees associated with enforcing the the System judgment.

(2) Duty of Judgment-Creditor. It will be the sole responsibility of the judgment-creditor to enforce any the System judgment in any court of competent jurisdiction and not the responsibility of the System.

(D) No Liability of the System. The parties will hold the System harmless for any the System judgment that cannot be enforced by the judgment-creditor, including but not limited to situations where the judgment-debtor has declared bankruptcy or otherwise has become judgment proof.

2. Rule 34: Application of the Results of Former Disputes to the Current Dispute.

(A) Former Disputes between the Parties Cannot Be the Subject of the Current Dispute: "Claim Preclusion." In the event that the two current parties had a former dispute between them that was resolved by either a the System Internet adjudicator or by another court of competent jurisdiction, that former dispute cannot be the subject of the current lawsuit. Parties cannot use the System to have a second chance to resolve a dispute in the event that they are not, satisfied with the way the first lawsuit was resolved. The prohibition on such claims that are being re-filed in an attempt to re-adjudicate them will be called Claim Preclusion.

(1) Precluding the Same Claim. A current dispute or a claim therein will be precluded under this rule if it is the same dispute or a claim therein as in the former dispute. If the current dispute or a claim therein is a different dispute or a claim therein, then this rule is inapplicable.

(2) Between the Same Parties. A current dispute or a claim in that dispute will be precluded under this rule only if the previous dispute or a claim in that dispute that was resolved is between the same parties and the current lawsuit. If the plaintiff or defendant is a different party then this rule is inapplicable.

(3) After a Final Judgment on the Merits. A current dispute or a claim in that dispute will be precluded under this rule only if the previous dispute or a claim in that dispute between the same parties was resolved by a final judgment on the merits. Final judgments on the merits are to be appealed, not simply re-filed with the System. If any former dispute or a claim in that dispute was not a final judgment or was dismissed for procedural reasons that did actually address the substance or merits of the dispute, then this rule is inapplicable.

(B) Former Issues Resolved in Prior Disputes Involving Either of the Parties Cannot Be Resolved in the Current Dispute: "Issue Preclusion." In the event that either of the two current parties had a former dispute where a legal or factual issue was resolved by either a the System Internet adjudicator or by another court of competent jurisdiction, that former resolved issue cannot be resolved again in the current lawsuit. Parties cannot use the System to have a second chance to resolve an issue that they already had a full and fair opportunity to litigate in a previous dispute. The prohibition on such issues that have already been determined in an attempt to re-adjudicate them will be called Issue Preclusion.

(1) Precluding the Same Issue. A current issue will be precluded under this rule only if it is the same exact issue contained in a former lawsuit. If the issue in the current lawsuit is a different issue than what was previously determined in a former lawsuit, then this rule is inapplicable.

(2) The Same Issue Must Have Been Actually Litigated and Determined in the Previous Dispute. A current issue will be precluded under this rule only if it was actually addressed in the former dispute and was a part of the final judgment in the former dispute. If the issue in the current lawsuit was not actually litigated and determined in the former dispute, then this rule is inapplicable.

(3) The Same Issue Must have Been Essential to the Judgment in the Previous Dispute. A current issue will be precluded under this rule only if it was determined as an essential part of the previous dispute and was not merely a collateral or side issue not essential to the judgment in the former suit. If the issue in the current lawsuit was not essential to the judgment in the former dispute, then this rule is inapplicable.

(4) The Party Against Whom Issue Preclusion Is Being Used Must Have Been a Party in the Previous Dispute Who Had a Full and Fair Opportunity to Litigate That Issue. A current issue will be precluded under this rule only if in the previous dispute the party against whom the rule is being used was a party in the previous dispute and had a full and fair opportunity to litigate the issue. If the party against whom the rule is being used was not a party in the previous dispute or did not have a full and fair opportunity to litigate that issue in the previous dispute, then this rule is inapplicable.

Gradation #3—

For Disputes with $25,001-$75,000 in Controversy

3. Rule 1: Scope of Provisions and Rules of Adjudicative Procedure.

(A) Agreement to Arbitrate and Be Bound by These Rules of Adjudicative Procedure. By clicking "I Agree." when prompted on this website, thereby legally entering into the Agreement to Arbitrate, the buyer and seller to the e-commerce transaction ("the parties") agree to be bound by and subject to all of the applicable Rules of Adjudicative Procedure ("Rules") on this website. Those Rules explain the procedural rights and duties of the parties in resolving any dispute arising or existing between them. The Agreement to Arbitrate will appear on the vendor website.

(B) Scope of this Set of Rules. This set of Rules will be the governing procedural law for all the System disputes where the amount in controversy is at least $25,001, but does not exceed $75,000, or where the parties have agreed that their dispute be settled using this first set of Rules and have paid the corresponding filing fee.

3. Rule 2: Personal Jurisdiction: Waiver of Right to Sue in Another Forum.

(A) Exclusive Personal Jurisdiction of the System. The parties agree to submit only and exclusively to the personal jurisdiction and venue of the "Cyberforum" offered by the System. They agree that only the System has the power over them to resolve their dispute arising from their e-commerce transaction. As a result, the parties waive any and all of their legal rights to attack the personal jurisdictional authority of the System over any e-commerce dispute arising or resulting between them.

(B) Waiver of Jurisdiction and the Right to Appeal in any other Forum. The parties waive their rights to file lawsuits against one another in any other forum outside of the System, and they waive all rights to appeal any arbitration decision in any forum outside of the System's appellate procedure. The only right to appeal to a trial court outside of the System is if the the System Internet adjudicator violates the Agreement to Arbitrate.

3. Rule 3: Personal Jurisdiction: Forum Selection Provision.

(A) Contractual Duty Not to Sue in any other Forum.

(1) Other Lawsuits Prohibited. The parties agree not to sue each other in any other court, forum, or tribunal, other than that offered by the System, in order to resolve any dispute between them arising out of or as a result of their on-line transaction.

(2) Other Lawsuits Have No Effect. The parties agree that any unauthorized lawsuit outside of the System will have no effect in light of their Agreement to Arbitrate. The the System forum selected by the parties will be the only valid forum to hear and decide the dispute between them.

(B) Agreed Sanctions for Violation of this Provision.

(1) Motions. In the event that either party files a lawsuit in any court, forum or tribunal outside of the System, the other party may make a motion to dismiss that action and cite this provision requiring them to resolve their dispute only by using the System. That party may also elect to make a motion in that court requesting a "stay," or postponement, of that action pending the resolution of the dispute by the System.

(2) Fees and Costs. The party filing the unauthorized lawsuit outside of the System agrees to and will pay any and all reasonable attorneys' fees and costs associated with the other party's attempts to enforce this provision.

3.Rule 4: Subject-Matter Jurisdiction: Type of Case.

(A) E-Commerce Contracts. The types of disputes to be resolved by the System are sales of goods transactions, or sales of mixed goods and commonly available fungible services, such as the sales of travel services (air flights, rail, cruise lines, rental cars, hotel rooms) and any credit card or financial transaction disputes that are made over the Internet ("E-Commerce"). This means that the subject-matter jurisdiction of the System involves only claims for breach of contract (non-delivery/non-conforming goods or services), breach of warranty and merchantability, and collection or non-payment.

(B) Negotiation/Mediation for other Types of Lawsuits. For all other types of non-contract law disputes, the parties may request and pay for the negotiation and/or mediation services of the System pursuant to 3.Rule 24.

3.Rule 5—Subject-Matter Jurisdiction: Amount in Controversy.

(A) Amount in Controversy. The Gradation of Rules that apply for disputes with between $25,001 and $75,000 in controversy will be Gradation #3. These Rules are contained in 3.Rule 1-3.Rule 38.

(B) Option to Stipulate to Another Gradation. If the parties in one gradation are willing to stipulate or agree to the procedural options in a higher or lower gradation, and are willing to pay the higher or lower filing fee for that gradation, then the parties will be allowed to do so in the discretion of the Internet adjudicator.

(C) Determination of Amount in Controversy.

(1) Based on Purchase Price in Contract. The amount in controversy for each transaction shall be determined solely by the price of the goods/services sold, exclusive of costs and interest. The sales price of the goods/services sold, the subject of the lawsuit, shall determine the amount in controversy which, in turn, shall determine which particular gradation of the Rules (Gradation #1-#4) will govern the resolution of that dispute.

(2) Counterclaims. A defendant's counterclaims will ordinarily not be added to the plaintiff's claims to determine the amount in controversy so as to allow a defendant to move the dispute to a higher gradation by merely alleging a counterclaim. However, the counterclaim will be added to the plaintiff's claims in determining the amount in controversy if such counterclaim arises directly out of the same transaction or occurrence as, and is clearly intertwined with, the plaintiff's claims.

(3) Determination by Internet adjudicator. Since the disputes to be resolved by the System are contract actions, the price of the good(s)/service(s) in question on the invoice is controlling in determining the amount in controversy. The Internet adjudicator will make that determination. If more than one good or service is sold, then the amount in controversy will be the total price of those goods/services as determined by the Internet adjudicator. No other factor will be considered in determining the amount in controversy.

(D) Hearing to Determine Amount in Controversy in Dispute. In the event it is not clear from the sales contract or invoice what amount is exactly in controversy, a Internet adjudicator will be assigned by the System to conduct a preliminary on-line hearing with the parties in order to determine the amount in controversy and therefore which gradation of Rules will apply. The Internet adjudicator has the discretion to order costs to be paid by the party raising the issue if it is determined the amount in controversy was clear.

3.Rule 6—Applicable Substantive Law: Text of Article 2 of the U.C.C.

(A) Applicable Substantive Controlling Contract Law. The dispute will be resolved by looking to the legal principles contained in the written text of Article 2 of the U.C.C. written by the American Law Institute. The U.C.C. serves as the sole applicable substantive law, and the the System Internet adjudicator is required to and will apply only U.C.C. substantive law in resolving the dispute.

(B) Application of the Text of the U.C.C. Only. The parties will argue their respective positions pursuant only to the "plain meaning" interpretation of the explicit text of Article 2 of the U.C.C. as it appears on this website. The text of Article 2 of the U.C.C. will be the exclusive binding law governing the resolution of the dispute. The text will also apply to the sales of goods and services such as those enumerated in 3.Rule 4.

3.Rule 7—Applicable Language and Valuations: English and U.S. Dollars.

(A) English Requirement. Although the System can hear disputes arising anywhere in the world, the language in which the dispute will be resolved is English. The Internet adjudicator's decision and all correspondence will be in English. Submissions of all writings, evidence, and oral presentations must also be in English.

(B) Translations Allowed. Any party submitting any item created in another language must submit an English translation. If the opposing party disagrees with the translation, both parties shall obtain a third person who shall provide a translation which shall be submitted as the accepted translation. the System will provide translation services for a fee. (See below exemplary "Costs & Fees" and alternative cost payment structures set forth above and below herein).

(C) Cost. The cost of the translation must be paid by the party submitting the item that needs to be translated or otherwise as set forth herein.

(D) Money Valuations. All the System Provisions and Rules that make reference to costs or money amounts set forth in a pricing or rate sheet will be denominated and valued in a common currency such as United States dollars. All payments to the System must be made in the common currency or United States dollars.

3.Rule 8—Communication Facilitation.

(A) Duty to Submit Identifying Information. The parties will submit on-line to the System their current e-mail addresses, home and business telephone numbers, and home and business street addresses upon registration with the System.

(B) Continuing Duty to Report in the Event of Litigation. The parties' duty to report this information is a continuing duty and the parties are required to update that information within 10 days of any change to it during litigation.

3.Rule 9—Waiver of All Claims Against the System.

(A) Waiver. The parties waive or give up any and all claims against the System based on:

(1) any actions of any negotiation facilitator (mediator), (2) the substantive legal rulings, factual findings or any actions of any Internet adjudicator, (3) the System's hosting of a separate web page regarding the timeliness of payments of any past judgments;

(4) the inability of a party to enforce a the System award against another party; and/or (5) any other reason.

(B) Warranty Disclaimer.

(1) No Warranties or Representations. This provision acts as a "WARRANTY DISCLAIMER" which means that the System and this website, including any content or information contained within it, is provided "as is" and "as available" with no representations or warranties of any kind, either expressed or implied, including, but not limited to, the implied warranty of merchantability, fitness for a particular purpose and non-infringement.

(2) Assumption of Risk. Any user or party assumes total responsibility and risk for use of this the System website and holds the System harmless from any liability.

(3) Sole Remedy. The sole remedy for dissatisfaction with the System and/or this site is to terminate use of the site and the System's service.

(4) Application to All the System Related Entities. the System, its employees, agents, affiliates, and sponsors, including the IAJ and all Internet adjudicators, are neither responsible for nor liable for any direct, indirect, incidental, consequential, special, exemplary, punitive or other damages arising out of or in any way relating to this site, content or information contained within this website, to the extent allowable by law.

(C) Choice of Law and Venue Regarding the Use of the System.

(1) California Law Will Control Any Dispute Between the System and Any User or Party. The Agreement to Arbitrate and the relationships between the System, all browsers of this website, and all parties to the Agreement to Arbitrate, shall be interpreted and governed by the laws of the State of Calif. without regard to the conflicts of law provisions of that state.

(2) Exclusive Venue in Sacramento, Calif. Any action or proceeding to interpret or enforce this agreement between the System, all browsers of this website, and all parties, shall be brought before a state or federal court in Sacramento, Calif. Each browser and party consents to the exclusive jurisdiction and venue before such Sacramento, Calif. courts.

(D) Entire Agreement. These Arbitration Provisions contained in the Rules constitute the entire agreement between the parties, browsers and the System with respect to the the System website. If any part of this agreement is found invalid or unenforceable by a court of competent jurisdiction, the remainder of this agreement shall be given reasonable effect.

3.Rule 10: Two-Year Statute of Limitations.

(A) Two-Year Period. There is a two-year statute of limitations period (time deadline) within which to file any and all claims or counterclaims brought pursuant to any on-line, e-commerce transaction where the amount in controversy is between $25,001 and $75,000.

(B) The Start Date. The statute of limitations period will begin running—which will be considered the "start date" of the time deadline—on either the date when the goods in question are delivered to the purchaser, or one month after the purchaser has paid the vendor for the goods, whichever is determined to be the earlier date. Parties are deemed to have filed properly within the two-year limitations period if they electronically file their complaint with the System within two calendar years of the "start date."

3.Rule 11: Filing a Complaint by the Plaintiff.

(A) Page Limit. A complaining plaintiff may electronically file a complaint with the System not to exceed five, single-spaced, 8 and ½"×11" [21.59×27.94 centimeters] screens of 12-point written text with standard 1" [2.54 centimeters] margins).

(B) Contents of Complaint. The complaint will state, in separate numbered paragraphs as set forth below, the following:

(1) the goods purchased;

(2) the total sales or invoice price;

(3) the pertinent written terms of the contract allegedly breached by defendant; and, (4) the factual basis for the defendant's alleged breach of that contract.

The complaint will contain, if necessary, additional lettered subparagraphs under heading #4, with each subparagraph ((4)(a), (4)(b), (4)(c), etc.) containing the specific factual allegations which constitute the plaintiff's claim or claims for relief.

(5) A list of the legal claim(s) for relief and the corresponding provisions of Article 2 of the U.C.C. entitling plaintiff to legal recovery from the defendant ((5)(a), (5)(b), (5)(c), etc.).

(C) Filing Fee. The cost of filing the complaint will be paid by the plaintiff. (See exemplary "Costs & Fees" below or alternatives such as per transaction fees at vendor sites otherwise described above).

3.Rule 12: Establishment of the Parties' Special Dispute Resolution Page.

(A) Parties' Separate Dispute Resolution Page. When plaintiffs submit their complaint on-line to the System on this website, the System will create a special Dispute Resolution Page for only the two parties and the Internet adjudicator, through which the parties can conduct all of the dispute resolution communications and filings with each other and the Internet adjudicator.

(B) Password Access. the System will provide a password given only to the parties involved in the dispute and the Internet adjudicator to access and submit all documents and filings. It is the responsibility of the parties to keep the password confidential to preserve their privacy.

(C) Privacy Not Guaranteed. Although the Dispute Resolution Page of the parties can be accessed by use of a password given only to the parties, the System cannot assure complete privacy. The parties should therefore consider their filings and submissions to be public documents, just as all filings and documents are considered public documents in most federal and state courts in the United States and other courts of competent jurisdiction.

(D) All Pleadings and Submitted Documents to Be Posted on the Parties' Dispute Resolution Page; Notification.

(1) Posting on the Parties' Dispute Resolution Page. Each party must post all submitted documents and pleadings on the parties' Dispute Resolution Page.

(2) the System Dispute Resolution Page to Provide Notification. When posting a document or pleading on the parties' Dispute Resolution Page, the the System website will automatically notify the opposing party through e-mail that a pleading or filing has been posted on the page and the opposing party should access the page to view the posting.

3.Rule 13: Time.

(A) Computation. In computing any period of time prescribed or allowed by these rules, the day of the act, event, or default from which the designated period of time begins to run shall not be included. All weekends and holidays shall be included in the time computations. If the last day for a time period ends on a weekend or holiday the due date shall be extended to the next business day.

(B) Enlargement. The parties may request an extension of time for any time deadline by filing a motion requesting the extension at least five days before the time deadline. The Internet adjudicator, in his discretion, may grant the extension of time if the extension is warranted by good cause and there would be no unfair prejudice against the non-requesting party.

3.Rule 14: Issuance of an E-Summons by the System and Service of the Complaint.

(A) Service to Defendant. In addition to the the System website automatically sending an e-mail posting notification to the defendant, within 5 days of the plaintiff filing the complaint, the System will send to the defendant at defendant's registered e-mail address, an additional copy of a the System e-summons, containing an attached copy of the plaintiff's complaint. The summons shall direct the defendant to immediately confirm receipt of the e-summons and complaint and to answer the complaint within 20 days of defendant's acknowledgment of receipt of the summons and complaint. The plaintiff shall also notify the defendant and send an e-mail copy of the summons and complaint to the defendant.

(B) E-Mail Tracking. The e-summons will contain an automatic on-line acknowledgment of receipt of the summons sent back to the System electronically proving receipt when the defendant opens the e-mail.

(C) Acknowledgment of Receipt of Service. In addition, there will be a request from the plaintiff for the defendant to acknowledge by e-mail immediately and voluntarily a confirmation of receipt of the e-summons. This voluntary acknowledgment will constitute completed service of the complaint to notify the defendant of the lawsuit.

(D) Failure to Acknowledge Receipt of Service. If the defendant fails to acknowledge the receipt of the System's e-summons and copy of the plaintiff's complaint within ten days, the System will call the defendant by telephone to confirm receipt and send a hard copy via U.S. mail and charge the costs of the long-distance call, the postage, and the administrative time to the defendant, unless defendant can demonstrate good cause as to why the defendant did not immediately acknowledge receipt of service.

(E) Timing. The date of service will be the date on which the defendant acknowledges receipt of the e-summons and the plaintiff's complaint, or, if there is no such acknowledgment within ten days, then it will be the date the phone call is placed from plaintiff to the defendant.

(F) Default. If defendant does not respond to the System's telephone call within 20 days, defendant will be deemed to be in default and plaintiff, at that point, can pursue enforcement of payment for a default judgment in accordance with 3.Rule 15.

3.Rule 15: Default.

(A) Entry of Default. If defendant does not respond to the service and to plaintiff's telephone call within 20 days of the date of the call, defendant will be deemed to be in default. At that point, the plaintiff may request an Entry of Default. The Internet adjudicator will enter default against the defendant if there has been no response from defendant.

(B) Default Hearing for Plaintiff to Prove Damages. Within 30 days of the Entry of Default, the Internet adjudicator will schedule a default hearing so that the plaintiff will have the opportunity to prove the damages alleged against the defendant. The hearing will be made either by written argument made to the Internet adjudicator on the parties special Dispute Resolution Page, or by live telephone conference scheduled by the Internet adjudicator.

(C) Default Judgment. At the hearing to prove damages, the Internet adjudicator will hear plaintiff's arguments and determine the damages the plaintiff has suffered, if any. At the end of the hearing, the Internet adjudicator will immediately issue a decision against defendant if plaintiff has proved the damages alleged and that such damages are still owing. If the Internet adjudicator finds damages suffered by plaintiff, then at the end of the default hearing, the Internet adjudicator will issue a default judgment against the defendant. At that point, the plaintiff can pursue enforcement of payment for a default judgment in accordance with 1.Rule 37.

(D) Set Aside of the Entry of Default or the Default Judgment. At any time before the Entry of Default has been made or within 90 days after a Default Judgment has been issued, the defendant may make a motion to set aside the Entry of Default or the Default Judgment. The Internet adjudicator will set aside the Entry of Default or the Default Judgment and allow the defendant to respond to the complaint provided the defendant can demonstrate good cause as to why there was a failure to respond timely to the plaintiff's complaint.

(E) Default After a Response. In the event that the defendant initially responds to the complaint and defends the case, but then at any later time fails to continue defending the case, the plaintiff may move for an Entry of Default and a Default Judgment in accordance with this rule.

3.Rule 16: Defendant's Answer to Complaint.

(A) Requirement to Answer Plaintiff's Complaint. Defendant must file an answer to the plaintiff's complaint with the System within 20 days of the date of service.

(B) Contents of Answer.

(1) Admissions/Denials. The answer must contain in separate numbered paragraphs the defendant's specific admissions or denials corresponding exactly to each numbered paragraph of the allegations contained in the plaintiff's complaint.

(2) Affirmative Defenses. The answer will also set forth under a separate heading a list of any legal or factual affirmative defenses, if any, and the defendant's version of events in separate numbered subparagraphs.

(3) Counterclaims by the Defendant against the Plaintiff May Be Included. The answer may contain under a separate heading a list of any counterclaims that the defendant may have against the plaintiff arising out of the same transaction or occurrence on which plaintiff is suing.

(4) Cross-Claims against Co-Parties May Be Included. Any party may state as a cross-claim any claim by one party against a co-party arising out of the same transaction or occurrence either of the original action or of a counterclaim therein on which plaintiff is suing. Such cross-claim may include a clam that the party against whom it is asserted is or may be liable to the cross-claimant for all or part of a claim asserted in the action against the cross-claimant.

(D) Page Limit. The answer is not to exceed a total of seven, single-spaced, 8 and ½"×11" [21.59×27.94 centimeters] screens of 12-point written text, with standard 1" [2.54 centimeters] margins.

3.Rule 17: Plaintiff's Reply to Defendant's Answer.

(A) Reply to a Counterclaim. If the defendant has filed any counterclaim, the plaintiff may file a Reply not to exceed three single-spaced, 8 and ½"×11" [21.59×27.94 centimeters] screen of 12-point written text, with standard 1" [2.54 centimeters] margins. In the Reply, the plaintiff will admit or deny the allegations constituting the counterclaim. The Reply will contain the same information as the answer (admissions, denials, and affirmative defenses), but counterclaims to a counterclaim are not allowed.

(B) Timing. If a Reply is warranted, plaintiff must file it with the System within 10 days of receiving the answer (See Form #3).

3.Rule 18: The Pleadings Record.

(A) Limitations of Pleadings. The Complaint, Answer and Reply, if a Reply is warranted, along with the parties' Final Submissions (see 3.Rule 31) will constitute the pleadings record of the case along with all motions and responses to those motions.

(B) Motions and Other Papers. An application to the Internet adjudicator for an order shall be by motion, in writing, and shall state with particularity the grounds and shall set forth the relief or order sought.

3.Rule 19: Pre-Answer, Pre-Reply Motions.

(A) Motion Allowed. The defendant, or plaintiff if counterclaims have been filed by defendant, may file a motion requesting to dismiss the claim or counterclaim or request other specific relief.

(B) Motions to Dismiss Claims or Counterclaims. The following motions can be filed in place of an answer or reply requesting to dismiss the claim or counterclaim:

(1) Lack of Jurisdiction over the Subject Matter. A party may move to dismiss if a claim or counterclaim if it does not concern an e-commerce transaction. However, the parties may agree to have the System hear their non-e-commerce related dispute, and the Internet adjudicator, in his discretion, may decide to accept the case and resolve the dispute.

(2) Failure to State a Claim upon Which Relief Can Be Granted. A party may move to dismiss a claim or counterclaim if Article 2 of the U.C.C. does not legally recognize the claim or counterclaim and therefore can be dismissed as a matter of law. If the claim or counterclaim is inadvertently missing a necessary legal element, and the facts exist to plead that missing element, the party will be allowed to amend the claim or counterclaim without it being dismissed.

(3) Failure to Join an Indispensable Party. A party may move to dismiss based on the fact that an indispensable party has not been joined to the lawsuit and must be joined in order for there to be complete relief. If the opposing party agrees to join the indispensable party, and the Internet adjudicator determines the party should be joined, then the claim or counterclaim will not be dismissed (C) Motions to Alter Claims or Counterclaims. The following motions can be filed in place of an answer or reply requesting to alter the claim or counterclaim:

(1) Motion for a More Definite Statement. A party may file a motion requesting that the opposing party clarify the statements in their pleadings that are so vague or ambiguous that the party cannot reasonably be expected to understand and respond to them. The motion shall point out the defects complained of and the details desired. If the motion is granted the party has 10 days, or whatever time the Internet adjudicator shall determine, to obey the order.

(2) Motion to Strike Any Insufficient Defense or Any Redundant, Immaterial, Impertinent, or Scandalous Matter. A party may file a motion requesting that the Internet adjudicator strike portions of a pleading if it contains improper material or material otherwise not relevant to the dispute.

(D) Motion for Judgment on the Pleadings. After the defendant has filed an answer and/or the plaintiff has filed a reply to the defendant's counterclaims, either party may move to decide the case based on the pleadings if there is no factual dispute or factual issue to be determined.

3.Rule 20: Amendment to the Pleadings.

(A) Amendments. A party may amend any pleading only if the opposing party agrees and the Internet adjudicator allows it in his discretion, or, if the opposing party does not agree the Internet adjudicator determines the amendment is warranted by good cause, is not made in bad-faith, and would not cause unfair prejudice to the opposing party. The Internet adjudicator may allow the amendment if extra time is given to the opposing party in order to respond to the amendment.

(B) Duty to Supplement Pleadings; Additional Pleadings. The parties are under a duty to amend the pleadings to conform to evidence uncovered during the discovery process. Additional pleading may be allowed in the discretion of the Internet adjudicator.

3.Rule 21: Additional Claims and Parties.

(A) Actions with More than One Claim or Counterclaim. The plaintiff may file more than one claim for relief against the defendant and the defendant may file more than one counterclaim against the plaintiff. The Internet adjudicator, in the officer's discretion, may limit the number of claims or counterclaims if it is determined that there are too many claims or counterclaims for a just and efficient resolution of the dispute.

(B) Actions with More than One Plaintiff and One Defendant. In the event that many purchasers or vendors have the same or similar complaint against the same vendor or purchaser, and or additional vendors and purchasers, and it would be efficient to consolidate the various purchasers or vendors into one larger action, the Internet adjudicator, in the officer's discretion, may allow the additional parties to be joined in the lawsuit. The Internet adjudicator will determine, in his discretion, which additional parties, if any, can be joined to the lawsuit and whether they should be joined as additional plaintiffs or defendants.

(C) Timing. The plaintiff may request, either at the time of filing the complaint or anytime thereafter up until 30 days before the Final Argument Submissions are due, that the additional plaintiffs or the additional defendants be made parties to the lawsuit. The Internet adjudicator will make any necessary or reasonable adjustments in terms of filing deadlines and requirements, in the officer's discretion, due to there being additional parties. The Internet adjudicator will inform all of the parties of all adjusted time deadlines and requirements.

(D) Separate Final Arguments. At any time during the lawsuit, and in the event that the Internet adjudicator determines that the lawsuit has too many parties or too many claims, the Internet adjudicator, in his discretion, may order separate lawsuits between the various parties. The Internet adjudicator will inform the parties of all adjusted time deadlines and requirements.

3.Rule 22: Consolidation of Case. Although claims and parties may be added pursuant to 3.E. Rule 21, if they are not, or there are several cases with several claims or parties, in the event that many purchasers or vendors have the same or similar complaint against the same vendor or purchaser, but they have not requested to be joined, the Internet adjudicator may, in his discretion, determine it would be efficient to consolidate those separate lawsuits into one larger action. The Internet adjudicator will make any necessary or reasonable adjustments in terms of filing deadlines and requirements, in the officer's discretion, due to there being additional parties. The Internet adjudicator will inform the parties of all adjusted time deadlines and requirements.

3.Rule 23: Pre-Final Argument Hearing; Scheduling; Management.

(A) Pre-Final Argument Conferences; Objectives. The Internet adjudicator may, in his discretion, direct the attorneys for the parties or the parties themselves if un-represented, to participate in a live video conference or telephone conference for such purposes as:
  (1) expediting the disposition of the action
  (2) establishing early and continuing control so that the dispute will not be protracted because of lack of management
  (3) discouraging wasteful pre-final argument activities
  (4) improving the quality of the final argument through more thorough preparation; and,
  (5) facilitating informal settlement of the case.

(B) Scheduling and Planning. The Internet adjudicator shall schedule conferences as often as the Internet adjudicator determines is necessary in his discretion, as well as a last pre-final argument conference at least thirty days before the final argument. The Internet adjudicator will consider, but not be limited to, the following:
  (1) The formulation and simplification of issues, including the elimination of frivolous claims or defenses;
  (2) the necessity or desirability of amendments to the pleadings;
  (3) the possibility of obtaining admissions of fact and of documents which will avoid unnecessary proof, stipulations regarding the authenticity of documents and other evidence;
  (4) the avoidance of unnecessary proof and of cumulative evidence;
  (5) the control of motions and discovery;
  (6) the identification of witnesses and documents;
  (7) disposition of pending motions
  (8) the need for adopting special procedures for managing potentially difficult or protracted actions that may involve complex issues, multiple parties, difficult legal issues, or unusual proof problems;
  (9) an order establishing a reasonable time limit on the time allowed for questioning witnesses; and,
  (10) such other matters as may facilitate the just, speedy, and inexpensive disposition of the dispute.

(C) Sanctions. If a party or party's attorney fails to obey a scheduling order or pre final argument order, fails to appear, or fails to participate in good-faith, the Internet adjudicator, upon motion or the Internet adjudicator's initiative, may make such orders with regard thereto as just, such as paying reasonable expenses and attorney fees associated with compliance or striking claims, defenses or evidence of the offending party.

3.Rule 24: Private Negotiation and Mediation Options.

(A) Negotiation & Mediation Options Available. The parties may elect by mutual agreement to participate in either the negotiation option or mediation option offered by the System as set forth below:
  (1) Negotiation Option. At any point after a dispute arises, the parties may elect to engage in party-to-party direct negotiation sessions over the Internet on their own special Dispute Resolution Page provided by the System.
    (a) Privacy. Once the private Dispute Resolution page is created, the parties can contact one another directly and attempt to settle the dispute on their own. The parties can elect to make their special negotiation page private so the Internet adjudicator does not have access to their negotiation sessions.
    (b) Cost. There is no cost for using the negotiation service.
    (c) Settlement and Voluntary Dismissal. If the parties settle, it is their responsibility to create their own settlement agreement, jointly dismiss the case, and inform the System that their dispute is resolved.
  (2) Mediation Option. At any point after a dispute arises, the parties may elect to engage in three-way (party-to-party, with a the System mediator) mediation sessions over the Internet, with the mediator facilitating on their Dispute Resolution Page. The mediator, with the parties' voluntary participation, will attempt to facilitate a negotiated settlement between the parties. Both parties must request the mediation sessions. As with any mediation, the parties are free to reject the suggestions of the mediator at any time.
    (a) Cost. The costs of using the mediation service will be shared equally by the parties (See below exemplary "Costs & Fees"), or alternative fee structures set forth above such including mediation services in per transaction fees or insurance programs.
    (b) Privacy and Confidentiality. If the parties used the negotiation option but were unsuccessful, the parties may elect to reveal the substance of their settlement negotiations to the mediator; however, the mediator will assess the time to read the submissions as part of the mediation hourly charges. If either party elects not to submit the on-line settlement negotiations, the mediator will not be allowed to consider those private confidential settlement negotiation communications. The mediator will keep all communications private and confidential. The mediator will be selected by the IAJ. Mediators may be IAJ Internet adjudicators or, in the discretion of the IAJ, non-lawyer experts in the field that is the subject of the dispute.
    (c) Settlement and Voluntary Dismissal. If the parties settle with the assistance of the mediator, it is their responsibility to create their own settlement agreement and jointly dismiss the case. They must inform the System that their dispute has been resolved.

(B) Timing. If the parties mutually elect to engage in either negotiation or mediation options, all applicable filing time deadlines will remain in force unless the parties mutually agree to postpone the deadlines and the Internet adjudicator allows such postponement. All postponements shall be at the discretion of the Internet adjudicator only.

(C) Right to Refuse to Mediate or Arbitrate. Any dispute submitted for resolution to the System may be rejected by the System if it is determined not to be a proper case for dispute resolution. The parties have no legal right to demand that the System hear their dispute. If the System rejects a particular dispute for resolution, neither party will be assessed any fees or charges associated with their case.

3.Rule 25: Submission of the Dispute to Arbitration.

(A) Submission Immediately or after the Negotiation or Mediation Options. If settlement negotiations and mediation sessions are unsuccessful under 3.Rule 24, or if the parties have not elected to exercise those options and wish to proceed directly with formal arbitration after their pleadings have been submitted, the parties are entitled to submit the dispute to a the System Internet adjudicator.

(B) Selection of Internet adjudicator to Arbitrate the Dispute. The Internet adjudicator will be assigned to the case by the IAJ.

3.Rule 26—Credentials, Training, Objectivity of the the System Internet Adjudicators.

(A) Institute for Administrative Justice ("IAJ")—McGeorge School of Law. All legal services of the System provided to the parties to an e-commerce transaction who sign Agreements to Arbitrate any disputes that have or might arise between them will be provided, under contract, by the Institute for Administrative Justice ("IAJ"), at the University of the Pacific, McGeorge School of Law, located in Sacramento, Calif. These legal services provided by the IAJ under contract to the System consist primarily of on-line dispute resolution services conducted by remote IAJ Internet adjudicators. Established in 1972, the IAJ has over 25 expert Internet adjudicators currently employed to resolve disputes in a traditional manner as well as on-line to the System disputants. Over the past two decades, the IAJ has expanded its service components to administrative agencies, and has successfully provided dispute resolution services as well as training and consultation in dispute resolution. The Internet adjudicator will keep all matters private and confidential.

(B) Contract between the System and the IAJ. As an independent body, the IAJ and its Internet adjudicators are insulated from any economic pressure from either on-line vendors or purchasers who might end up as party disputants because the IAJ operates under the auspices of McGeorge School of Law and is paid by the System under contract to provide these services, not by the vendors or purchasers. Further, the IAJ Internet adjudicators who will provide these on-line legal services to disputants on behalf of the System receive their pay, regardless of outcome of disputes, by the IAJ, who is in turn paid by the System.

(C) Full Financial Disclosure of the System and the IAJ. An explanation of the System owners and affiliates and their respective financial interests may be made available to parties involved in the dispute or other otherwise to the public.

3.Rule 27: Discovery—Factual Investigation.

(A) The Official Factual Record.
  (1) Pleadings and All Previous Correspondence. The pleadings and all previous Internet correspondence between the parties up until the complaint is filed, automatically become the official legal and factual record of the case.
  (2) Additional Requested Information—"Discovery." The parties may request information from one another and this requested, discovered information also becomes part of the official factual record of the case.

(B) Discovery Start Date; Discovery Period; and Discovery Cut-Off Date.
  (1) Discovery Start Date. Ten days after the last pleading is filed—which will be known as the "discovery start date"—the parties are entitled to begin requesting additional factual information from one another. No discovery may be requested before the discovery start date.
  (2) Discovery Period. The time period between the discovery start date and the discovery cut off date will be known as the discovery period. During the discovery period, the parties are entitled to certain exchanges of information and may make certain requests for specific information in accordance with the provisions contained in these discovery rules.
  (3) Discovery Cut-Off Date. All discovery requests must be submitted by the requesting party and completed by the responding party before the "discovery cut-off date." The discovery cut-off date is 15 days before the "Final Submission Date." The Final Submission Date is to be set by the Internet adjudicator.

(C) Initial Disclosures: List Of Potential Witnesses and List of Potential Exhibits/Documents.
  (1) Timing. At the beginning of the discovery period, the parties will submit their initial disclosures to one another. The parties may update the disclosures during the discovery period if witnesses or documents are discovered that were not available at the beginning of the discovery period. There is a continuing duty through the discovery period to update the initial disclosures.
  (2) List of Potential Witnesses. Each party will provide to the other, through the parties' Dispute Resolution Page, a list of the potential witness they believe have knowledge or information relevant to the dispute. They will also designate whether they are intending to call such persons as actual witnesses in the dispute.
  (3) List of Potential Exhibits/Documents. Each party will provide to the other, through the parties' Dispute Resolution Page, a list of potential exhibits/documents they believe contain information relevant to the dispute. They will also designate whether they are intending to submit such exhibits/documents as evidence in the case in their Final Submissions. No witness statement or testimony or document/exhibit will be considered as evidence by the Internet adjudicator in rendering a decision in the dispute if such witness or document was not listed on the final list of witnesses or list of exhibits for that party.

(D) Five Depositions: Asking Questions of a Party or Witness while under Oath.
  (1) Five Depositions, Asking Oral Questions Relevant to the Dispute. During the discovery period, each party will be allowed to take the testimony of any party or listed witness by deposition upon oral examination. The party or listed witness who answers the uestions under oath in the deposition shall be called the deponent. A maximum of five depositions can be taken and the questions asked during the deposition must be relevant to the parties' dispute. The depositions may be taken at any time during the discovery period, but a total of only five will be allowed during that period. The questions shall be direct and the deponent shall be under oath when answering the oral questions. The deposition will not exceed a one-day, seven-hour period unless the Internet adjudicator agrees in the officer's discretion to allow a longer period or additional sessions. The depositions are to be conducted in a reasonable and efficient manner and in good faith so as not to unreasonably annoy, embarrass, or oppress the deponent. If the Internet adjudicator determines that any impediment, delay, or other conduct has frustrated the fair examination of the deponent, the Internet adjudicator may impose upon the persons responsible an appropriate sanction, including the reasonable costs and attorneys' fees incurred by any parties as a result thereof.

(2) Notice of Examination; General Requirements; Method of Recording; Production of Documents; Deposition of Organization; Deposition by Video Conference, Deposition by Telephone; Written Deposition Questions.
- (a) Notice of Examination. A party desiring to take the deposition of any person upon oral examination shall give reasonable notice in writing on the parties' Dispute Resolution Page in accordance with 3.Rule 12 to every other party in the action. The notice shall state the time, place and method for taking the deposition, shall identify the name of the person to be deposed and shall also state the method by which the deposition will be taken and any method in addition to stenographic means the testimony shall be recorded since the deposition may be recorded by any sound or sound-and-visual means, in addition to stenographic means. The party taking the deposition shall bear the cost of the recording of the deposition in addition to the recording of it by stenographic means. The party taking the deposition shall also be responsible for providing the opposing parties with a copy of the recording in addition to the transcript of the deposition made by stenographic means.
- (b) Persons before Whom Depositions Shall be Taken; Procedures. Depositions shall be taken before an officer/court reporter authorized to administer oaths by the laws of the United States or the country where the deposition is taken or a person appointed by the Internet adjudicator to administer an oath and take and record testimony by stenographic means. No deposition shall be taken before a person who is a relative or employee of a party or of an attorney or counsel of any of the parties, or is financially interested in the action. Each deposition will begin with the officer/court reporter or person appointed stating on the record: (1) the officer/court reporter's name and business address; (2) the date time and place of the deposition; (3) the name of the deponent; (4) the administration of the oath or affirmation of the deponent; and (5) an identification of all persons present. If the deposition is also being recorded by non-stenographic means, the officer/court reporter will repeat steps (1)-(3) at the beginning of each unit of recorded tape or other recording medium. The appearance or demeanor of deponents or attorneys shall not be distorted through camera or sound-recording techniques. At the end of the deposition, the officer/court reporter shall state that the deposition is complete and shall set forth any stipulation made by counsel during the deposition.
- (c) Production of Documents for Reference during the Deposition. A party taking the deposition may request in the Notice of the Deposition that the deponent produce certain documents to the requesting party either at the deposition or before the deposition (if before, transmitted either by mail or electronically on the parties' Dispute Resolution Page) and bring such documents with them to the deposition for reference during the deposition. The party taking the deposition may request the officer/court reporter to designate each document with a reference tag so that each marked deposition exhibit will also become an official attachment of the transcript of the deposition.
- (d) Deposition of Organization Representative. In the party's notice, a party may name or designate as the deponent a public or private corporation or a partnership or association and describe with reasonable particularity the matters on which examination is requested. In that event, the organization so named shall designate one or more officers, officials or other representatives who consent to testify on behalf of the organization regarding the subject matter described in the notice of deposition. The person so designated shall testify to matters known or reasonably available to the organization. This rule does not preclude depositions of individuals within the organization who are named in a party's notice of deposition. The Internet adjudicator in the officer's discretion may allow more than five depositions if the deponent is part of an organization.
- (e) Methods of Taking the Deposition
    (1) Deposition by Physical Attendance. A party may request that the deposition be conducted in person with the physical attendance of the deponent to be at a designated location easily accessible by travel to the deponent. Any unreasonable travel expenses will be paid by the party requesting the deposition.
    (2) Deposition by Video Tele Conference. A party may request that the deposition be conducted by video tele conference. The technical communication arrangements to conduct a live deposition via video tele conference are to be made and coordinated by the party requesting the deposition. Any set up and delivery communication costs associated with the video tele conference or its arrangements shall be paid by the party requesting the deposition. All other provisions of this rule apply in full force and effect to the administration of the deposition itself.
    (3) Deposition by Telephone. A party may request that the deposition be conducted by telephone. The arrangements to conduct a live deposition via telephone are to be made and coordinated by the party requesting the deposition. Any longdistance charges for the telephone deposition shall be paid by the party requesting the deposition. At no time during the deposition may the deponent or the deponent's lawyer put the examining party on "hold." The deposition will take place with the stenographer either physically present in the room with the deponent, or connected by telephone on a conference call. All other provisions of this rule apply in full force and effect to the administration of the deposition itself.
    (4) Written Deposition Questions. In lieu of participating in the live oral examination either in person or by tele-communication, a party may serve written questions in a sealed envelope or through a secure e-mail to the officer/court reporter. The officer/court reporter will take those questions to the deposition and at the designated time and place of the deposition, will be present with the deponent or connected by telephonic means with the deponent. The officer/court reporter shall propound the questions to the deponent and record the deponent's answers verbatim. All other provisions of this rule apply in full force and effect to the administration of the deposition itself Any unreasonable travel expenses will be paid by the party requesting the deposition.
- (f) Review by Witness; Changes; Signing. If requested by the deponent or a party before completion of the deposition, the deponent shall have 30 days after being notified by the officer/court reporter that the transcript, and any other recording if made, is available in which to review the transcript or recording and, if changes in form or substance, to sign a statement reciting such changes and the reasons given by the deponent for making them. The officer/court reporter shall indicate in the certificate prescribed by subdivision (g) whether any review was requested and, if so, shall append any changes made by the deponent during the period allowed.

(g) Certification and Delivery by Officer/Court Reporter; Exhibits; Copies. The officer/court reporter must certify that the deponent was duly sworn by the officer/court reporter and that the deposition is a true record of the testimony given by the deponent. This certificate must be in writing and accompany the record of the deposition. The officer/court reporter must securly seal the deposition in an envelope or package indorsed with the title of the action and marked "Deposition of [insert name of deponent]" and must promptly send it to the attorney or party who arranged for the transcript (and recording), who must store it under conditions that will protect it against loss, destruction, tampering, or deterioration. Documents produced for inspection during the examination of the deponent must, upon the request of a party, be marked for identification and annexed to the deposition and may be inspected and copied by any party pursuant to subdivision (c). If the party taking the deposition wishes to retain original documents produced, that party can make and annex copies as long as the originals are available for inspection. The officer/Internet adjudicator shall retain all notes taken stenographically and a copy of any additional recording. Upon payment of reasonable charges, the officer/court reporter shall furnish a copy of the transcript or other recording to any party or to the deponent. The party taking the deposition shall give prompt notice of its filing to all other parties.

(h) Failure to Attend Deposition; Sanctions.
  (1) Scheduled Deponent. Any deponent who receives a Notice of Examination must attend the scheduled examination and be subject to the questions asked during that deposition.
    (a) A non-party deponent who receives a Notice of Examination cannot be compelled to attend that deposition, however, if that non-party witness plans to be a witness in the case, their testimony will not be allowed in the final submissions or final argument hearing. As a result, the Internet adjudicator will not consider any testimony or submitted statement of that non-party witness if a party requested their deposition but they refused to comply. A party deponent must attend the scheduled deposition.
    (b) If a party deponent fails to attend a scheduled deposition, the Internet adjudicator may issue an appropriate sanction including paying the opposing parties reasonable attorney's fees and costs associated with the arranging for the deposition and may dismiss the case against the disobedient party.
  (2) Party Scheduled to Take the Deposition. If the party giving notice of the taking of a deposition fails to attend and proceed therewith and the scheduled deponent attends in person or is available for video conference or by telephone, the Internet adjudicator may order the party who fails to show up to pay to the deponent or other parties the reasonable expenses incurred by that deponent or party, including reasonable attorney's fees and may dismiss the case against the disobedient party.

(E) Thirty Written Interrogatories.
  (1) Thirty Questions Relevant to the Dispute. During the discovery period, each party will be allowed to ask the other party a maximum of thirty written questions relevant to their dispute. The interrogatories may be asked in different sets during the discovery period, but a total of only thirty will be allowed during that period. The questions shall be direct. If the questions have subparts, then each subpart will be counted as a separate interrogatory.
  (2) How Submitted; Posting. The requesting party will submit the interrogatories by e-mailing their questions to the parties' Dispute Resolution Page in accordance with 3.Rule 12.
  (3) Parties Must Respond; Timing. The responding party has a duty to answer the interrogatories fully, timely, and in good faith. The responding party must answer the interrogatories within 20 days of receiving them and then e-mail their answers to the parties' Dispute Resolution Page in accordance with 3.Rule 12.

(F) Fifteen Requests for Production of Documents (or Inspection of Tangible Items).
  (1) Fifteen Requests for Production of Documents Relevant to the Dispute.
  During the discovery period, each party will be allowed to ask their opponent a maximum of fifteen requests for production of documents relevant to their dispute. One request may encompass multiple documents which satisfy the request. The requests for production may be asked in different sets at different times throughout the discovery period, but a total of only fifteen requests will be allowed during that period. The requests for production shall be direct, and if the requests have subparts, then each subpart will be counted as a separate request for production. "Documents" include any hand-written or type-written forms, electronically stored material, photos, drawings, videotape, film, x-rays, including anything capable of being put in a recordable form of any kind.
  (2) Ten Requests for Production of Tangible Items for Inspection. During the discovery period, the parties will be allowed to ask their opponent for a maximum of ten written requests for production of tangible items relevant to their dispute in order to inspect them. The requests for production may be asked in different sets throughout the discovery period, but a total of only ten will be allowed during that period. The requests for production shall be direct, and if the requests have subparts, then each subpart will be counted as a separate request for production. "Tangible" item is any physical three-dimensional item that cannot be stored and transmitted for inspection over the Internet and instead must be sent via a private courier or postal service.
  (3) How Submitted; Posting; How to Respond.
    (a) Documents. Responding parties will submit their responses to the requests for production of documents by e-mailing their responses to the parties' Dispute Resolution Page in accordance with 3. Rule 12. This may require responding parties to "scan" and digitize hard-copy documents only if they do not exist in transmittable form over the Internet.
    (b) Tangible Items. Responding parties will submit their responses to the requests for production of tangible items by sending via courier or postal delivery service the requested tangible items directly to the the System Internet adjudicator for preliminary inspection. The Internet adjudicator will note receipt of the item, inspect the item, and then send it via courier or postal delivery service to the requesting party for inspection. The inspecting party will note receipt of the item, inspect it, and then return it via courier or postal delivery service to the Internet adjudicator and may note for the Internet adjudicator any preliminary concerns or objections to the item. The Internet adjudicator will inspect the item again and compare it to its original preliminary inspection to make sure the item has not been altered or tampered with while it was being inspected by the requesting party.

(4) Parties Must Respond; Timing.
  (a) Documents. The responding party has a duty to answer the requests for production fully, timely, and in good faith. The responding party must provide the documents within 20 days of receiving the requests and post them to the parties' Dispute Resolution Page in accordance with 3.Rule 12.
  (b) Tangible Items. The responding party will send via courier or postal delivery service the requested tangible items directly to the the System Internet adjudicator for preliminary inspection within 20 days of receiving the requests and post a digitized photograph of the item on the parties' Dispute Resolution Page in accordance with 3.Rule 12. The Internet adjudicator will inspect the item, and then send it via courier or postal delivery service to the requesting party for inspection within 10 days of receiving the item. The inspecting party will inspect the item, and then return it via courier or postal delivery service to the Internet adjudicator within 10 days of receiving the item and may note for the Internet adjudicator any preliminary concerns or objections to the item.

(G) Twenty-Five Requests for Admissions.
(1) Twenty-Five Requests for Admissions Relevant to the Dispute. During the discovery period, each party will be allowed to ask the other party a maximum of twenty-five written requests for admissions relevant to the dispute. The requests for Admissions may be made in different sets during the discovery period, but a total of only twenty-five will be allowed during that period. The requests for admissions shall be direct. If the requests have subparts, then each subpart will be counted as a separate request. The parties have a duty to answer "admit" or deny" to each request for admission and do so on time, and in good faith.

(2) How Submitted; Posting. The requesting party will submit the requests for admission by e-mailing their requests to the parties' Dispute Resolution Page in accordance with 3.Rule 12.

(3) Parties Must Respond; Timing. The responding party has a duty to answer the requests for admission fully, timely, and in good faith. The responding party must answer the requests for admissions within 20 days of receiving them and then e-mail their responses to the parties' Dispute Resolution Page in accordance with 3.Rule 12. Any request for admission not answered within 20 days of receipt will be deemed admitted in favor of the requesting party.

(H) Pre-Trial Disclosure of Any Relevant Documents and Tangible Evidence that Each Party Plans to Submit to the Internet adjudicator for Final Decision. Regardless of any discovery requests made in the case, the parties are required to make mandatory pre-trial disclosures of all the exhibits they intend to use in their final submissions to the Internet adjudicator.

(1) Setting a Final Argument Submission Date. the System will set a final argument submission date which will be determined as follows:
  (D) On the same day the parties must produce requested documents, or
  (E) Within 10 days after they must answer interrogatories if no requests for production are submitted, or
  (F) Ten days after the last pleading is filed if no interrogatories or requests are submitted.

(2) Exhibits/Documents Due Thirty Days before Final Argument Submission Date. Thirty days before the final submission date, the parties will submit to the Internet adjudicator any and all documents (including photographs, affidavits of other individuals, charts, records) that they plan to submit for the Internet adjudicator's consideration as a part of their final argument that is not already a part of the existing record. They will e-mail their exhibits to the parties' Dispute Resolution Page in accordance with 3.Rule 12.

(3) Failure to Submit Exhibits/Documents Thirty Days before Final Argument Submission Date. If an exhibit or document that a party plans to use for the final submission to the Internet adjudicator is not produced at least thirty days before the final submission date, it will not be considered by the Internet adjudicator as part of the final submission.

(I) Motion for Additional Discovery Requests. In addition to the discovery requests provided for in this provision, a party may make a motion that the Internet adjudicator allow additional discovery requests if the dispute warrants the additional requests in the discretion of the Internet adjudicator. Motions where both parties agree that the requests are warranted will be looked on more favorable by the Internet adjudicator.

3.Rule 28: Failure to Produce Discovery Requests.
  (A) Requirement to Produce Discovery Requests. There is a duty and requirement for the parties to produce the discovery requests within the time limits. Any party failing to produce and discovery within the time limits will be assumed to be in violation of this rule. There is also a continuing duty for the parties to update their discovery responses to the extent that more facts or documents become responsive to the discovery requests up until the date of the final submissions.
  (B) Failure to Produce; Motion to Compel; Response.
    (1) Fifteen Days to File Motion to Compel. If a party fails to produce any discovery request within the time limit, the requesting party has 15 days within which to file a motion to compel the production of the requested discovery. That motion to compel will be filed on-line with both the Internet adjudicator and the party that has failed to produce. The motion will state the discovery requests, when they were sent, and must show that the other party has failed to respond within the applicable time limit.
    (2) Failure to File a Motion to Compel. Any failure by the original requesting party to make a motion to compel within the 15 days after the requested discovery was due will mean that the discovery requests are no longer in effect.
    (3) Response to Motion to Compel. If the motion to compel is filed timely, the party who has failed to produce the requested discovery has 5 days to respond to the motion to compel and must explain: (1) why they have failed to produce the requested discovery, and (2) why the Internet adjudicator should not impose any sanctions. That response will be filed on-line with both the Internet adjudicator and the requesting party.

(4) Discretion of the Internet adjudicator. If a disobedient party fails to produce requested discovery information but has "good cause" as to that failure, such as a request for trade secrets, the Internet adjudicator may in his discretion, determine the discovery requests are not allowed.

(C) Order to Produce the Requested Discovery; Sanctions. If the Internet adjudicator is not satisfied with the reasons for the failure to produce the requested discovery, the Internet adjudicator will order the party to produce the requested discovery immediately and, in the Internet adjudicator's discretion, may also order any, or all, of the following sanctions:

(1) Costs to Prepare Motion to Compel. The Internet adjudicator may order the party to pay for the requesting party's costs and reasonable attorney's fees associated with having to file the motion to compel.
(2) Punitive Costs. The Internet adjudicator may order the party to pay up to 10% of the amount in controversy as a sanction for not complying with this rule.
(3) Matters Deemed Admitted. The Internet adjudicator may order that certain matters related to the discovery requests are admitted in favor of the requesting party and against the party who failed to produce.
(4) Dismissal/Default. If the requested discovery is never produced despite an order compelling the production of the requested discovery, the Internet adjudicator may order that the entire lawsuit be dismissed with prejudice against the party who fails to produce and may order judgment in favor of the requesting party against the opposing party.

3.Rule 29: Dismissals before the Final Argument Submissions.

(A) Defendant Confesses Judgment. At any point during the proceedings, a defendant may elect to confess liability and judgment simply pay the requested damages, if so, the case will be deemed resolved pursuant to this rule.

(B) Plaintiff Drops the Action. At any point during the proceedings, a plaintiff may elect simply to discontinue the action against the defendant, and the action will be deemed resolved pursuant to this rule. However, if the defendant has set forth any counterclaims, those claims will not be dropped, and the action will continue with respect to those counterclaims.

(C) Defendant Dismisses Plaintiff's Case for Failure to Go Forward. At any point during the proceedings, if the plaintiff is not responding and is not going forward with the action, the defendant may ask the Internet adjudicator to dismiss the plaintiff's inactive action.

(D) The Parties' Stipulated Dismissal. At any point during the proceedings, if the plaintiff and the defendant settle the action pursuant to negotiation or mediation, the parties should submit a motion to voluntarily dismiss the action pursuant to this rule.

3.Rule 30: Summary Judgment.

(A) No Factual Dispute; Judgment as a Matter of Law. At any point after discovery has been completed, either party may move for summary judgment if there is no genuine issue of material fact that is in dispute such that the Internet adjudicator can decide the case as a matter of law since the credibility of conflicting evidence or testimony is not an issue.

(B) Burden of Moving Party—No Factual Dispute. The moving party must demonstrate that there is no genuine issue of material fact at issue in the dispute. The moving party can do this by pointing out that the non-moving party has failed to produce evidence, or that the evidence produced by both sides is not in dispute as a factual matter.

(C) Burden of Moving Party—Judgment as a Matter of Law. The moving party must also show that based on the demonstrated undisputed facts, the law favors the legal position of the moving party such that the moving party should prevail as a matter of law.

(D) Burden of Non-Moving Party—Factual Dispute or Judgment as a Matter of Law. The non-moving party may successfully resist the summary judgment motion and proceed to the final argument if they can show there is a factual dispute that needs to be resolved at the final argument. The non-moving party may also choose to acknowledge that there is no genuine issue of material fact but they, the non-moving party, should prevail as a matter of law, not the moving party.

(E) Partial Summary Judgment. The Internet adjudicator may render judgment in favor of one party as a matter of law regarding the entire dispute or any discrete part thereof, such as against just one of many parties or but one of many claims. In the event of a partial summary judgment, the Internet adjudicator will render final judgment on the requested issue and set the remaining portions of the dispute for final argument.

(F) Denial of Motion. If the Internet adjudicator determines that there is a genuine issue of material fact that must be resolved at the final argument and review of the conflicting evidence, the Internet adjudicator will deny the motion explaining the existence of the genuine issue of material fact, making a grant of summary judgment improper.

(G) Timing; Responses; Ruling. The moving party can make the motion any time after the discovery cut-off date and before final argument submissions are due. The non-moving party will then have twenty days to respond, explaining why there is a genuine issue of material fact and the motion should be denied so that the case can move to final argument, or acknowledge that there is no genuine issue of material fact but argue that the non-moving party should prevail as a matter of law. The moving party will have 10 days to reply to the response. The Internet adjudicator will revise the due dates of the final argument, direct and cross examination of witnesses and review of evidence so as to rule on the summary judgment papers.

3.Rule 31: Final Argument Submissions.

(A) Final Argument Submissions to the Internet adjudicator. On the final argument submission date, each party may submit up to seven, single-spaced, 8 and ½"×11"[21.59× 27.94 centimeters] screens of 12-point written text (with standard 1" [2.54 centimeters] margins) which will constitute their final argument submission explaining their legal and factual position in the dispute to the the System Internet adjudicator. Each will post their final submission on the parties' Dispute Resolution Page in accordance with 3.Rule 12 so that each party can review it.

(B) Attachments to the Final Argument Submissions.

(1) Case Law Interpretations. In addition to written argument, the parties may attach any case law opinion from a competent court interpreting the governing U.C.C. provisions in a way that is helpful to the submitting party's argument. Although there is no binding case law, the Internet adjudicator may consider such attached legal opinions in his discretion as persuasive authority.
  (a) All Case Law is Persuasive, Not Binding Law. No binding case law interpretations or legal opinions will be recognized by the Internet adjudicator. Therefore all case law will be considered persuasive law only, not binding.

(b) Case Law May be Submitted as Persuasive Law Only. The parties may submit any cases that interpret the text of Article 2 of the U.C.C., similar provisions, or any case from a competent court or tribunal, or previous the System Internet adjudicator decisions, but the Internet adjudicator in the current case will consider such decisions to be persuasive case law interpretations only and therefore will not be bound by, or be required to apply, the reasoning contained in those written opinions.

(2) Case Law Page Limit. Although there is no limit as to the number of such persuasive case law opinions that the parties may submit, each party is limited to a total of 200 published pages of persuasive case law which can be attached to their final submissions to the Internet adjudicator.

(3) Duty of Submitting Party. Every cited case law decision must be submitted not only to the Internet adjudicator, but also to the opposing party. The cost and responsibility of reproducing those cases for the Internet adjudicator and the opposing party will be borne by the party submitting them.

(C) Replies. Within ten days after the final argument submission date, each party is entitled to file a three-page reply to the opposing party's final argument submission. Any case law submitted as attachments cannot exceed, together with any case law already submitted in the final submission, the overall limit of 200 pages.

(D) Consideration of all Submissions in Rendering a Final Decision Resolving the Dispute. The Internet adjudicator will review and consider all of the following in rendering a final decision:
  (1) the pleadings;
  (2) all correspondence between the parties;
  (3) the answers to any interrogatories;
  (4) the documents and exhibits produced thirty days before the final argument submission date;
  (5) the negotiation or mediation correspondence, if used and if both parties agree to submit it to the Internet adjudicator;
  (6) the final argument submissions by the parties, including any attachments;
  (7) the Parties' Replies, if any;
  (8) the text of Article 2 of the U.C.C.;
  (9) the parties' and any witness' direct or cross-examinations; and,
  (10) in the Internet adjudicator's discretion, any case law submitted with the final submissions and replies.

3. Rule 32: Rules Pertaining to Evidence and Exhibits Used in the Final Submission.

(A) Evidence May Be Offered by Parties Attached to Final Argument Submission. The parties may offer evidence relevant to their dispute attached to their final argument submissions filed with the Internet adjudicator. These documents and exhibits must have been produced and submitted to the parties' Dispute Resolution page 30 days before the Final Submission date. Each attached item of evidence, such as a document and photographs, will be numbered so the Internet adjudicator and the parties can easily identify the item of evidence submitted. The Internet adjudicator will consider all submitted evidence which complies with all of the provisions contained in this rule.

(B) Objections: How Made. After five days of the final submissions, with attached evidence, the parties may file with the Internet adjudicator any objections they may have, listing numerically any item of evidence they believe is not in compliance with any of the provisions contained in this rule. The objecting party is to list the numbered item of evidence, the rule provision it allegedly violates, and a short statement as to why it allegedly violates the provision.

(C) Ruling on Objections. The Internet adjudicator will not make formal rulings on the objections but will simply take them into account when deciding the merits of the case. The Internet adjudicator, in the Internet adjudicator's discretion, may state why an item of evidence was either included over an objection, or excluded pursuant to an objection, in the final written decision.

(D) Specific Evidentiary Provisions. All evidence submitted will be considered by the Internet adjudicator unless the Internet adjudicator, in his discretion, determines that the offered evidence violates one of the following provisions, and excludes it.
  (1) Relevancy Requirement. All submissions must be relevant and material to the subject matter of the dispute. To be relevant and material, the submission must be logically related to the case and have an effect on something that matters in the case. If it is irrelevant or cumulative, then the Internet adjudicator will ignore it and may look less favorably on the case of the party who submitted it.
  (2) Settlement Negotiations and Mediation Sessions Are Inadmissible. All statements made in private settlement negotiations or in mediation sessions are deemed confidential and are therefore inadmissible and will not be considered by the Internet adjudicator, unless the parties mutually agree to make all or some statements and conduct in settlement negotiations and mediation sessions admissible. The parties may elect to have their mediator Internet adjudicator also be their Internet adjudicator for the Final Submissions, in which case this provision would be inapplicable.
  (3) Privileged Communications Inadmissible. All statements made in private communications between the parties and their attorneys or other legal representatives, and between parties and their spouses, and the work-product of the parties' attorneys or legal representatives, are deemed confidential and therefore inadmissible. Such information will not be considered by the Internet adjudicator unless a party chooses to reveal the communication or work-product in which case this provision is waived.
  (4) Character Evidence Inadmissible. All statements made concerning the reputation of an individual in order to demonstrate that person's propensity or predisposition to engage in, or not to engage in, a particular act, is inadmissible.
  (5) Opinion Testimony Inadmissible unless it is that of a Qualified Expert. Opinion testimony is excluded unless it is that of a qualified expert in a scientific, technical, or other specialized area of knowledge and it would be helpful to the Internet adjudicator to hear the expert opinion testimony of the qualified expert. The opinion must be based upon: (1) sufficient facts or data reviewed by the expert; (2) reliable principles and methods employed by the expert; and, (3) the reasonable and reliable application of the principles and methods by the expert. The Internet adjudicator may choose a the System appointed expert to assist the Internet adjudicator.
  (6) All Other Information Admissible in the Discretion of the Internet adjudicator. All other submissions by the parties are admissible, if relevant, in the discretion of the Internet adjudicator, included but not limited to: hearsay testimony, lay and expert opinion testimony, and insurance evidence.

(E) Types of Evidence. The following types or forms of evidence will be allowed as admissible submissions:
- (1) Testimonial Evidence; Witness Statements and Affidavits. The parties may submit sworn "affidavits," which are written sworn statements of witnesses or the parties themselves signed and given under the pains and penalties of perjury. The Internet adjudicator will consider the information contained in those written witness statements or affidavits regarding the dispute.
- (2) Demonstrative Evidence. The parties may submit charts, diagrams, lists, maps, and other documentary evidence, etc., which help to explain or clarify a witness's written statement or affidavit and a party's legal position specially prepared for the Internet adjudicator's consideration.
- (3) Real Evidence. The parties may submit tangible or written evidence.
  - (a) Documentary Evidence. All documents, such as letters, correspondence, contracts, invoices, and photographs, between the parties that are part of the dispute or demonstrate something that happened in the dispute may be attached as a submission. All documents or images must be "digitized" so they can be sent over the Internet.
  - (b) Tangible Evidence. All non-documentary evidence that is physical in nature, such as an actual good purchased or damaged, a piece of hardware, or a physical item of any kind, may be sent to the Internet adjudicator through the mails or other delivery service as a submission. (See E-3.Rule 27(F)(2), (F)(3)(b), and (F)(4)(b)) The Internet adjudicator has the option of accepting a digitized photograph of the physical item, the tangible evidence, in lieu of a party sending the tangible item through the mails or other delivery service set forth in E-3.Rule 27(F)(2), (F)(3)(b), and (F)(4)(b).

(F) Witnesses; Witness Statements. The following provisions apply to witness statement or affidavit submissions.
- (1) Oath Required. The parties may submit sworn statements of witnesses that have relevant personal knowledge to the case. A party may be a witness in his own behalf and submit their own sworn witness statement. The witness must sign the statement and swear to or affirm its truth under the pains and penalties of perjury.
- (2) Competency; Personal Knowledge. The witness must have personal knowledge of something relevant to the case, have some recollection of the relevant matter and the ability to communicate their testimony in a written statement.
- (3) Internet adjudicator, Mediators, Attorneys, Legal Representatives. The Internet adjudicator and the mediator, if a mediator was used, may not submit witness statements. However, in the Internet adjudicator's discretion, attorneys or other legal representatives of the parties may submit witness statements.
- (4) Number of Witness Statements; Length. The Internet adjudicator has the discretion to set reasonable limits on the number of witness statements that will be allowed to be submitted, and page lengths of those statements based on the circumstances of the case.

(G) Authentication of Evidence. Each evidentiary submission, including every witness statement and all exhibits, must contain some basis to demonstrate that the evidentiary item submitted is what it purports to be.
- (1) Witness Statements. Each witness statement must contain the witness' identifying information so that the Internet adjudicator or the opposing party can confirm that the statement is truly their statement.
- (2) Documents. All documents must contain identifying information so that the Internet adjudicator or the opposing party can verify its source. (See Appendix #3 as a way to authenticate all correspondence between the parties).
- (3) Tangible Items. All tangible items must contain a written summary identifying the item and relaying its source or origination.

(H) Cross-Examination of Witnesses; Live Telephone or Live Video-Conferencing. Either party may elect to cross-examine any witness who has submitted a sworn witness statement.
- (1) Notification. Within five days after the final submissions have been made, a party may elect to set-up a cross-examination of any witness. It will be in the discretion of the Internet adjudicator when to schedule the cross-examination of witnesses and notify the parties to produce the witness for cross-examination.
- (2) Method. The party electing to cross-examine a witness may conduct the cross-examination by telephone conference set up by the Internet adjudicator or by video-conferencing, assuming the parties and witness have that capability.
- (3) Costs. The party who elects to cross-examine a witness must pay for the costs of the live telephone conference call or the video conference call.
- (4) Direct Examination. If a party representing the witness wishes to do a direct examination of the witness before they are cross-examined, they may do so, in the discretion of the Internet adjudicator, but the party conducting the direct examination must pay for the costs of the telephone or video conference call associated with their direct examination. The Internet adjudicator will determine the split in costs as it relates to the actual time taken by each party. The Internet adjudicator may conduct the direct and cross-examinations at the same time or at separate times in the officer's discretion.
- (5) Internet adjudicator's Questions. At any point during the direct or cross-examinations, the Internet adjudicator may pose his own questions to the witness. The cost for this time will be borne by the party who happens to be examining the witness (direct or cross) at that particular time. The Internet adjudicator will make this determination in the officer's discretion.

(I) Closing Arguments. Each party shall have thirty minutes, in a live telephone or video conference or a live on-line transmission on the parties' Dispute Resolution Page, with the Internet adjudicator and opposing party, to make a closing argument to the Internet adjudicator as to why the party should prevail in the action. The Internet adjudicator shall determine in his discretion when the closing argument will take place and what method of communication will be used.

(J) Timing. The final closing argument and the opportunity to cross-examine witnesses to be conducted on-line or by telephone or video conference will be scheduled by the Internet adjudicator no later than 45 days after the final argument submission replies are due. The final closing argument may be at the same time or at separate time from the direct and cross-examinations in the Internet adjudicator's discretion.

3.Rule 33: Judgment.

(A) Final Written Decisions by Internet adjudicator Resolving The Dispute. As disputes are resolved by the final decision of the Internet adjudicator, the Internet adjudicator will provide a written final decision explaining the resolution of the dispute, including summary judgments or disputes dismissed before the final argument. The final decision will contain the following three items:

(1) Findings of Fact—which will include an analysis of the factual record and resolution of all pertinent factual disputes between the parties;

(2) Conclusions of Law—which will include an analysis of the parties' pleadings, all submissions and all applicable law, and the legal reasons for the decision and how the text of Article 2 of the U.C.C. was applied;

(3) Final Resolution of the Dispute and Arbitration Award, if any—which will set forth the Internet adjudicator's clear, final directive to the parties as to how exactly the dispute is resolved. The judgment will include the award and state the specific amount of damages, if any, to be paid to the prevailing party.

(B) Timing. The Internet adjudicator will render a final written decision judgment within 30 days of the final argument and opportunity to cross examine witness, or within ten days of service should the defendant have defaulted.

(C) Posting. The Internet adjudicator will e-mail the final decision to the parties and post them on the parties' Dispute Resolution Page in accordance with Rule 4. This act will be the official entry of final judgment on the matter in question.

3.Rule 34: Publication of the System's Final Written Decisions/Arbitration Awards of Internet adjudicators.

(A) Publication. The written final decisions of all the System Internet adjudicators will be published in the "the System Final Decision Directory," located on-line on the System's website and fully accessible by all party litigants. The IAJ will decide which decisions shall be published.

(B) Decisions Considered Persuasive Case Law. Those final Internet adjudicator published decisions will be considered persuasive case law interpretations of the text of the U.C.C., just as all courts of competent jurisdiction interpreting the text of the U.C.C. are considered "persuasive" authority.

3.Rule 35: Recovery of Filing Fee to the Prevailing Party.

(A) Available Only to a Plaintiff Purchaser. If the plaintiff purchaser is the prevailing party, to be determined by the Internet adjudicator, then as a part of the judgment in favor of the plaintiff purchaser, the Internet adjudicator will award the cost of the plaintiff's filing fee, and any other reasonable costs, but not including attorney's fees, as part of the damage award against the defendant vendor to put the plaintiff in the position they would have been in were it not for the wrong of defendant. The amount will be determined in the discretion of the Internet adjudicator.

(B) Available to a Defendant Vendor. If the defendant vendor is the prevailing party, to be determined by the Internet adjudicator, then as a part of the judgment in favor of the defendant vendor, the Internet adjudicator will award any reasonable costs expended by defendant, but not including attorney's fees, as part of the damage award against the plaintiff purchaser. The amount will be determined in the discretion of the Internet adjudicator.

(C) Rule Inapplicable in Negotiation or Mediation. If the parties mutually elect either the private negotiation option or the mediation option, and resolve their dispute pursuant to either of those methods, this rule awarding the filing fee does not apply.

3.Rule 36: Reconsideration and Appeal of Final Judgment.

(A) Reconsideration. Within five days of the final decision of the Internet adjudicator, the losing party may request that the Internet adjudicator reconsider the final decision based on any clerical error, mistake, inadvertence, or if the Internet adjudicator failed to consider or overlooked a piece of evidence or key argument that otherwise should have been considered. The Internet adjudicator will not change the final decision unless there is a clear legal or factual error or oversight that would have changed the result of the case.

(B) Appeal.

(1) Timing. Within fifteen days of the final judgment, or if a reconsideration was requested, within fifteen days of the denial of the reconsideration, a party may file a notice of appeal of the final judgment. The party who initiated the appeal is the "appellant" and the responding party is the "appellee."

(2) Cross-Appeal Allowed. The other responding party may also appeal any adverse aspect of the decision and in that case will be called the "cross-appellant." The appeal and the cross-appeal must be responded to by each respective party.

(3) Assignment of an Appellate Internet adjudicator. the System will appoint an appellate Internet adjudicator to consider the appeal.

(4) Standards of Review. Only appeals based on clear, obvious legal or factual mistakes of the original Internet adjudicator will be considered. Unless the original Internet adjudicator abused their discretion in making factual findings or their legal rulings were clearly erroneous, that original Internet adjudicator's decision will be upheld.

(C) Appellate Procedure.

(1) The Appeal Filing. The appellant must timely file, along with the notice of appeal, an explanation of the basis for appeal which may not exceed five single-spaced, 8 and ½"×11" [21.59×27.94 centimeters] screens of 12-point written text (with standard 1" margins) [2.54 centimeters]. The filing should explain the factual and legal basis for the appeal and why the original Internet adjudicator's decision should be reversed. No attachments will be allowed although appellant may refer to documents submitted in the original record.

(2) Cost. The filing fee of $450 to appeal will be paid by the appellant, unless otherwise included in insurance or per transaction fee payment program. The appellant shall also file an appeal bond in an amount to be determined by the appellate officer.

(3) Appellee's Response. The appellee will have fifteen days within which to file a response which shall be limited to five single-spaced, 8 and ½"×11" [21.59× 27.94 centimeters] screens of 12-point written text (with standard 1" margins) [2.54 centimeters]. Their response filing should explain the factual and legal basis why the original Internet adjudicator's decision should be upheld. No attachment will be allowed although appellee may refer to documents submitted in the original record.

(4) Cross-Appellee's Response. If a cross-appeal is filed, the cross-appellee will be allowed to file a response. The cross-appellee will have ten days within which to file their response which shall be limited to three single-spaced, 8 and ½"×11" [21.59×27.94 centimeters] screens of 12-point written text (with standard 1" margins) [2.54 centimeters]. Their response filing should explain the factual and legal basis why the original Internet adjudicator's decision should be upheld. No attachment will be allowed although appellee may refer to documents submitted in the original record.

(5) Final Appellate Decision. Within thirty days of the appellee's response filing, the appellate Internet adjudicator will render a final appellate decision which will be final and unappealable by the parties. The appellate decision will set forth the reasons for upholding, modifying or reversing the original decision and will contain findings as to whether the original Internet adjudicator either abused his discretion in finding erroneous facts or was clearly erroneous in applying the text of Article 2 of the U.C.C.

(D) Stay of Judgment During Appeal. The final decision of the original Internet adjudicator that is being appealed cannot be enforced during the pendency of the appeal. Only after the appeal is resolved and a final appellate decision is rendered can the original final decision be enforced.

(E) Frivolous Appeals and Payment of Interest.

(1) Frivolous Appeals. If the appellate Internet adjudicator determines in the officer's discretion that the appeal is wholly without merit or was made for an improper purpose, such as to harass or improperly delay, the appellate Internet adjudicator may award the cost of the appellate filing fee and up to ten percent of the arbitration award, in addition to the upheld award itself, as a sanction against the appellant for filing the frivolous appeal.

(2) Payment of Interest on Original Arbitration Awards Against Appellants. If an appellant loses an appeal, that appellant will pay at the prevailing rate interest on the original damages against it calculated from the date the original Internet adjudicator rendered a final decision until the date the appellate Internet adjudicator upheld the original decision. However, if the appellate Internet adjudicator modifies or reverses the original Internet adjudicator's decision, no interest will be awarded.

3. Rule 37: Enforcement of Judgments.

(A) Directive to Pay. Any party ordered to pay an award is a "judgment-debtor." A judgment-debtor will be directed to pay the damage award set forth in the final judgment to the other party, the "judgment-creditor," within ten days of the judgment, or, if it was appealed, within ten days of the original decision being upheld or modified. Payment will be made through the System's pay service. If payment is not satisfied within ten days, the judgment-creditor may seek to enforce the judgment as set forth below by reporting the judgment-debtor's delinquent payment to the System. The judgment-creditor may also begin a collection action in a court of competent jurisdiction.

(B) Judgment-Debtor Payment Histories.

(1) Allowance by Parties to Report Payment History Should They Become a Future Judgment-Debtor. The parties will allow the System to report the timeliness of payments of all judgment-debtors, and such payment histories will be posted at the System's general website so potential purchasers and vendors can check the timeliness of payment of any judgments. the System will calculate the percentage and overall number of times a judgment-debtor was late in satisfying any judgments against it. No other information or comment will be provided other than the number and percentage of times, if any, that a particular party has been late. The intent of this provision is to provide a strong incentive for parties to pay any outstanding the System judgments.

(C) Enforcement Procedures: Costs And Fees in Enforcing any the System Judgment in an Outside Court of Competent Jurisdiction.

(1) Enforcement in a Court of Competent Jurisdiction; Sanctions. In the event a judgment-debtor does not fully honor a the System judgment against it, and the disincentive of having the System report this non-payment on its website is not effective in coaxing the judgment-debtor to pay, the parties agree that the System judgment can be enforced in a court of competent jurisdiction, and the judgment-debtor agrees to pay all costs and reasonable attorneys' fees associated with enforcing the System judgment.

(2) Duty of Judgment-Creditor. It will be the sole responsibility of the judgment-creditor to enforce any the System judgment in any court of competent jurisdiction and not the responsibility of the System.

(D) No Liability of the System. The parties will hold the System harmless for any the System judgment that cannot be enforced by the judgment-creditor, including but not limited to situations where the judgment-debtor has declared bankruptcy or otherwise has become judgment proof.

3. Rule 38: Application of the Results of Former Disputes to the Current Dispute.

(A) Former Disputes between the Parties Cannot Be the Subject of the Current Dispute: "Claim Preclusion." In the event that the two current parties had a former dispute between them that was resolved by either a the System Internet adjudicator or by another court of competent jurisdiction, that former dispute cannot be the subject of the current lawsuit. Parties cannot use the System to have a second chance to resolve a dispute in the event that they are not satisfied with the way the first lawsuit was resolved. The prohibition on such claims that are being re-filed in an attempt to re-adjudicate them will be called Claim Preclusion.

(1) Precluding the Same Claim. A current dispute or a claim in that dispute will be precluded under this rule only if it is the same dispute or a claim therein as the former dispute. If the current dispute or a claim in that dispute is a different dispute or a claim in that dispute, then this rule is inapplicable.

(2) Between the Same Parties. A current dispute or a claim in that dispute will be precluded under this rule only if the previous dispute or a claim in that dispute that was resolved is between the same parties and the current lawsuit. If the plaintiff or defendant is a different party then this rule is inapplicable.

(3) After a Final Judgment on the Merits. A current dispute or a claim in that dispute will be precluded under this rule only if the previous dispute or a claim in that dispute between the same parties was resolved by a final judgment on the merits. Final judgments on the merits are to be appealed, not simply re-filed with the System. If any former dispute or a claim in that dispute was not a final judgment or was dismissed for procedural reasons that did actually address the substance or merits of the dispute, then this rule is inapplicable.

(B) Former Issues Resolved in Prior Disputes Involving Either of the Parties Cannot Be Resolved in the Current Dispute: "Issue Preclusion." In the event that either of the two current parties had a former dispute where a legal or factual issue was resolved by either a the System Internet adjudicator or by another court of competent jurisdiction, that former resolved issue cannot be resolved again in the current lawsuit. Parties cannot use the System to have a second chance to resolve an issue that they already had a full and fair opportunity to litigate in a previous dispute. The prohibition on such issues that have already been determined in an attempt to re-adjudicate them will be called Issue Preclusion.

(1) Precluding the Same Issue. A current issue will be precluded under this rule only if it is the same exact issue contained in a former lawsuit. If the issue in the current lawsuit is a different issue than what was previously determined in a former lawsuit, then this rule is inapplicable.

(2) The Same Issue Must Have Been Actually Litigated and Determined in the Previous Dispute. A current issue will be precluded under this rule only if it was actually addressed in the former dispute and was a part of the final judgment in the former dispute. If the issue in the current lawsuit was not actually litigated and determined in the former dispute, then this rule is inapplicable.

(3) The Same Issue Must have Been Essential to the Judgment in the Previous Dispute. A current issue will be precluded under this rule only if it was determined as an essential part of the previous dispute and was not merely a collateral or side issue not essential to the judgment in the former suit. If the issue in the current lawsuit was not essential to the judgment in the former dispute, then this rule is inapplicable.

(4) The Party Against Whom Issue Preclusion Is Being Used Must Have Been a Party in the Previous Dispute Who Had a Full and Fair Opportunity to Litigate That Issue. A current issue will be precluded under this rule only if in the previous dispute the party against whom the rule is being used was a party in the previous dispute and had a full and fair opportunity to litigate the issue. If the party against whom the rule is being used was not a party in the previous dispute or did not have a full and fair opportunity to litigate that issue in the previous dispute, then this rule is inapplicable.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims and structural and functional equivalents thereof.

For example, some alternative costs and fees and service options may be as follows:

Some Costs & Fees

1. Filing Fee for Complaint—RULE 3
(C) Filing Fee. The Cost of Filing a Complaint Will Require the Plaintiff to Pay Either:
   (1) a filing fee of $100 to the System; or,
   (2) if the plaintiff has pre-purchased the System dispute resolution insurance, then the plaintiff shall pay only a $25 filing fee.
2. Negotiation/Mediation—RULE 11
Negotiation cost: (2) Cost. The page will be provided free of charge for the first hour of on-line negotiation. After the first hour, there will be a one-time $30.00 flat fee that will allow the parties to continue to access the private, confidential chatroom and negotiate on-line as often as the parties deem necessary thereafter.

Mediation cost: (1) Cost. The parties are free to use the mediation services as often as they deem necessary but the mediation sessions will cost the parties $50 per hour ($25 by each side).

Service Option #1-Option to Authenticate all Correspondence Between the Parties Before any Dispute Ever Arises.

(A) Option to Conduct Entire Transaction On-line through the System. Before any dispute ever arises, the parties may elect to conduct their entire transaction on-line through the System's website. the System will create a special Dispute Resolution Page for the parties to exchange all information and correspondence relating to their transaction such as the offer, acceptance, terms of contract, invoices, request for payment, proof of payment, request for delivery, proof of delivery, complaints of non-conforming/damaged goods, attempts to cure, etc. Because this will be conducted on-line, in the event a dispute ever arises between the parties, all such written information will automatically become the official, authenticated factual written record of the dispute that the Internet adjudicator/arbitrator will consider. If the parties elect to use this service, the parties will not contact each other by phone or any other means other than by e-mail through their the System special website.

(B) Submission of Related Documents to the Transaction. Any outside documentation that is not correspondence but relates to the transaction and a party wishes to become an official part of the record must be provided on the site as soon as it becomes available.

(C) Cost. The cost of the service will be a one-time $50.00 flat fee, regardless of whether a dispute arises or not. Each document when submitted will become a ".PDF" "read-only" file that cannot later be altered or changed in any manner in order to prevent fraud or manipulation of the documentary record should a dispute later anrse.

service option #2 would include an option to have the System help draft standard e-commerce norms and policies for vendors and business to business e-commerce.

Some corresponding rules may vary from gradation to gradation, level to level. These same differences may be applied to a different gradation or level. For example, if at gradation #2 it is mentioned that certain costs may be paid in a certain way such as in a per transaction fee program or otherwise as agreed upon by one or more parties or at gradation #1 it is mentioned that the gradation or level selection criteria may be otherwise than according to the preferred amount in dispute ranges, then such alternative cost structure also applies as an alternative to other gradations and/or other cost structures even if those other gradations or cost structures do not expressly mention this alternative. Also, definitions are supplied for the exemplary rules that do not necessarily apply to same or similar terms used elsewhere herein, e.g., claims terms are generally intended to have their ordinary meanings.

In some places in the rules, the terms "must" and "shall" and similar terms denoting requirements are used, particularly in the exemplary rules. These terms are preferably used in rules that will actually be applied and be posted at the System site or vendor site or otherwise made available to parties. Note that for the purposes of the present application, the actual item that is designated with this term may be merely preferred and not absolutely required in the sense of making it a part of the rules that will be applied. In many cases, once selected to be part of the rules of a system in actual use, the selected item will be required during the proceedings. Likewise, in some places herein, such as in the exemplary rules, it is stated that a certain step or item is merely preferred, which is the case with respect to a preferred embodiment of the present invention. However, when parties are actually resolving a dispute in accordance with the preferred embodiment, those rules may be typically requirements of the parties and/or the process. That is, one can build a system or set of rules governing the system according to the preferred embodiment and/or various alternatives within the scope of the invention. The system in place for on-line dispute resolution will require certain steps or items that may have been selected from various alternatives when the system was built and/or the rules were selected. For example, the preferred embodiment requires English-only documents and payments in U.S. dollars, whereas one could build a system that uses, e.g., Euros and French within the scope of the invention. Either way, the system in use will generally require a certain language for documents, so that the parties and internet adjudicator can all read the pleadings, evidence, discovery requests, motions, etc., involved in the case and/or so that the burden is on the party submitting the document to ensure that it is in a language that the other party and internet adjudicator can read. Many alternatives to the preferred rules are set forth herein and many others will be understood by those skilled in the art, each being in accordance with the present invention as set forth in the claims below.

Specific venues and arbitration entities, languages, choices of law and currencies are set forth above. The actual rules will preferably set forth this terms specifically. However, the actual venues and arbitration entities, languages, choices of law and currencies may be according to many available options depending on the System(s), vendors and purchasers who will host and/or utilize the system, generally and/or on a case-by-case basis.

In addition, in methods that may be performed according to preferred embodiments herein and that may have been described above and in the claims below, the operations have been described in selected typographical sequences. However, the sequences have been selected and so ordered for typographical convenience and are not intended to imply any particular order for performing the operations.

What is claimed is:

1. A method of electronically adjudicating a legal dispute in e-commerce, comprising the steps of:
   providing at least two selectable electronic network-based dispute adjudication levels, each level comprising, a predetermined number of selectable procedural rules for adjudicating a legal dispute, including procedural options chosen from the list of: allowing counterclaims in an answer to a complaint, allowing motions to compel discovery, allowing voluntary discovery, allowing attaching case law to a final argument submission, allowing objections to evidence, allowing motions to reconsider a final judgment, and allowing extensions of time upon request;
   wherein a first adjudication level comprises fewer selectable procedural rules than a second adjudication level;
   selecting an electronic dispute adjudication level
   electronically processing the adjudicating of the dispute in accordance with the selected level, the electronic processing resulting in a final resolution; and
   documenting a judgment award in accordance with the final resolution permitting reduction to an enforceable judgment.

2. The method of claim 1, wherein an e-commerce transaction is dependent on accepting a binding judgment award in accordance with the final resolution of the dispute, permitting an enforceable judgment.

3. The method of claim 2, further comprising options chosen from the list of: the electronic processing forming part of an e-commerce transaction, wherein payment fluids the dispute resolution adjudication; selecting that said level selecting and electronic processing steps would be performed in the event of a dispute by electronic agreement prior to finalizing an e-commerce transaction giving rise to the dispute.

4. The method of claim 1, wherein the level selecting step includes mutual agreements by the parties involved in the dispute as to a particular adjudication procedure for adjudicating the dispute.

5. The method of claim 2, including the step of limiting whether or not the parties in dispute is limited to vendors and purchasers of one or more products depends on the selected level.

\* \* \* \* \*